(12) United States Patent
Foreman et al.

(10) Patent No.: US 11,540,493 B1
(45) Date of Patent: Jan. 3, 2023

(54) METHOD AND APPARATUS FOR POULTRY COLONY STORAGE AND CONVEYANCE

(71) Applicant: Tyson Foods, Inc., Springdale, AR (US)

(72) Inventors: Doug Foreman, Springdale, AR (US); Stephen Brannan, Wesley, AR (US); James A. Ruff, Farmington, AR (US); David Lee Mantooth, Fayetteville, AR (US); Kevin W. Guernsey, Destin, FL (US); Timothy J. DeRoche, Harahan, LA (US); Brian R. Lee, Kenner, LA (US)

(73) Assignee: Tyson Foods, Inc., Springdale, AR (US)

( * ) Notice: Subject to any disclaimer, the term of this patent is extended or adjusted under 35 U.S.C. 154(b) by 476 days.

(21) Appl. No.: 16/428,368

(22) Filed: May 31, 2019

Related U.S. Application Data

(60) Continuation-in-part of application No. 15/644,523, filed on Jul. 7, 2017, now Pat. No. 10,517,278, which is a division of application No. 14/243,443, filed on Apr. 2, 2014, now Pat. No. 9,737,056, which is a continuation-in-part of application No. 13/777,767, filed on Feb. 26, 2013, now Pat. No. 9,119,382.

(51) Int. Cl.
*A01K 45/00* (2006.01)
*A01K 31/18* (2006.01)
*A01K 31/00* (2006.01)

(52) U.S. Cl.
CPC .......... *A01K 45/005* (2013.01); *A01K 31/005* (2013.01); *A01K 31/007* (2013.01); *A01K 31/18* (2013.01)

(58) Field of Classification Search
CPC .... A01K 31/22; A01K 1/0117; A01K 31/005; A01K 1/0135; A01K 1/0128; A01K 45/005; A01K 31/002; A01K 31/007; B65G 13/06; B65G 23/08; B65G 13/02; B65G 15/00; A22B 7/001; A22C 21/0053
USPC ....... 119/164, 451, 329, 327, 843, 845, 453, 119/401, 455; 452/53, 177, 188, 182
See application file for complete search history.

(56) References Cited

U.S. PATENT DOCUMENTS 4,480,588 A * 11/1984 Holladay ............. A01K 31/005
119/455

* cited by examiner

*Primary Examiner* — Peter M Poon
*Assistant Examiner* — Jeffrey R Larsen
(74) *Attorney, Agent, or Firm* — Greensfelder, Hemker & Gale, P.C.; Mark E. Stallion

(57) ABSTRACT

An apparatus and method for a colony system for growing poultry includes a rack system including vertically and horizontally oriented support members, where the support members can be beams that are structurally interconnected forming multiple vertically tiered channels through which a poultry basket can be conveyed, and where each channel formed by the support members has an entry end and an exit end. The system further includes an entry end pulley having multiple side-by-side entry end pulley grooves around an entry end circumference of the pulley. The system further includes an exit end pulley, and the exit end pulley has multiple side-by-side exit end pulley grooves around an exit end circumference of the exit end pulley, where the exit end pulley is rotatably mounted on an exit end bearing axle where the exit end bearing axle has opposing ends fixedly positioned.

10 Claims, 53 Drawing Sheets

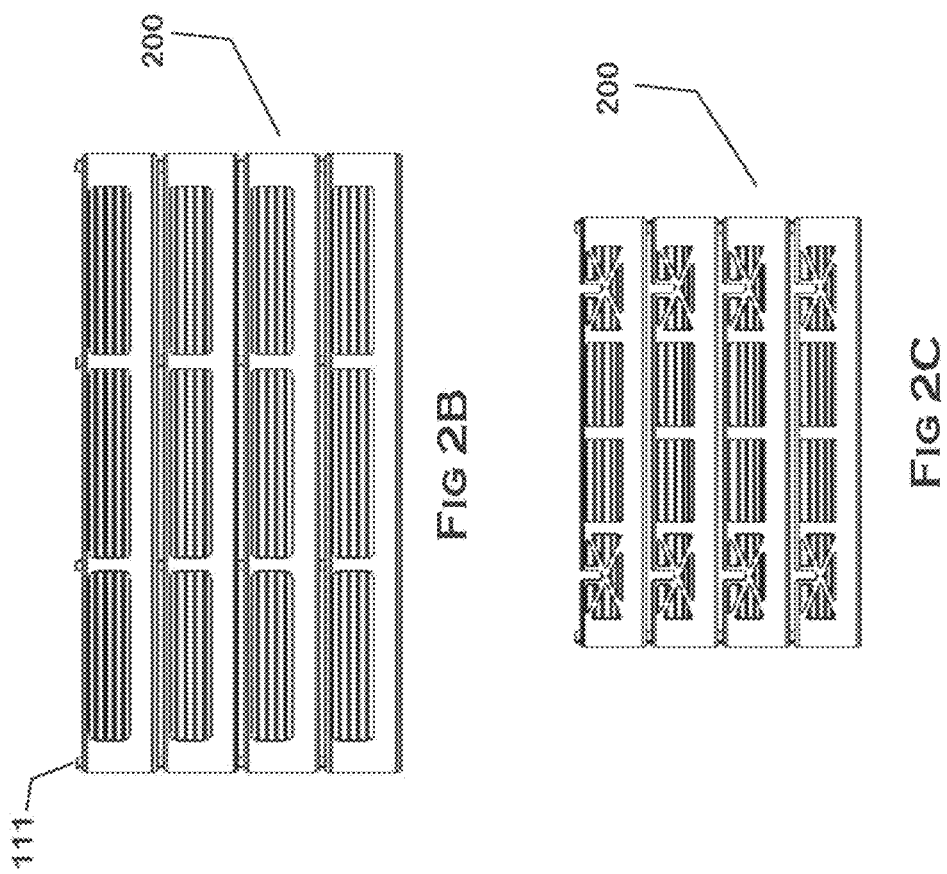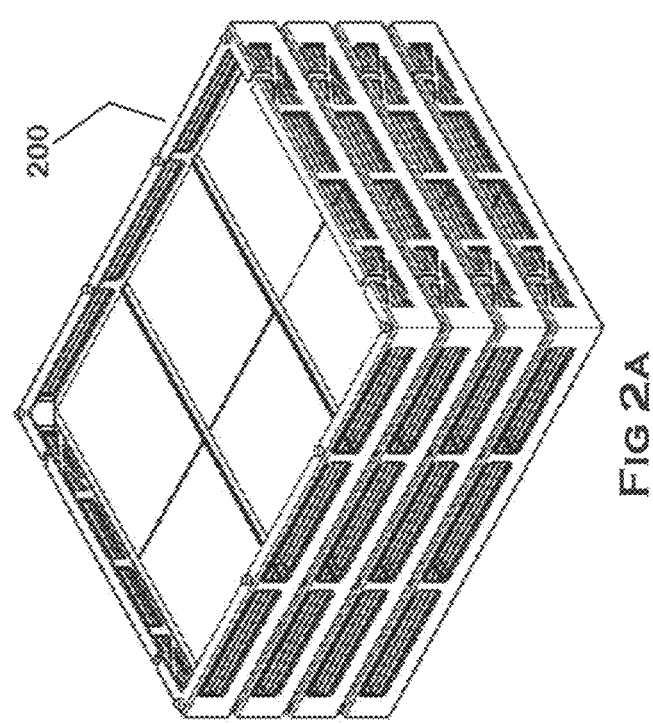

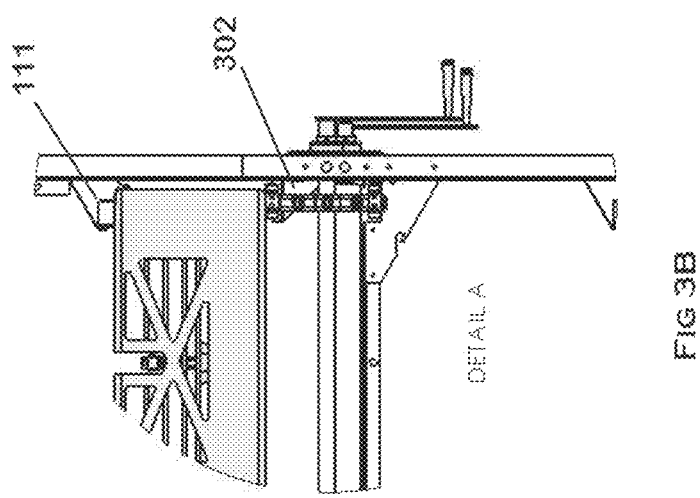
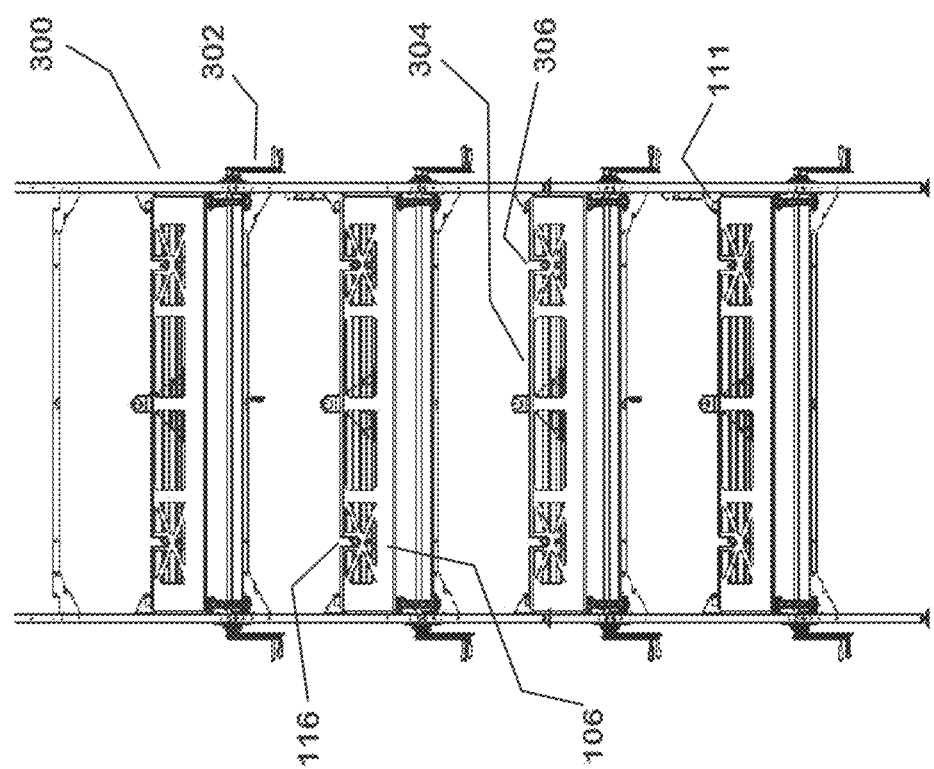

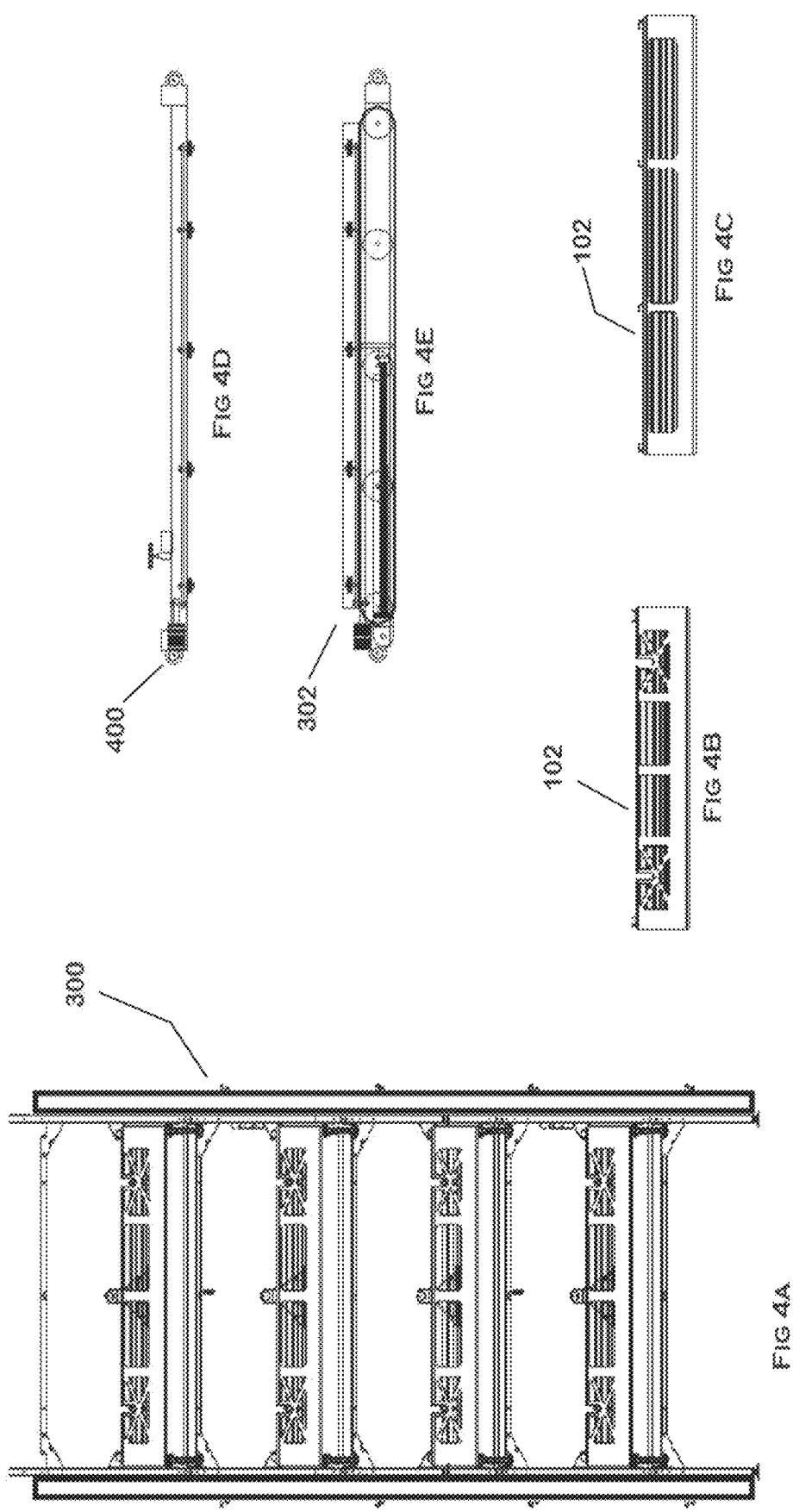

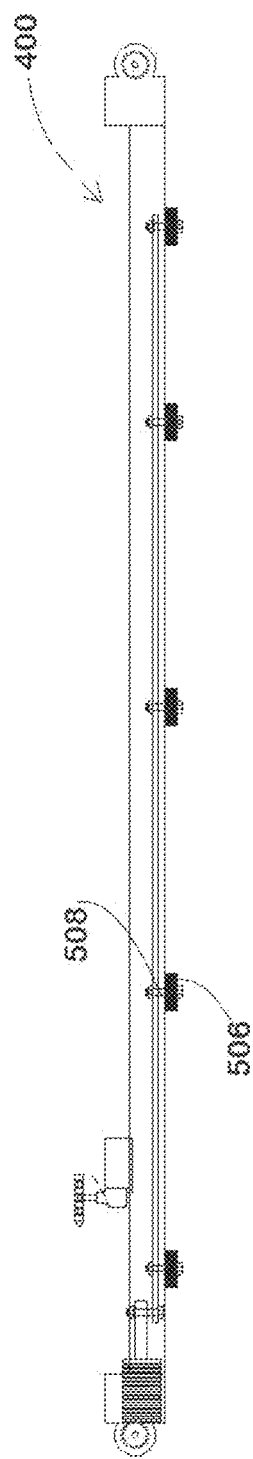
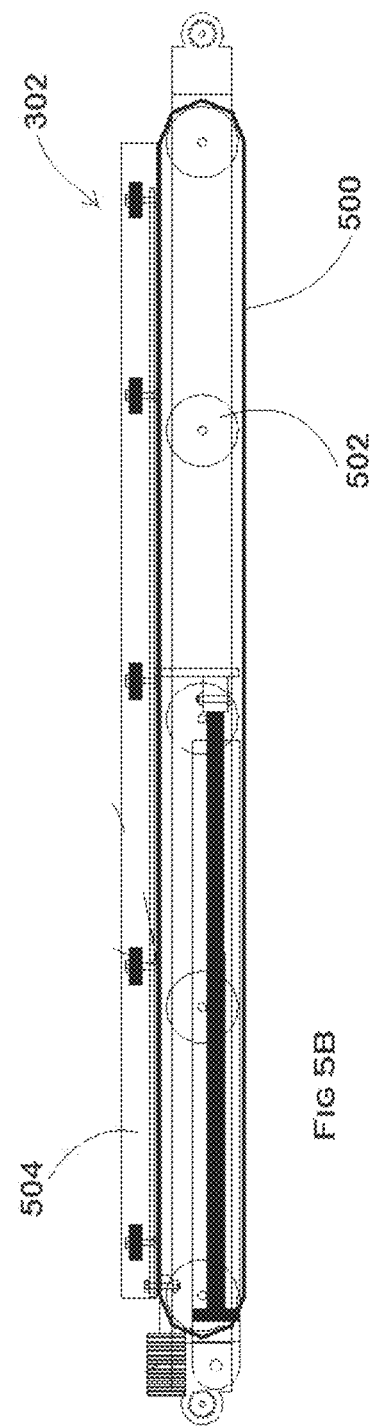
Fig 5A
Fig 5B

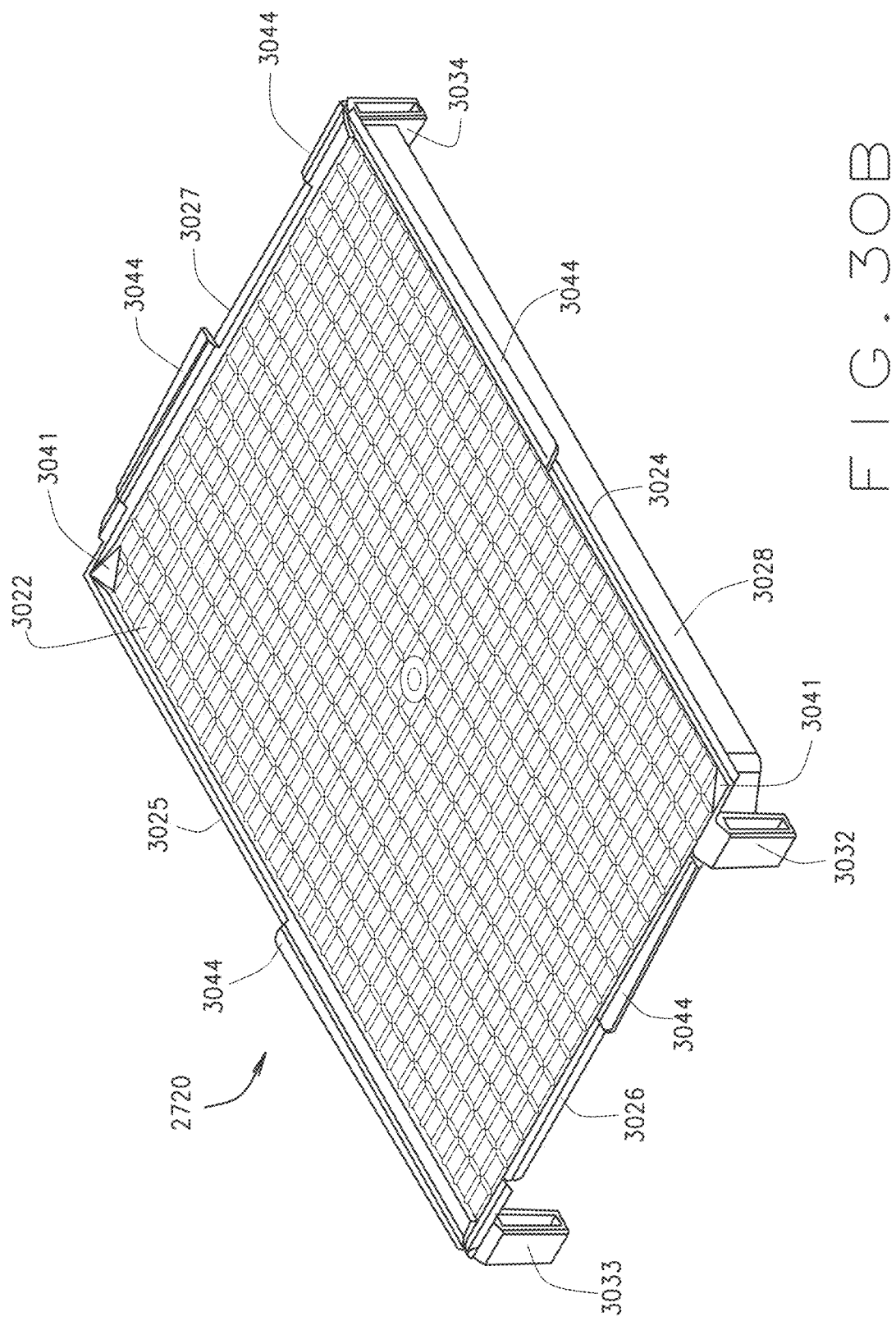

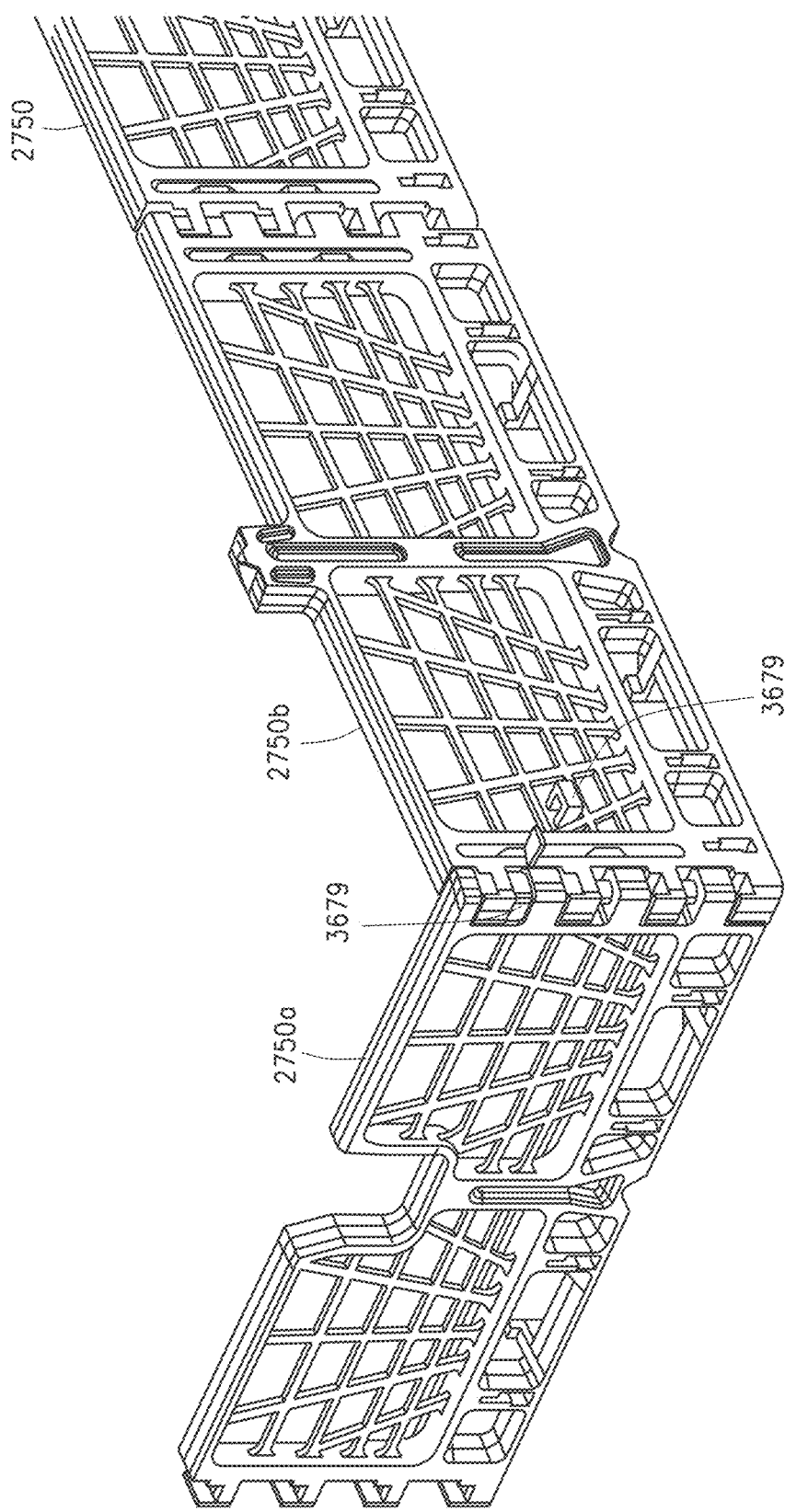

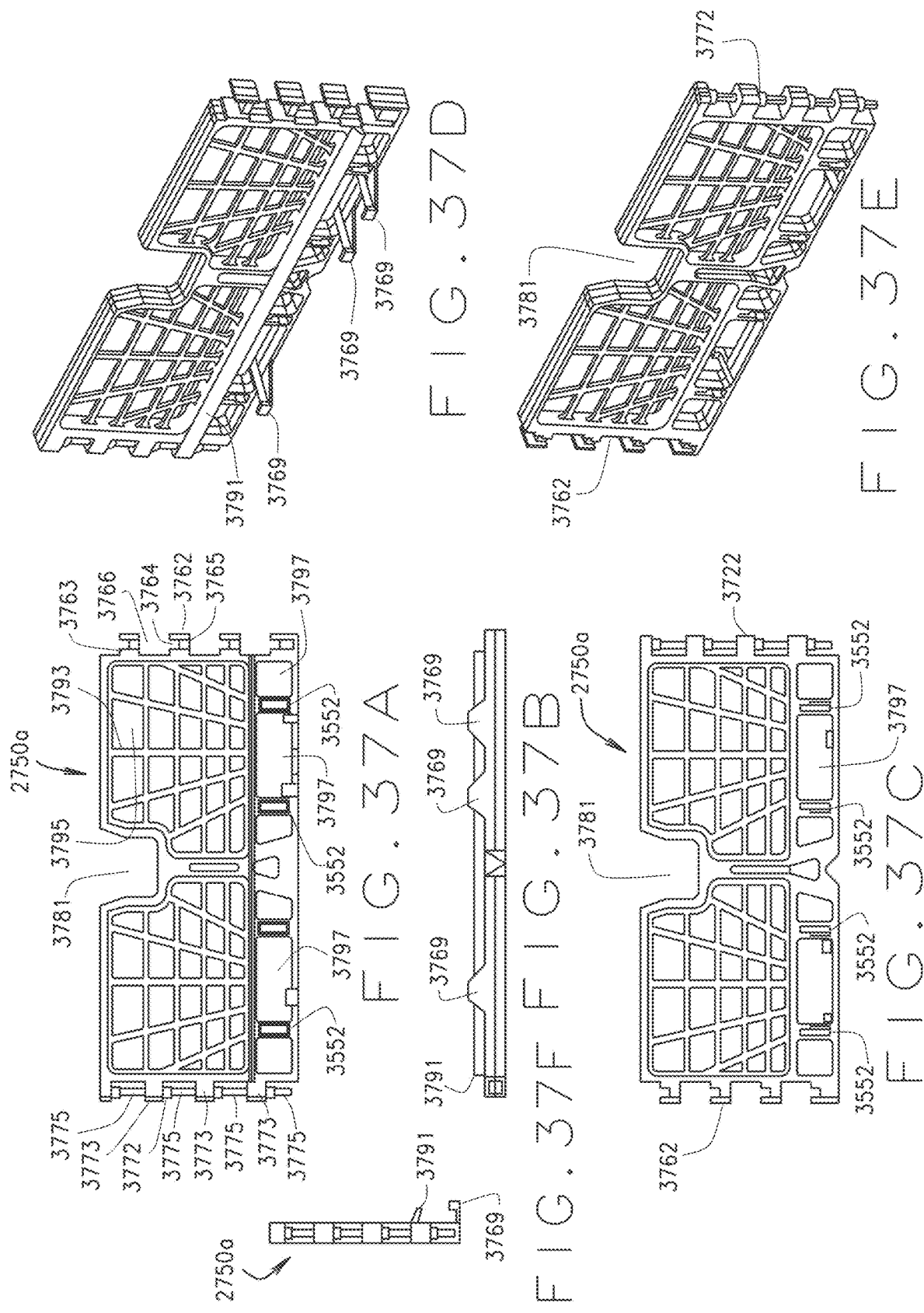

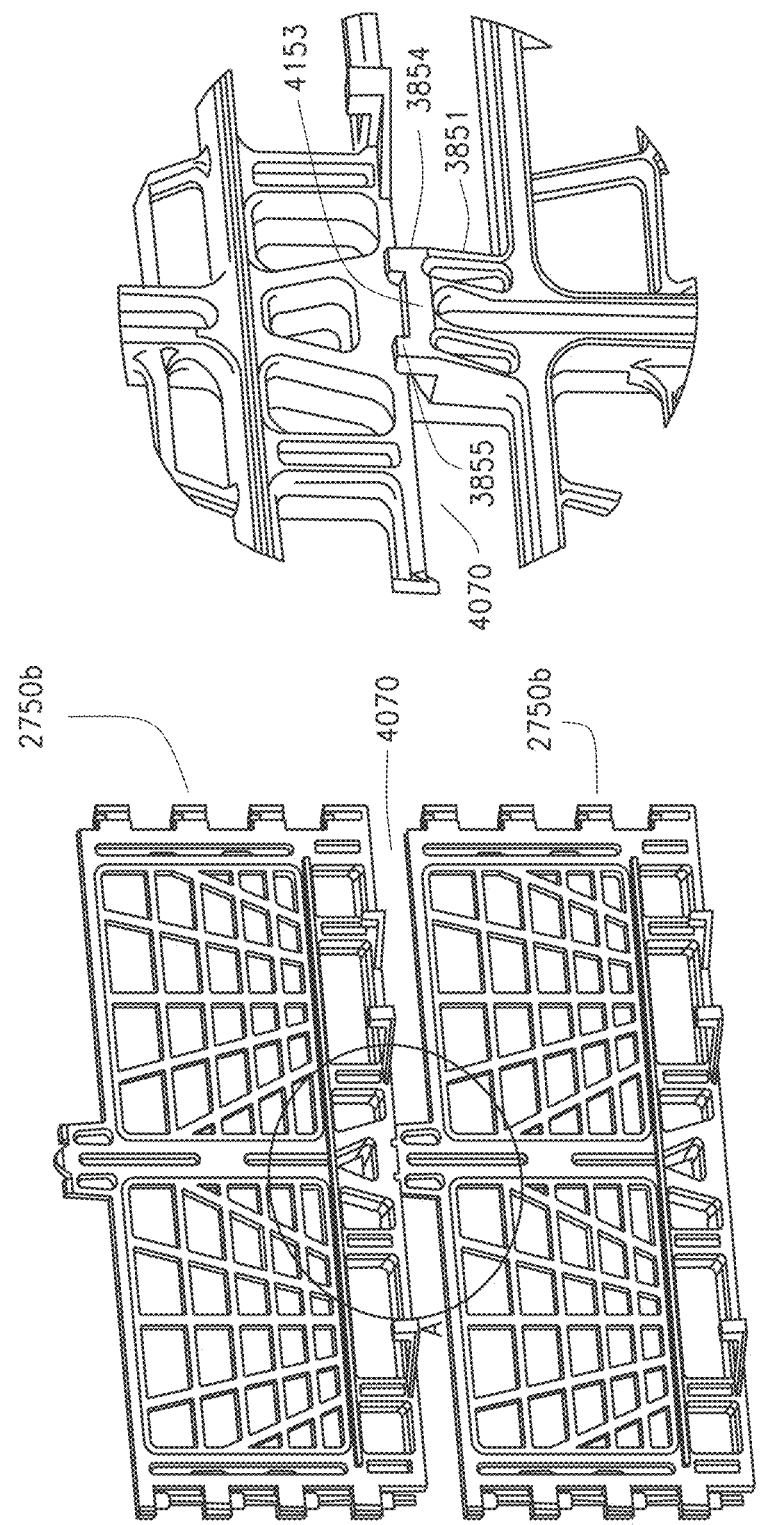

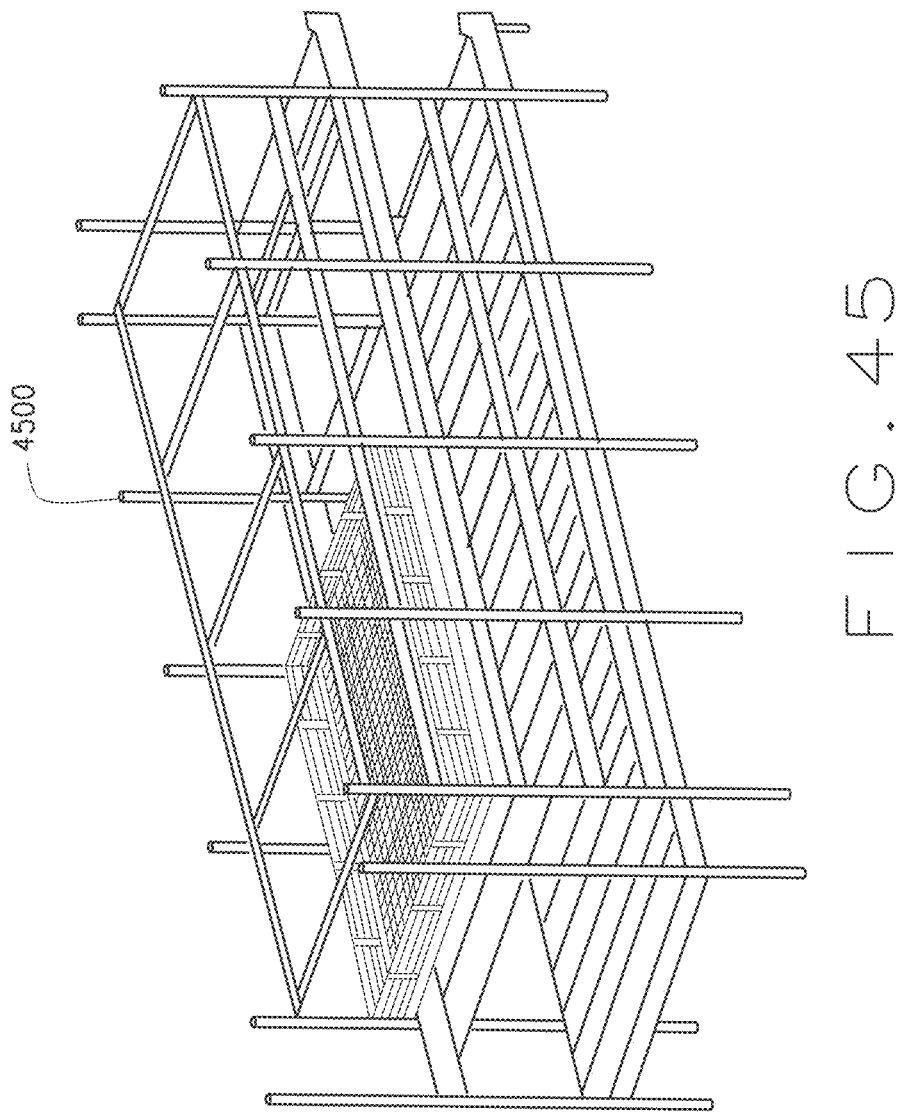

METHOD AND APPARATUS FOR POULTRY COLONY STORAGE AND CONVEYANCE

CROSS-REFERENCE TO RELATED APPLICATIONS

This application is a continuation-in-part application of divisional application Ser. No. 15/644,523 filed on Jul. 7, 2017, said application Ser. No. 15/644,523 is a divisional application of Ser. No. 14/243,443 filed Apr. 2, 2014 and issued as U.S. Pat. No. 9,737,056; said application Ser. No. 14/243,443 is a continuation-in-part of U.S. patent application Ser. No. 13/777,767 filed Feb. 26, 2013 and issued as U.S. Pat. No. 9,119,382, where each of the above applications are entitled Portable Basket Colony for Growing and Transport and Method of Use; the entire disclosures of which are incorporated herein by reference in their entirety.

BACKGROUND

Field

This technology as disclosed herein relates generally to poultry growing methods and systems and, more particularly, to colony basket storage and conveyance system.

Background of Invention

Loading and unloading birds and transportation of live birds from the hatchery stage through the kill stage at a production facility is a challenging task. The birds have to be gathered, contained and transferred to a transport means and subsequently unloaded with minimal damage or harm to the animal, which is challenging because birds instinctively resist such movement. For example, transport of live poultry from the hatchery to growing houses and from growing houses to processing facilities is required. Also, while within the growing facility, the birds have to be contained and maintained within an environment that is health and conducive for growing.

One method of transport of live poultry is containing the birds in cages and stacking the cages on a truck with a flatbed trailer for transport. Loading and unloading trailers with live animals, particularly from a location where the animals are grown or raised to a processing facility, can in the case of chickens, increase the stress level of the animal. With heightened stress, animals are more likely to have increased body temperature, experience bruising, dislocated wing/leg joints and potential tissue damage along with an increased pH level, which may affect the quality of the muscle. Once the birds are captured in cages, the cages must be loaded on the trailer.

There are significant labor issues because it is very labor intensive and requires some level of skill and training. There are health issues for both the birds and the handlers. The labor intensive handling of the birds promotes infections of the handler and risks harm to the birds. This results in numerous health and safety concerns. The cages are prone for damage which can cause bird damage and extensive time and labor is utilized to fill the cages with birds and load and secure them for transport. The cages or other transport containers also have to be cleaned prior reuse, which can also be a labor intensive and costly effort.

Loading of poultry is a cumbersome and time consuming task. In the catching process, the poultry are placed into cages. Some cage designs consist of "drawers" and can vary from 10 to 15 drawers averaging a 20-25 bird capacity per drawer. Birds can be placed into the cages either manually or by semi-automatic means. A forklift then can load a flatbed truck with 18-22 cages that are stacked in pairs. Once the cages are in place, each stack has to be secured by chains to the frame of the trailer.

Semi-automated methods of harvesting the birds in the houses have encountered mechanical and functional problems. In one sense this semi-automated method eliminates the need for operators to physically pick up the birds. However, operators are still needed to operate the equipment and to move the birds forward and away from the sides of the house. Therefore, some handling is still necessary.

Plastic poultry trays or drawers are sometimes used to transport and house birds temporarily, however, these systems are temporal and are only used during certain stages and are not integral with growing systems or transport systems. Use of such trays or drawers will still require significant handling of the birds, though they may be somewhat more durable than metal cages. Also, it is unclear how such plastic trays will be maneuvered or handled when within any given facility, which is critical, because at some point the tray or drawer will have to be maneuvered, moved or handled within a given facility. Further, these plastic poultry trays, though less often than the standard cages, are also subject to damage or breakage resulting in a need to replace the entire tray, even though only one area of the tray may be cracked or otherwise damaged. The plastic trays are likely easier to clean and sanitize than the standard cage but given the size of the typical plastic tray and the webbing of the mesh, they also can be difficult to clean. Also, storing trays when they are not in use can consume a large amount of space.

As noted above, problems occur with, loading, unloading, harvesting, placing birds into cages (plastic drawers or trays), loading the cages on a transport, and transporting to the processing facilities. Also, current processes are labor intensive and costly. The problems occur as the DOC (Day Old Chicks) are transitioned from the hatcheries to the growing centers and then to the production facilities. A new system and method for harvesting, loading, growing, transporting, and unloading is needed that addresses the above problems by reducing physical handling of the birds from the hatchery stage through the kill and production stage. In the new system and method, the device by which the birds should be transported should be reusable, interchangeable, maneuverable, easily handled, easily moved through a facility and easily cleaned. A better apparatus and/or method is needed for improving the handling and growing of poultry items.

SUMMARY

The technology as disclosed herein includes a method and apparatus for housing, handling and conveying a poultry basket within a poultry growing facility.

The technology involves a system and method for handling poultry comprising a colony basket apparatus utilized throughout the process of transitioning the DOC from the hatchery, to the growing facility, through the growing process, and on to the production facility. The colony basket apparatus is utilized for harvesting, loading and unloading, growing, transport, storing and holding through the shackling process prior to the kill process.

The method utilizes the colony basket apparatus to perform the steps of retrieving and loading a grouping of the DOC into the colony basket at the hatchery, transporting the same grouping of birds in the same colony basket to the growing facility, loading the colony basket containing the original grouping of birds into the colony system of the growing facility, growing the DOC to Broilers (chickens bred and raised specifically for meat production) in the original colony basket in which they were installed, removing and harvesting live poultry from the colony system while maintaining the same grouping of birds in the same colony basket in which they were originally placed, stacking and loading the colony basket of Broilers on a transport, transporting to a poultry production facility, unloading the colony basket and temporarily storing the poultry in the same colony basket for subsequent killing.

The invention more particularly relates to a new portable colony basket for holding and making possible all necessary functions for the poultry animals from the DOC stage, through growing, through transport and up to production while maintaining a grouping of birds or subset thereof in the same colony basket throughout the process all of the way through the shackling process. The technology also more particularly relates to a colony system that includes a colony rack system within a poultry growing facility. With one implementation the colony rack system includes multiple levels or tiers on which the poultry colony growing baskets are stowed and conveyed. With one implementation, the colony rack system includes an entry end and an exit end. When DOCs arrive at a growing facility and are contained in a poultry colony basket, the poultry colony baskets containing the DOCs are inserted into the rack system through the entry end and onto one of the three tiers or levels. The colony baskets are extracted from the colony rack system at the exit end of the colony rack system. For one implementation of the technology, the colony rack system includes watering lines extending to and channeling water to spaced apart watering troughs and feeding lines extending to and channeling feed to spaced apart feed troughs for providing nourishment to the birds while in the rack system. As the birds are growing in the baskets on the various levels of the rack system, the baskets are slowly being conveyed by a conveyance system, whether iteratively or progressively toward the exit end where they can then be removed from the colony rack system at which time the birds are now full grown broilers. The rack system will resolve issues relating to handling or maneuvering the colony baskets during the growing process.

One implementation for a colony system for growing poultry includes a rack system including vertically and horizontally oriented support members, where the support members can be beams that are structurally interconnected forming multiple vertically tiered channels through which a poultry basket can be conveyed, and where each channel formed by the support members has an entry end and an exit end. The system further includes an entry end pulley having multiple side-by-side entry end pulley grooves around an entry end circumference of the pulley, and where said entry end pulley is rotatable mounted on an entry end bearing axles where the entry end bearing axle has opposing ends positioned along left and right bearing slots. The bearing slots are substantially oriented horizontally and movement of the entry end bearing axle along the slot increases or decreases the tension in an endless conveyor cable. The system further includes an exit end pulley, and the exit end pulley has multiple side-by-side exit end pulley grooves around an exit end circumference of the exit end pulley, where the exit end pulley is rotatably mounted on an exit end bearing axle where the exit end bearing axle has opposing ends fixedly positioned. For one implementation of the colony system the endless conveyer cable has an upper run and a lower run, and where each run extends between the entry end pulley and the exit end pulley, and where the endless conveyor cable circumferentially wraps around the entry end pulley and through the entry end pulley grooves, and circumferentially wraps around the exit end pulley and through the exit end pulley grooves. One embodiment includes a geared tensioning winch having a ratcheting gear attached to a spool having a tensioning cable attached to the spool and wrapped circumferentially there about, and the tensioning cable has an opposing end attached to a bracket on which the entry end bearing axle is mounted whereby the ratcheting gear can be ratcheted to increase or decrease the tensioning in the tensioning cable to thereby adjust the tension in the endless conveyor cable.

Another implementation of a colony system for growing poultry includes a rack system including vertically and horizontally oriented support members, where said support members are structurally interconnected forming multiple vertically tiered channels through which a poultry basket can be conveyed, and where each channel has an entry end and an exit end. One embodiment further includes a left and right entry end pulley, where each of said left and right entry end pulley has multiple side-by-side left and right entry end pulley grooves around an entry end circumference of each left and right entry end pulley. The left and right entry end pulley is rotatably mounted on left and right entry end bearing axles respectively where each of the left and right bearing axles have opposing ends positioned along left and right bearing slots for tension adjustment. One implementation further includes a left and right exit end pulley, where each of said left and right exit end pulley has multiple side-by-side left and right exit end pulley grooves around an exit end circumference of each left and right exit end pulley. The left and right exit end pulley is rotatably mounted on left and right exit end bearing axles where each of the left and right exit end bearing axles have opposing ends positioned fixedly positioned. One implementation further includes a left and right endless conveyer cable, where the left endless cable has a left upper run and a left lower run, and where each extends between the left entry end pulley and the left exit end pulley. The left endless cable circumferentially wraps around the left entry end pulley and through the left entry end pulley grooves, and circumferentially wraps around the left exit end pulley and through the left exit end pulley grooves. The right endless cable has a right upper run and a right lower run, and where each extends between the right entry end pulley and the right exit end pulley. The right endless cable circumferentially wraps around the right entry end pulley and through the right entry end pulley grooves, and circumferentially wraps around the right exit end pulley and through the right exit end pulley grooves.

One implementation of the colony system includes a left geared tensioning winch having a left ratcheting gear attached to a left spool and having a left tensioning cable attached to the left spool and wrapped circumferentially there about the spool, and the left tensioning cable has an opposing end attached to a left bracket on which the left entry end bearing axles are mounted whereby the left ratcheting gear can be ratcheted to increase decrease the tensioning in the tensioning cable to thereby adjust the tension in the left endless conveyor cable. One implementation further includes a right geared tensioning winch, having a right ratcheting gear attached to a right spool having a right tensioning cable attached to the right spool and wrapped circumferentially there about the spool. The right tensioning cable has an opposing end attached to a right bracket on which the right entry end bearing axles are mounted whereby the right ratcheting gear can be ratcheted to increase decrease the tensioning in the right tensioning cable to thereby adjust the tension in the right endless conveyor cable.

One implementation further includes an endless conveyor belt having an upper conveyor belt run extending between the entry end and the exit end of at least one of the multiple vertically tiered channels, where the upper conveyor belt run extends substantially parallel with respect to the left upper run and the right upper run of the left and right endless conveyor cables respectively. The upper conveyor belt run extends vertically lower with respect to the left and right upper runs of the left and right endless cables, to thereby convey waste toward the exit end for disposal.

One implementation of a colony method for growing poultry includes providing a rack system including vertically and horizontally oriented support members, where the support members are structurally interconnected forming multiple vertically tiered channels through which a poultry basket can be conveyed, and where each channel has an entry end and an exit end. One implementation of the method includes inserting a colony basket into an entry end of one or more vertically tiered channels and placing the colony basket on an endless conveyor cable. The endless cable has an upper run and a lower run, and each run extends between an entry end pulley and an exit end pulley. The endless cable circumferentially wraps around the entry end pulley and through multiple side-by-side entry end pulley grooves, and circumferentially wraps around the exit end pulley and through multiple side-by-side entry the exit end pulley grooves. One implementation of the method further includes conveying the upper run of the endless conveyor cable and thereby conveying the colony basket placed on said endless conveyor cable.

One implementation of the colony method for growing poultry includes tensioning the endless conveyor cable, utilizing a geared tensioning winch, having a ratcheting gear attached to a right spool having a right tensioning cable attached to the right spool and wrapped circumferentially there about. For implementing the method the right tensioning cable has an opposing end attached to a right bracket on which the right entry end bearing axles are mounted. One implementation of the method includes ratcheting the ratcheting gear to increase or decrease the tensioning in the tensioning cable thereby adjusting the tension in the endless conveyor cable. One implementation of the method further includes conveying the colony basket from the entry end to the exit end of one or more of the vertically tiered channels. One implementation of the method can further include conveying away waste with an endless conveyor belt having an upper conveyor belt run extending between the entry end and the exit end of one or more of the multiple vertically tiered channels.

The concept of harvesting poultry utilizing one type of colony basket uniformly throughout the entire process from capturing the DOC at the hatchery to growing houses equipped with colony systems and on to production will make the process more efficient and will result in less worker and animal stress by resolving many of the problems related to the current methods of manually catching birds and placing in cages or other containers or using semi-automated systems to harvest and transition poultry. With the present invention, stackable tray colony baskets can be utilized that can be placed into and retrieved from colony rack systems in growing houses using automated systems and can be transferred and retrieved from transports when transitioning between locations within the overall process and the colony baskets can be further integrated with feeding and watering systems.

The trays can be made from molded plastic or other material including metal aluminum metal and can have an open grid flexible flooring elevated above a lower manure trap flooring to keep the birds out of their manure and the sides can be vented. The bottoms can have an open grid pattern bottom to allow the birds to grasp with their paws to stabilize and reduce wing flapping, but the floor can also be flexible to reduce injury to the bird. The grid pattern also allows debris and feces to fall out to reduce cleaning and increased airflow to ventilate the birds. The top and bottom perimeter edges of the cages can be complimentary in shape for ease of stacking and stability reducing lateral movement of the stacked trays with respect to each other. The sides of the trays can also have vented openings.

For on implementation of the technology, the trays or baskets can be constructed with a modular design whereby the side walls and floor of the baskets are constructed from interconnected modular components that can be disassembled for ease of cleaning and reassembled and any individual modular component that is broken can be replaced by a replacement like component. Once an upper tray is stacked on top of a lower tray, birds placed in the lower tray are contained. The upper most tray in a stack of trays can be capped by an additional empty tray or other cover or ceiling in the colony system or in the transport or other automated transitioning means.

An empty stack of colony baskets can be transported to a hatchery and loaded with DOC. The stack of colony baskets containing DOC can be loaded on a transport rack, which receives the colony baskets and transported to a growing house from the hatchery. The colony baskets can be unloaded from the transport rack to be transferred into a poultry house colony system manually or the transfer can by automated by a powered mover or conveyor and/or loading system. This method provides that no container stacks have to be manually or mechanically un-stacked for loading poultry because the DOC are already in the colony baskets. Previous systems required that trays be removed from a stack and then the poultry would be loaded into the trays and the trays are re-stacked, a powered mover can transport the trays to the outside to be loaded onto the trailer. The process of loading and unloading birds in the growing house has been eliminated.

The construction of the trailer can be a flatbed trailer with vertical framework to make up the structural integrity as well as to hold the stacks of individual colony baskets. There can be a plurality of vertical and horizontal rails to insure the structure and flexibility of the size and number of colony baskets the transport is capable of handling.

With the design of the present invention, there can be a frame work constructed on the transport trailer holding a lightweight material that can be pulled alongside the trailer to cover the sides. This shroud can create an envelope in which the environment can be better controlled and provide a more suitable environment for the animals.

Once the trailer arrives at the plant, the colony baskets can be unloaded and automatically moved into a warehouse or holding facility. This process can be performed as trucks arrive in order to build an entire storage of birds for a production shift. The trucks can be automatically unloaded in a very short period of time, thus eliminating the need for a forklift. The system can work in a "last-in first-out" method. The process can be improved through the efficiency of bringing the birds in the same colony basket that originated at the hatchery and the same colony basket continuing through the growing process and on to the production plant kill area and not consuming time loading and unloading birds into and out of cages or other containers.

The automated unloading can be done automatically to pull the trays off the trailer (or flatbed of transport) from the side of the truck in the stacked formation into a transport rack or onto either a conveyor or pull chain system. The transport rack or the conveyor can take the trays to the staging area where they can be un-stacked manually or by using destacker equipment.

With the proposed method, the colony baskets provide a perfect transport, growing container and housing means all in one unit to move the birds through the entire process. This system can eliminate the unnecessary handling of the birds and possibly make the process more efficient.

In another implementation of the present technology, a modular colony basket (modular tray) is used for the colony basket apparatus. The modular basket can comprise a floor formed of mesh panels and modular side walls that receive a beam extending through a hinge element connecting mesh panels to the floor. As in the previously described colony basket, the modular basket is stackable with other modular baskets and can have all of the functionality and interfaces as the non-modular implementation. The modularity of the basket allows the basket or tray to be periodically disassembled for routine scheduled cleaning and sanitizing, which would be easier than trying to clean and sanitize the whole basket. Further, if only a small section of a basket/tray is damaged, the modularity provided with this implementation allows a given section to be replaced without disposing of the entire tray.

There are a number of advantages to the design of the present invention for harvesting poultry. Safety is increased for the handler and the birds and health risks are reduced. The efficiencies of handling and transporting birds is improved and the process is less labor intensive and causes less stress on animals.

Moreover, because the present invention teaches the use of a modular colony basket, a method is provided wherein the devices used to transport the birds may be easily disassembled and cleaned before being reassembled.

The features, functions, and advantages that have been discussed can be achieved independently in various implementations or may be combined in yet other implementations further details of which can be seen with reference to the following description and drawings.

These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIG. 2A is a perspective view illustration of stacked colony baskets;

FIG. 2B is a side view illustration of stacked colony baskets;

FIG. 2C is an end view illustration of stacked colony baskets;

FIG. 3A is an illustration of a colony basket rack;

FIG. 3B is an illustration of a sectional detail of a colony basket rack;

FIG. 4A is a colony basket rack;

FIG. 4B is a side plan view of a colony basket;

FIG. 4C is a side plan view of a colony basket;

FIG. 4D is a colony basket rack support;

FIG. 4E is a colony basket rack conveyor assembly;

FIG. 5A is a colony basket rack support;

FIG. 5B is a colony basket rack conveyor assembly;

FIG. 30B is an alternative perspective view of the floor panel of FIG. 30A;

FIG. 36 is an illustration of the side walls of the basket of FIG. 27;

FIGS. 37A, 37B, 37C, 37D, 37E and 37F are various illustrations of a first side panel suitable for forming a side of the basket of FIG. 27;

FIG. 40 is an illustration of the inside of two stacked side panels;

FIG. 41 is an enlarged illustration of region A of FIG. 40;

FIG. 45 illustrates a frame for a poultry colony employing modular baskets according to an embodiment of the invention.

Figure 1:
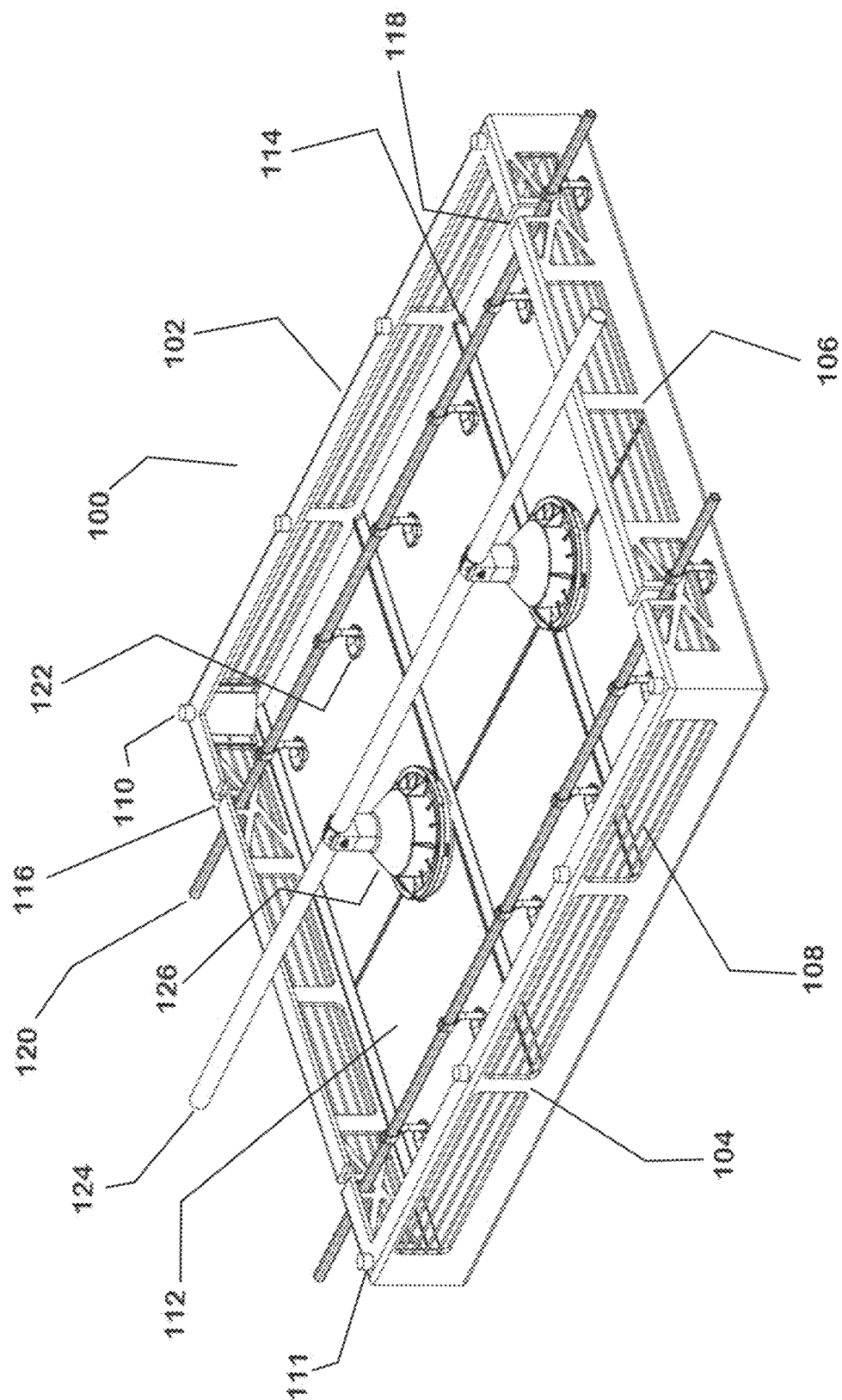
FIG. 1 is a colony basket integrated with a watering and feeding system.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

Figure 56:
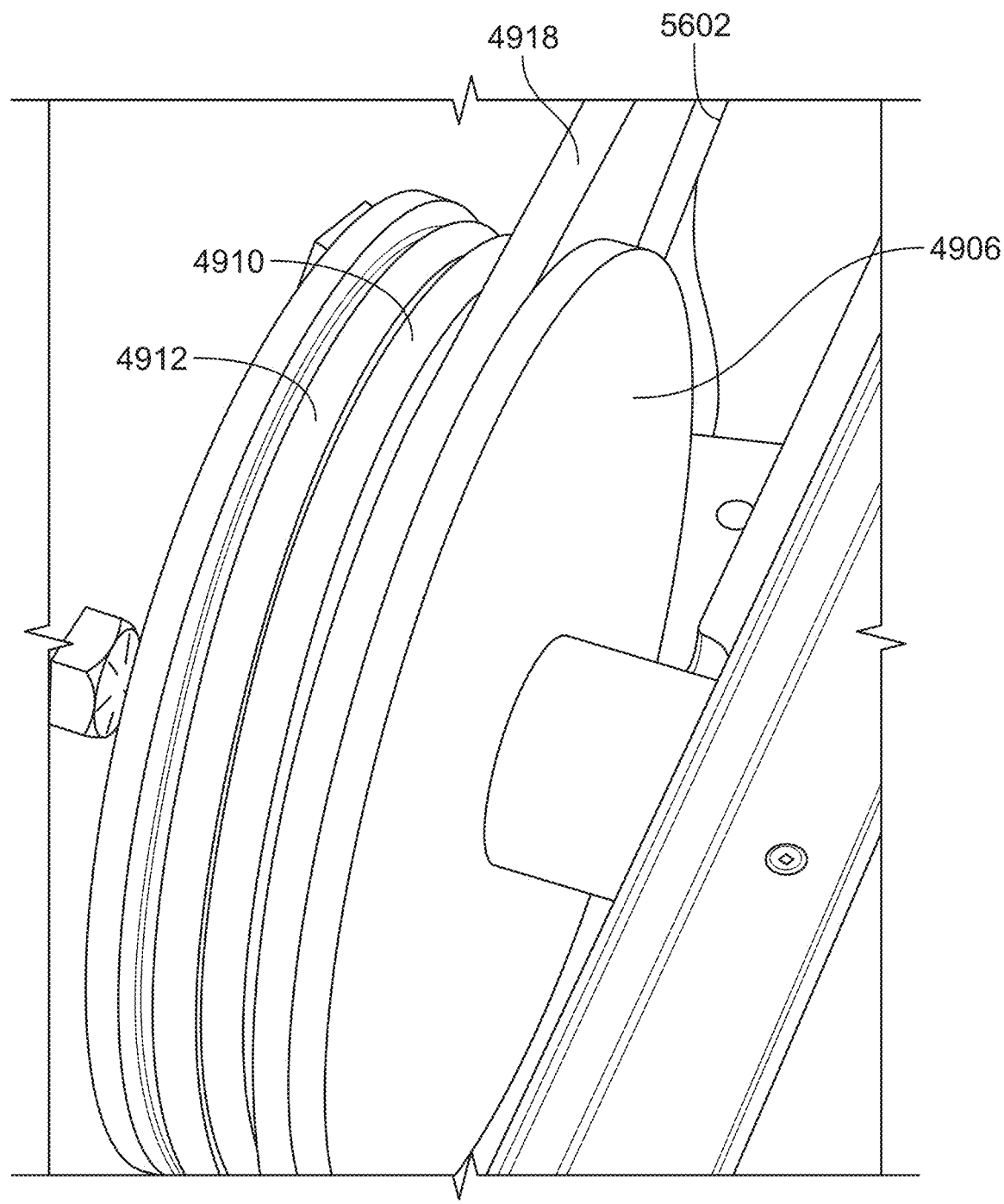
FIG. 56 is an illustration of an exit end pulley.

According to the implementation(s) of the present technology as disclosed, various views are illustrated in FIG. 1-56 and like reference numerals are being used consistently throughout to refer to like and corresponding parts of the technology for all of the various views and figures of the drawing. Also, please note that the first digit(s) of the reference number for a given item or part of the technology should correspond to the Fig. number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

The technology as disclosed and claimed herein relates to a colony system that includes a colony rack system within a poultry growing facility. With one implementation the colony rack system includes multiple levels or tiers on which the poultry colony growing baskets are stowed and conveyed. With one implementation, the colony rack system includes an entry end and an exit end. When DOCs arrive at a growing facility and are contained in a poultry colony basket, the poultry colony baskets containing the DOCs are inserted into the rack system through the entry end and onto one of the three tiers or levels. The colony baskets are extracted from the colony rack system at the exit end of the colony rack system. For one implementation of the technology, the colony rack system includes watering lines extending to and channeling water to spaced apart watering troughs and feeding lines extending to and channeling feed to spaced apart feed troughs for providing nourishment to the birds while in the rack system. As the birds are growing in the baskets on the various levels of the rack system, the baskets are slowly being conveyed by a conveyance system, whether iteratively or progressively toward the exit end where they can then be removed from the colony rack system at which time the birds are now full grown broilers. The rack system will resolve issues relating to handling or maneuvering the colony baskets during the growing process.

One implementation of the present technology as disclosed comprising method and system for a poultry colony rack teaches a novel apparatus and method for handling and maneuvering poultry baskets within a growing facility and delivering nourishment to birds in the poultry colony rack system. The details of the technology as disclosed and various implementations can be better understood by referring to the figures of the drawing.

Referring to FIG. 1, a colony basket integrated with a watering and feeding system is shown. The colony basket growing assembly 100 is shown with a colony basket 102 having vented vertically upright side walls 104 and 106 extending between a top rim flange and a bottom rim flange. The vertically upright side walls include vented areas 108. The top rim flange includes a plurality of stand-offs as represented by items 110 and 111. The stand-offs can provide spacing between colony baskets when they are stacked one on top of the other. The bottom rim flange can include complimentary recessed receptacles to receive the stand-offs therein in order to interlock the stacked colony baskets and in order to prevent or resist lateral and longitudinal movement. The top rim flange and the adjacent side wall can have vertical slots 116 and 118 for receiving the water channel and water trough assembly 120 and 122. The colony basket 102 can also be integrated with a feed channel 124 and feed trough 126. The feed assembly and the watering assembly can be more generally referred to as sustenance assemblies that can be elevated above the basket for basket removal and installation and ultimately lowered into the basket. The parametrical top rim flange defines an upward facing opening through which birds can be inserted into the basket. The downward facing opening is closed by a floor 112 providing support and a trap for debris. The floor 112 can have placed thereon elongated elevator strips 114 over which a flexible mesh flooring (Not Shown) can be supported and installed. The flexible mesh flooring, not shown, can have small openings through which debris can fall downward through the mesh flooring and be trapped by the floor 112. The flexibility of the mesh flooring prevents injury to birds standing thereon. The colony basket growing assembly 100 is shown in its configuration when it is integrated within a colony system whereby the birds are housed within the colony basket and provided nourishment for the growing process. For another embodiment, the floor 112 can be a mesh floor and the strips 114 can support the mesh floor. A further modification to this embodiment can include an under panel or cover that removably attaches immediately underneath the mesh floor 112.

Referring to FIG. 2, a colony basket stack is shown. In FIGS. 2A-2C various views of a colony basket stack 200 is shown. The colony baskets are shown stacked one on top of the other. The colony basket stack 200 can be transported in this configuration and as seen in the various views, the colony baskets are vertically spaced one with respect to the other by the stand-offs 111 and 110. The bottom facing rim of the basket above can be configured with a mating receptacle recess for receiving the stand-off of the basket immediately below.

Referring to FIG. 3, a colony basket rack is shown. A rack assembly 300 is shown and configured for a colony system. The rack transfer and conveyor assembly 302 is shown which is utilized to support the colony basket as well as transfer the colony basket into and out of the colony racks of the colony system. The colony system configuration is shown with a feed assembly 304 and a watering assembly 306. The slot 116 shown where the water assembly 306 can be lowered therein. The feed assembly 304 and the water assembly 306 is shown in a lowered position but can be elevated above the colony basket using a wench system adapted to raise and lower the assemblies so that the basket can be inserted and removed from the colony basket rack without being obstructed by the assemblies. Other drawer designs are not adapted such that watering and feeding assemblies can be raised above or lowered into the container.

Referring to FIGS. 4A through 4E, a colony basket rack is shown, a side plan view of a colony basket is shown, a side plan view of a colony basket is shown, a colony basket rack support is shown and a colony basket rack conveyor assembly is shown. FIGS. 4A-4E show the various components of the rack assembly 300 within the colony system configuration. The colony baskets are longitudinally installed within the rack assembly 300. The longitudinal installation aligns the vertical slots of the colony baskets to be aligned with the water trough system. The components of the transfer system including the support transfer rack 400 and the rack transfer conveyor assembly 302 is also shown.

Referring to FIGS. 5A-5B, a colony basket rack support is shown and a colony basket rack conveyor assembly is shown. FIGS. 5A and 5B show further detail of the support transfer rack 400 and the rack transfer conveyor assembly 302. The rack transfer conveyor assembly 302 includes a conveyor belt 500 and a conveyor roll assembly 502. The rack transfer conveyor assembly 302 also includes a hydraulic cylinder extension arm 504 that can be utilized to engage the baskets with engagement members 506 and extend to transfer a colony basket stack from one rack to another and/or from one rack to a transport system. The basket cylinder arm and basket retention bar 504 can be actuated to longitudinally extend and retract during retrieval and insertion of a basket. The basket retention bar 504 can include basket engagement members member that engages the basket by applying lateral pressure against the side of the basket and/or engages a complimentary receptor configured to receive the engagement member. The retention bar and engagement member can be rotated about pivot 508 in order to rotate upward to engage a basket or to rotate outward and downward away from the basket. The support transfer rack 400 can support a basket and the support transfer rack can be integral with a rack allowing the transfer rack 400 to elevate or lower the basket with the rack when it is supporting a basket.

Figure 6:
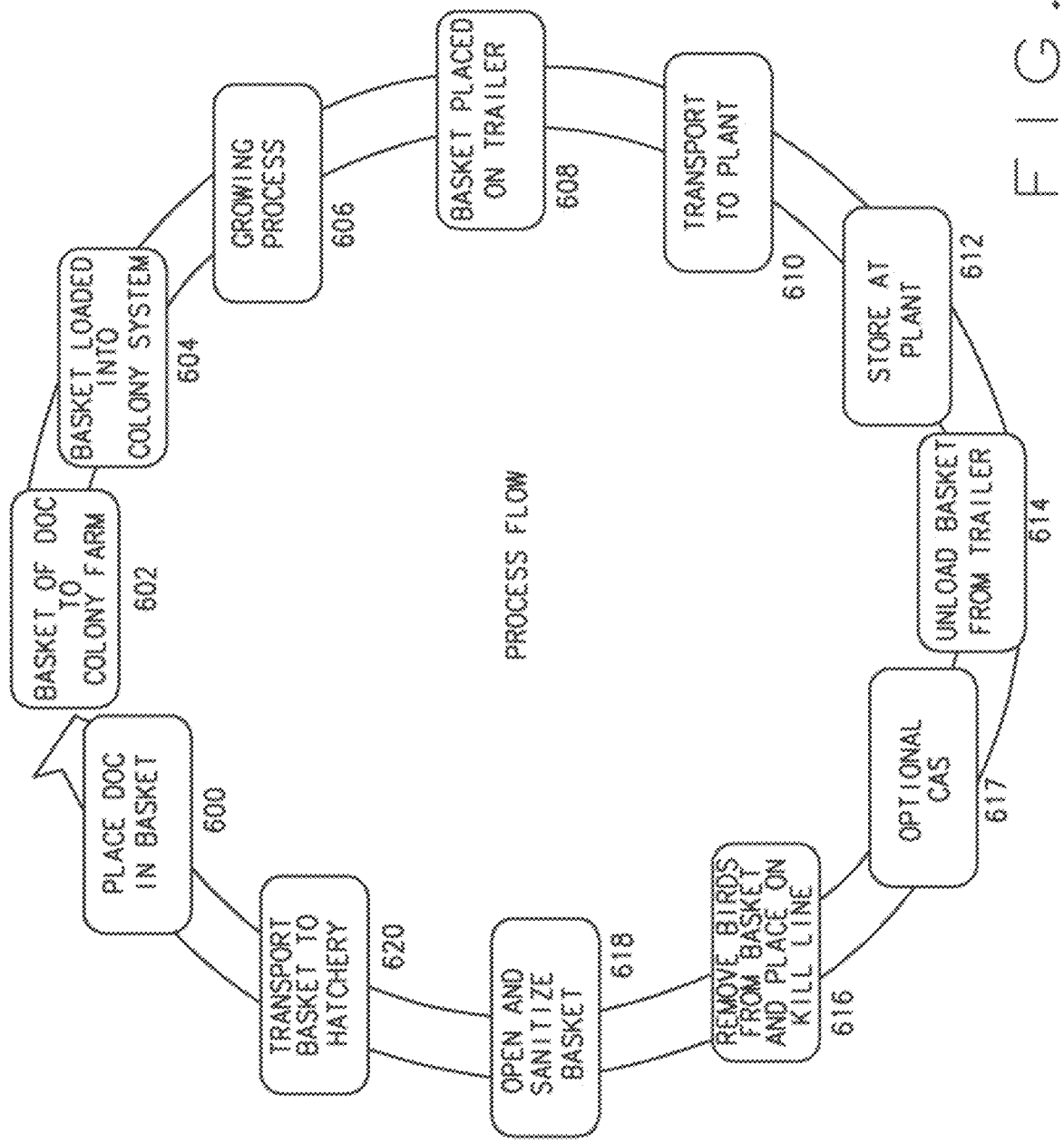
FIG. 6 is a flow diagram of the colony basket methodology.

Referring to FIG. 6 a flow diagram of the colony basket methodology is shown. FIG. 6 shows a flow diagram of a circular process utilizing a system of colony baskets throughout the entirety of the process. A given colony basket will retain the same colony (grouping) of birds throughout the process. Initially a colony basket is filled with DOC at a hatchery as reflected by step 600. Groupings of colony baskets each containing their own individual grouping of birds are then transferred to a growing house (colony farm) 602 where the baskets are loaded into a colony system as reflected by 604. The birds are retained in the same colony basket in which they were originally installed throughout the growing process and the growing process proceeds as reflected by 606. The colony baskets are integrated with the watering and feeding systems within the colony system of the growing house. Once the growing process has been completed, the birds are retained in their original colony basket and the baskets are removed from the colony system and transferred to the trailer of a transport as reflected by step 608. The transport carries the grouping of baskets to a processing plant where the colony baskets are stacked and stored for future processing as reflected by steps 610 and 612. Again, each of the grouping of birds are retained in their original colony basket throughout the process. The baskets are unloaded as reflected by step 614 and transferred to the kill line as reflected by step 616 or 617 which may be a controlled atmosphere stunning system (CAS) path and there can be separate paths that can be chosen. The birds can be removed from the original baskets in which they were placed and installed on shackles for further processing. The baskets can then be sent through a cleaning process as reflected by step 618. The cleaned baskets can then be transported to a hatchery 620 and a new batch of DOC can be installed into the baskets and the process can repeat itself.

Figure 7:
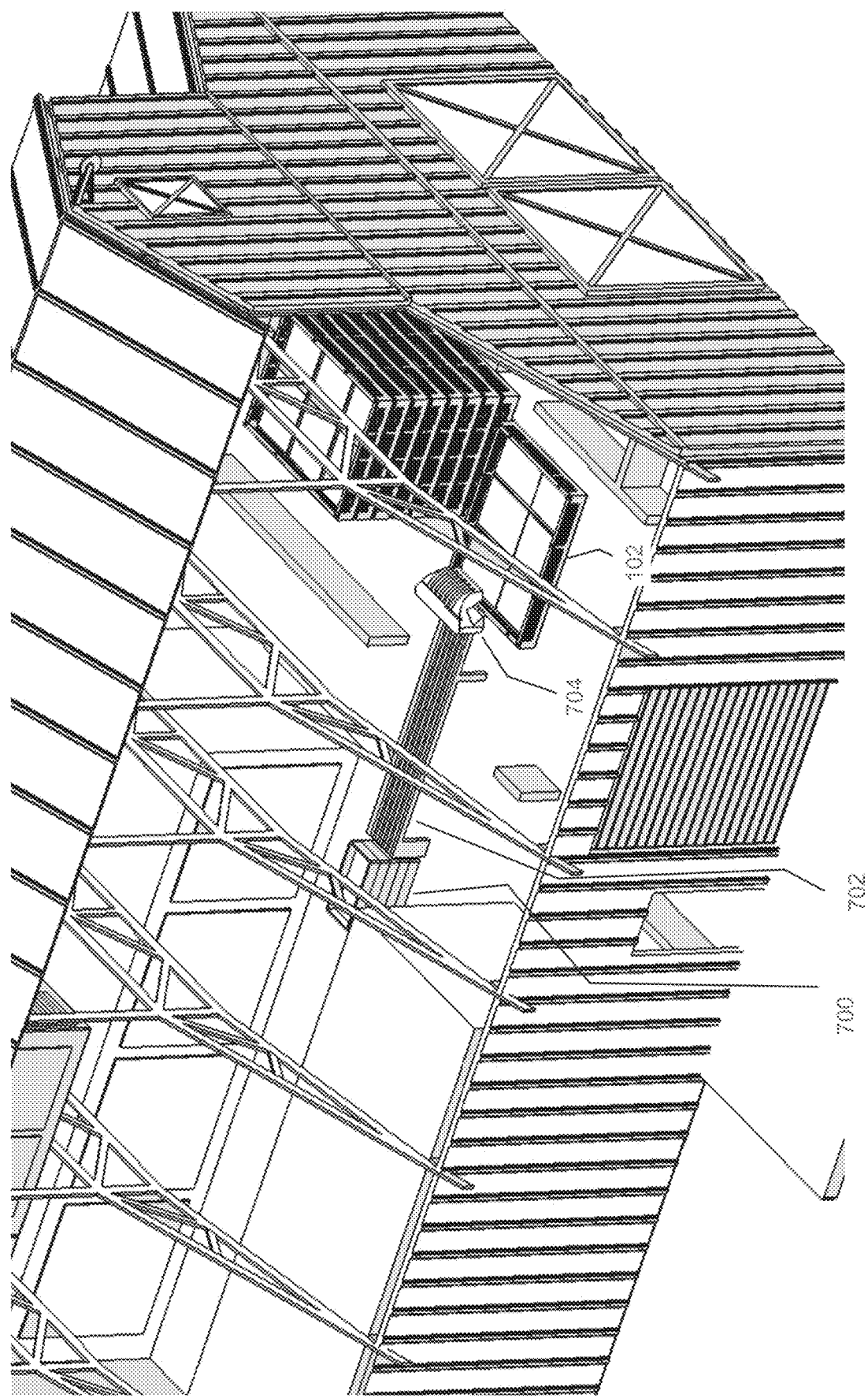
FIG. 7 is an illustration of the hatchery conveyor, DOC counter and egg shell separator.

Referring to FIG. 7, an illustration of the hatchery conveyor is shown. FIG. 7 is an illustration of a hatchery system where groupings of DOC 700 can be placed on a conveyor system 702 and transferred into colony baskets by a transfer system 704 and the baskets filled with DOC can then be stacked and transferred to a growing house containing a colony system. The transfer system 704 installs the DOC in a basket and separates the DOC from the shells that remain after the bird hatches.

Figure 8:
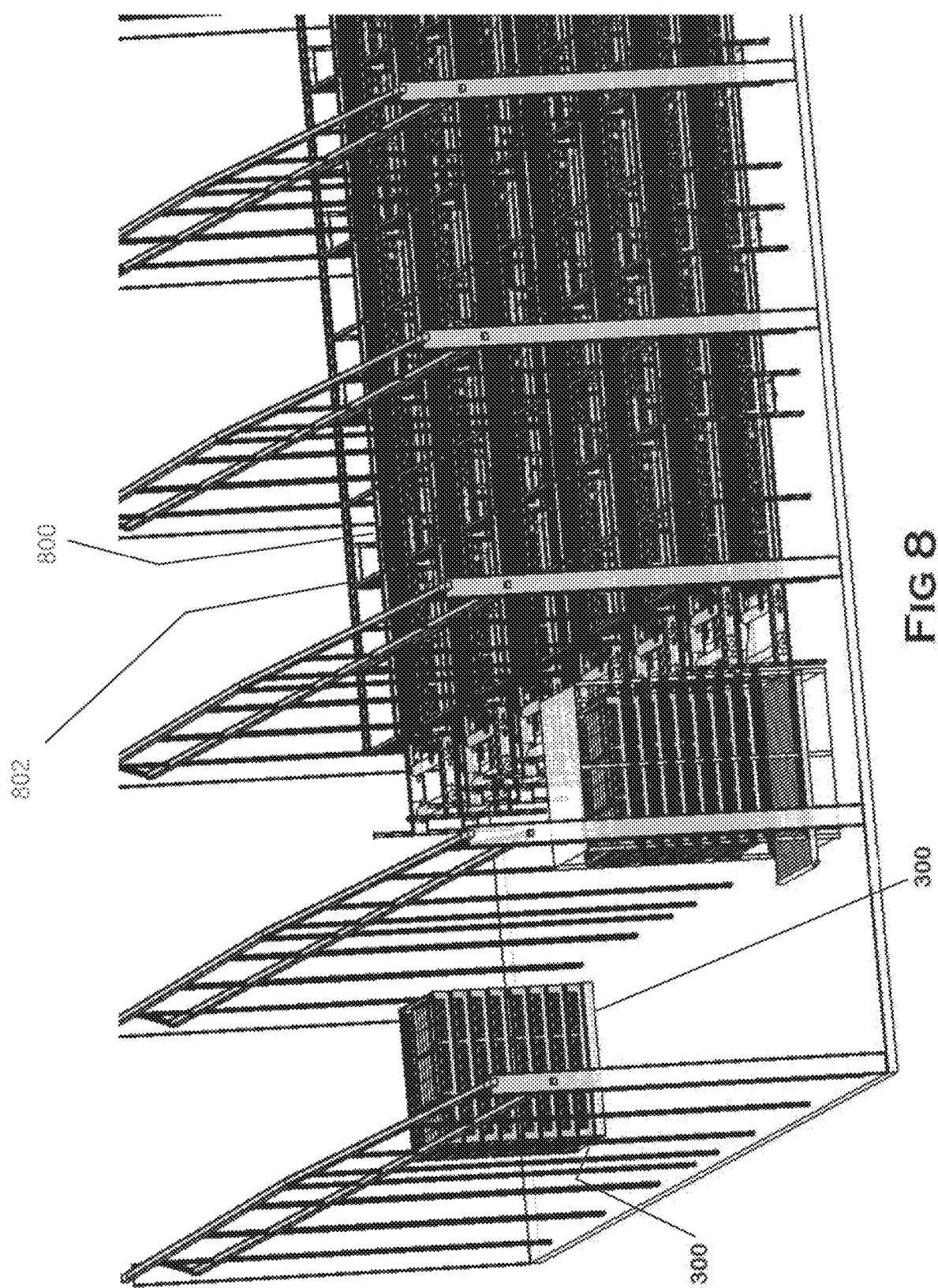
FIG. 8 is an illustration of a colony system.

Referring to FIG. 8, an illustration of a colony system is shown. FIG. 8 is an illustration of a colony system where rows of rack assemblies 800 are aligned side-by-side in which colony systems are installed as reflected by Items 800 and 802 respectively. A rack assembly 300 can be utilized for transferring the colony baskets from the rack to the colony system. The colony baskets can be longitudinally installed within the colony system for the growing process. The colony basket stacks 200 can be installed on wheeled platforms for transporting the colony baskets stacks as reflected in the illustration.

Figure 9:
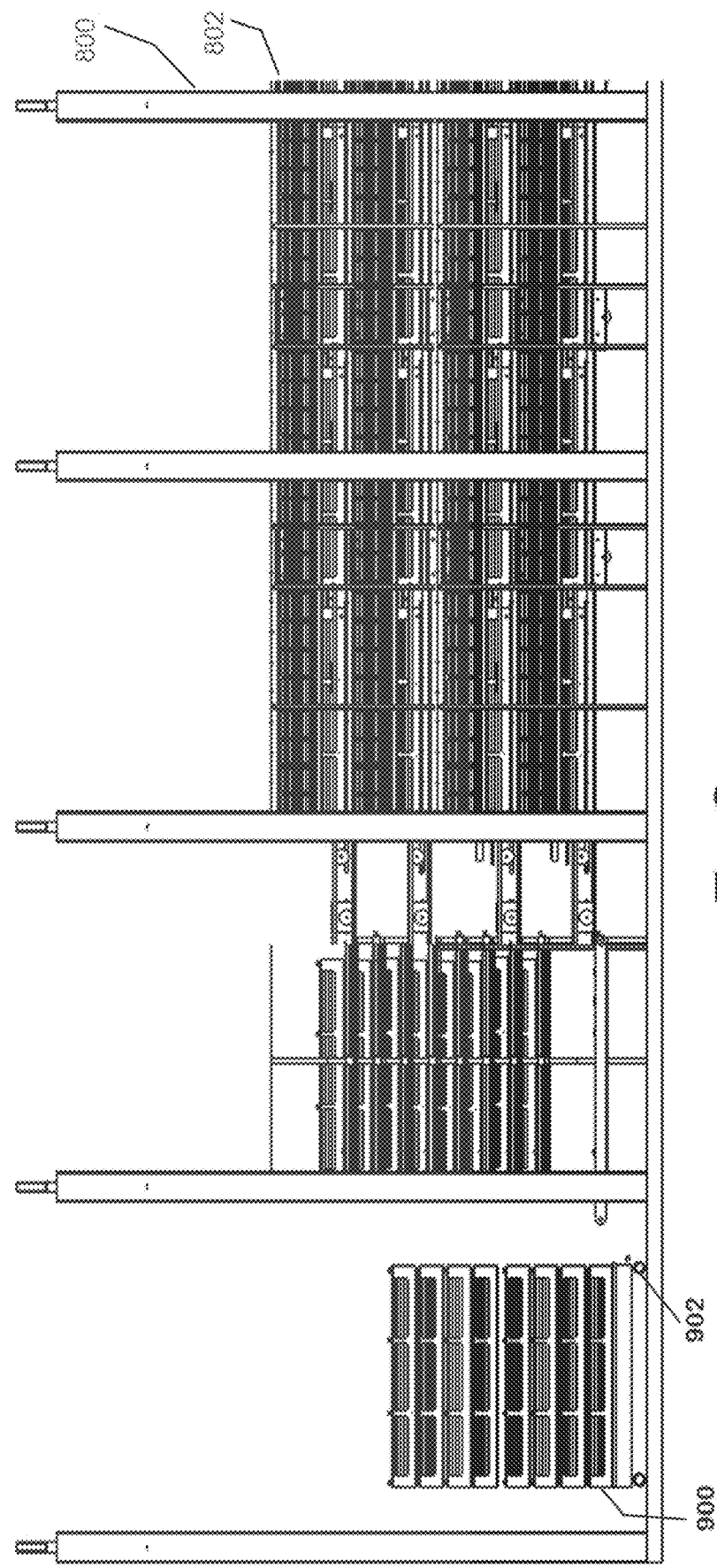
FIG. 9 is an illustration of loading colony baskets from a rack to a colony system.

Referring to FIG. 9, an illustration of loading colony baskets from a rack to a colony system is shown. FIG. 9 is a further illustration of transferring a colony basket stack 900 on a wheeled platform 902 to a colony rack 302 for insertion of the colony baskets into the colony system as reflected by Items 800 and 802.

Figure 10:
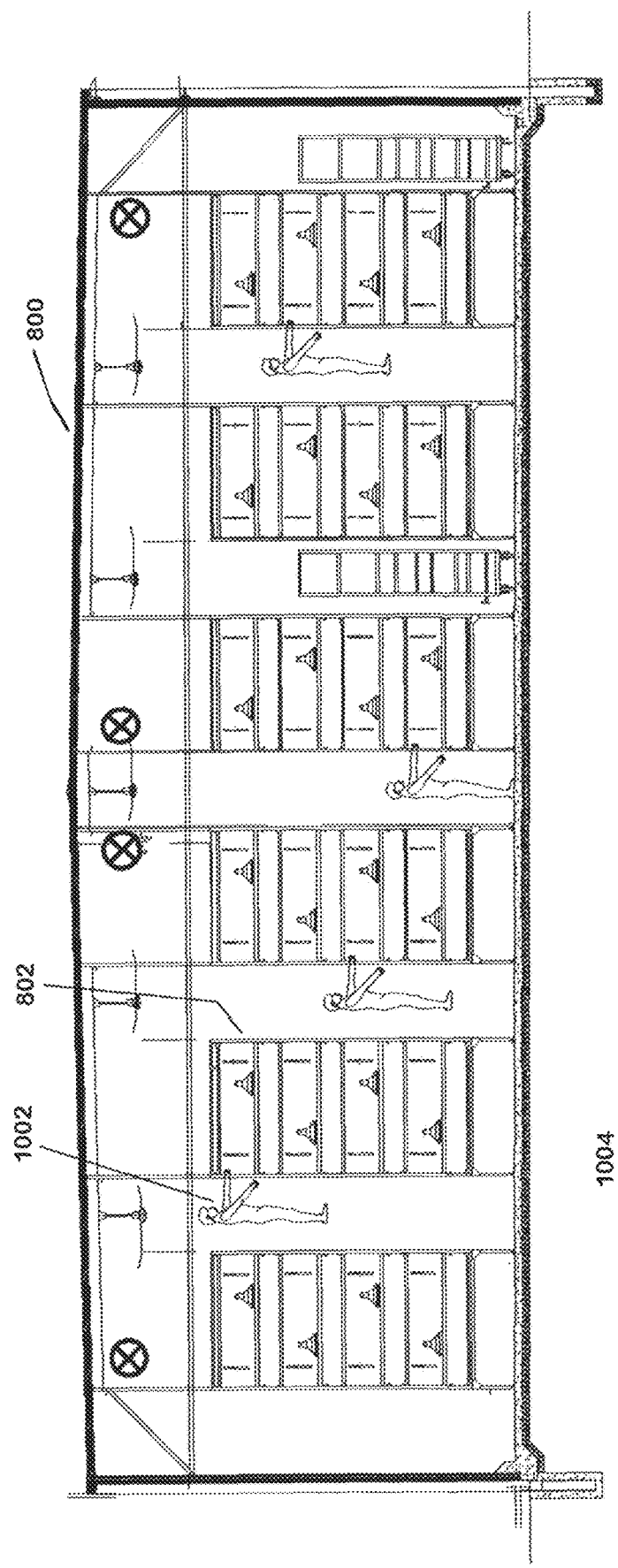
FIG. 10 is an illustration of the colony system operation.

Referring to FIG. 10, an illustration of the colony system operation is shown. FIG. 10 is an illustration of the growing process in operation whereby workers 1002 utilizing platforms 1004 can tend to the growing process by maintaining the watering and feeding systems. The water and feed assemblies are shown in an elevated position above the basket. When the assemblies are elevated, the baskets can be readily inserted and removed.

Figure 11:
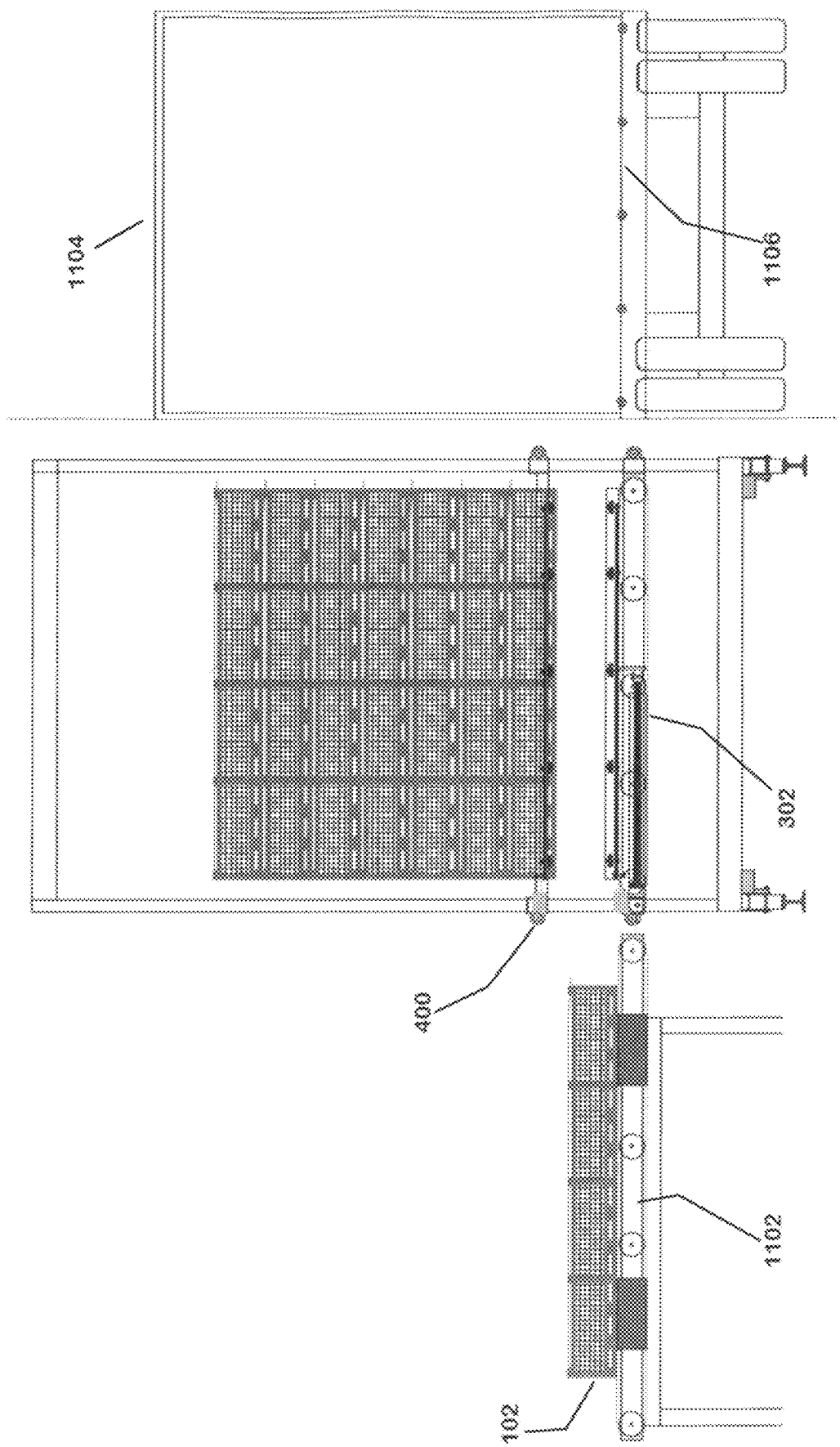
FIG. 11 is an illustration of a transport loading system.

Referring to FIG. 11, an illustration a transport loading system is shown. FIG. 11 is an illustration of transferring colony baskets 102 from a colony system into a rack assembly 300 for transfer into the transport 1104 having a flatbed 1106. The colony baskets 102 can be transferred by a transfer conveyor 1102 into a rack assembly 300. The rack assembly 300 can then be utilized to load the transport 1104 by placing the colony basket stacks on the flatbed of the transport.

Figure 12:
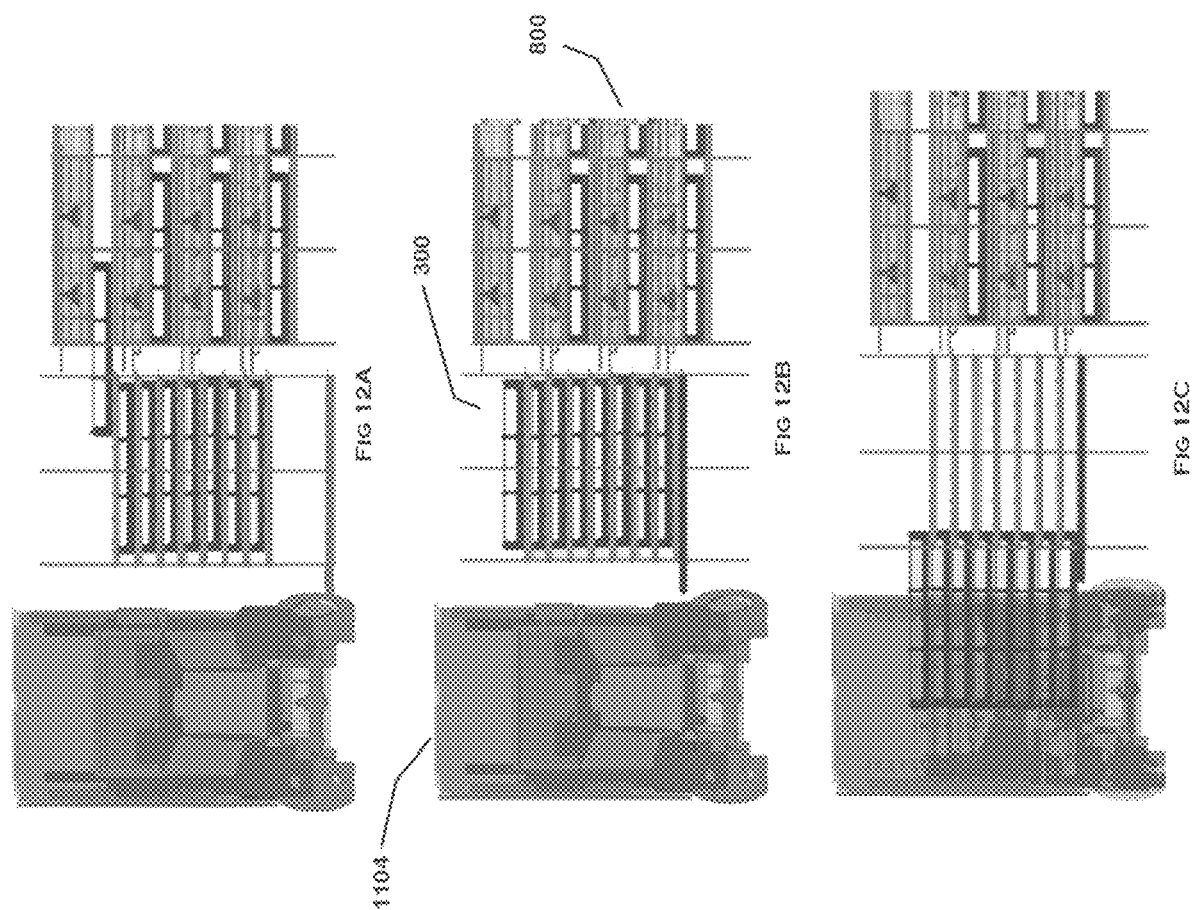
FIGS. 12A, 12B and 12C are an illustration of loading a transport.
Figure 13:
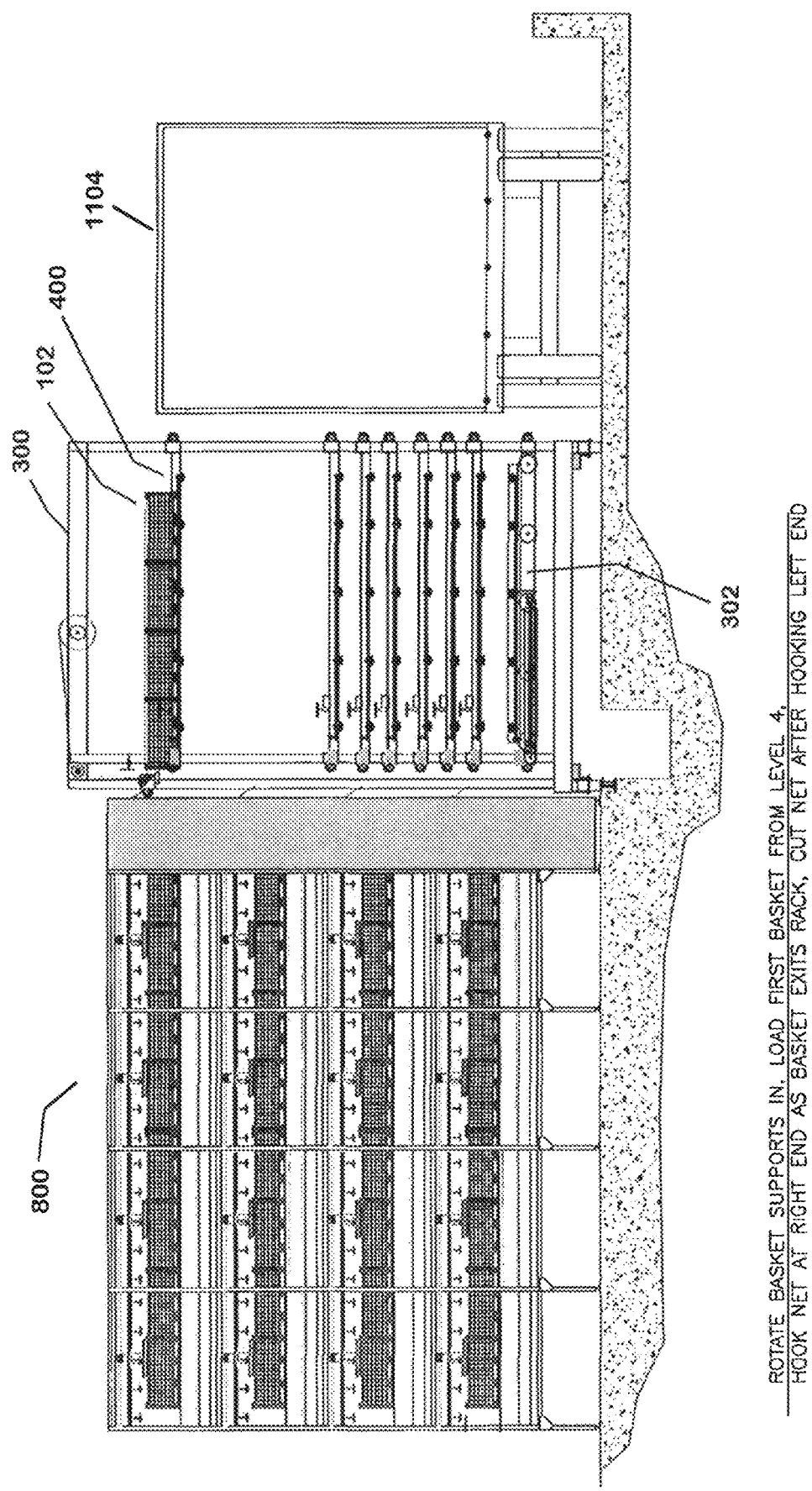
FIGS. 13, 14, 15, 16, 17, 18 and 19 are an illustration of transferring colony basket stacks from a colony system to a trailer.

Referring to FIG. 12A-12C, an illustration of loading a transport is shown. FIGS. 12A-12C is a further illustration of transferring colony baskets from the colony system onto a rack assembly for placement on a flatbed of a transport.

Figure 14:
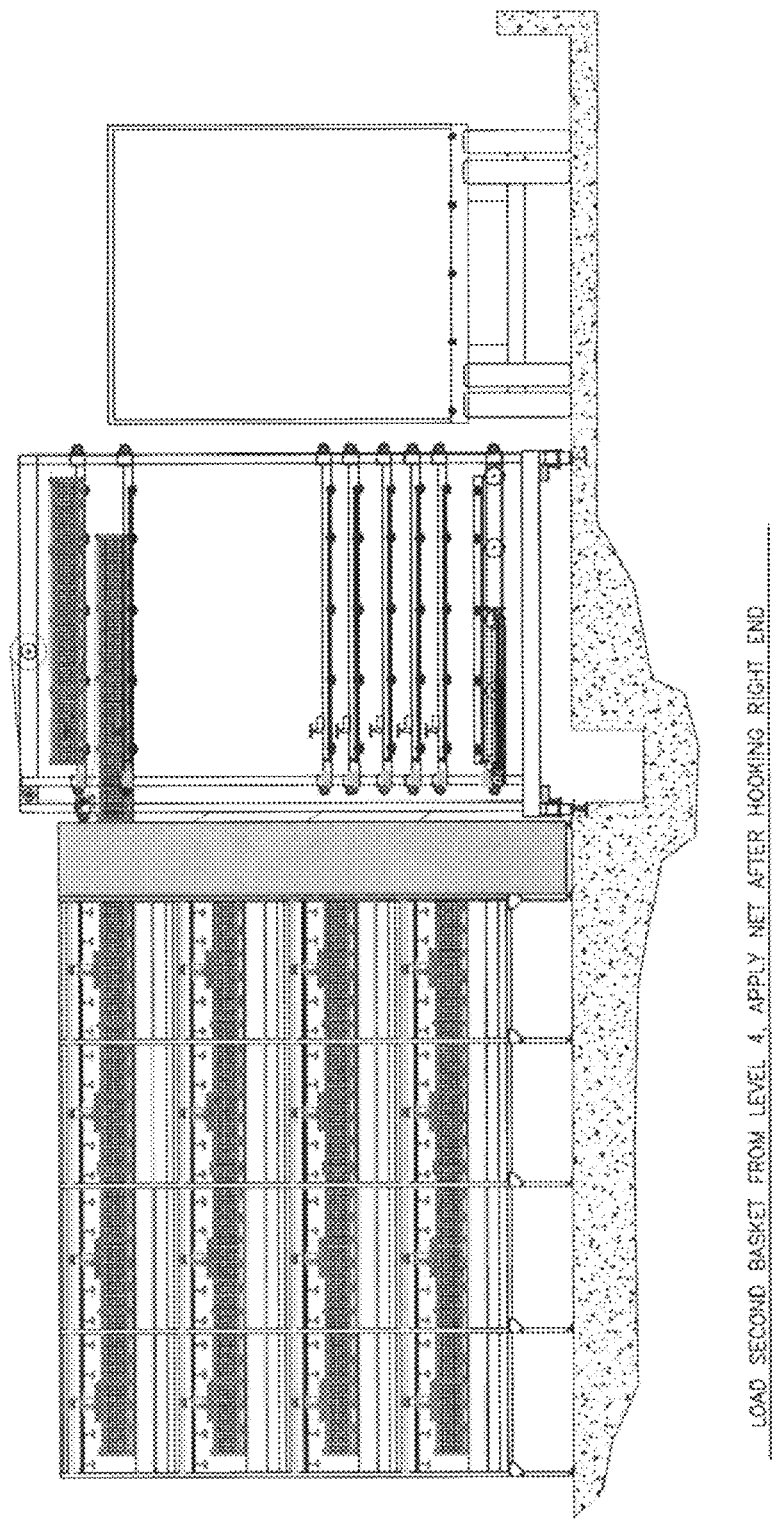
Figure 15:
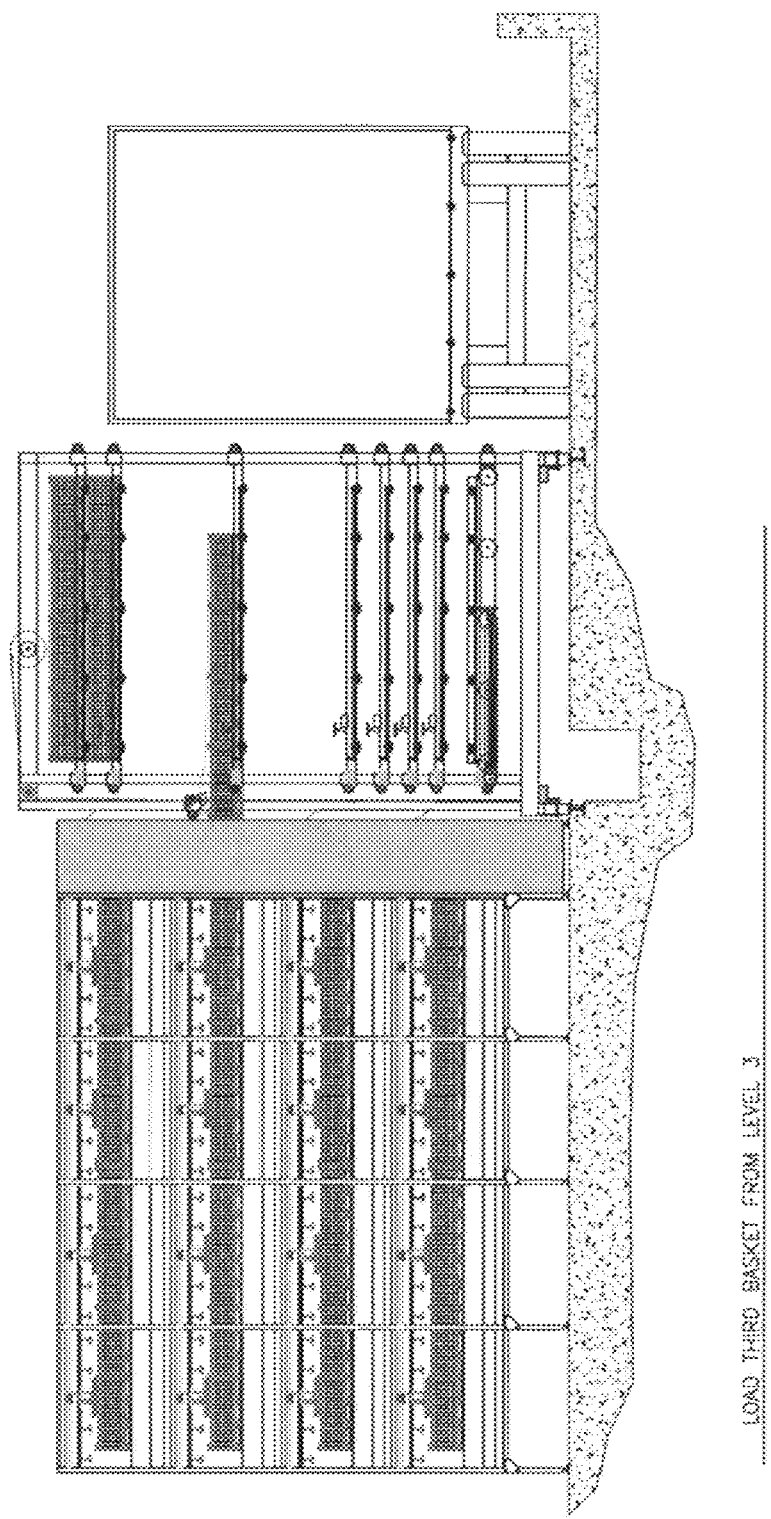

Referring to FIG. 13-19, an illustration of transferring colony basket stacks from a colony system to a trailer is shown. FIGS. 13-19 provide an illustration of a step-by-step process for transferring colony baskets from the colony system onto the flatbed of a transport. As illustrated, the basket supports 400 are rotated to receive the first colony basket from level 4. The basket is loaded onto the basket support and a netting material can be installed or draped over the top of the colony basket 102 to retain the birds therein. FIG. 14 illustrates loading a second basket from level 4 and again applying a netting or other covering material over the top of the basket. FIG. 15 illustrates loading a third basket from level 3 and again applying the netting material and draping over the top of the basket. This process is repeated for each of the levels of the colony system as two baskets are loaded from each level and then stacked with the previously loaded baskets.

Figure 16:
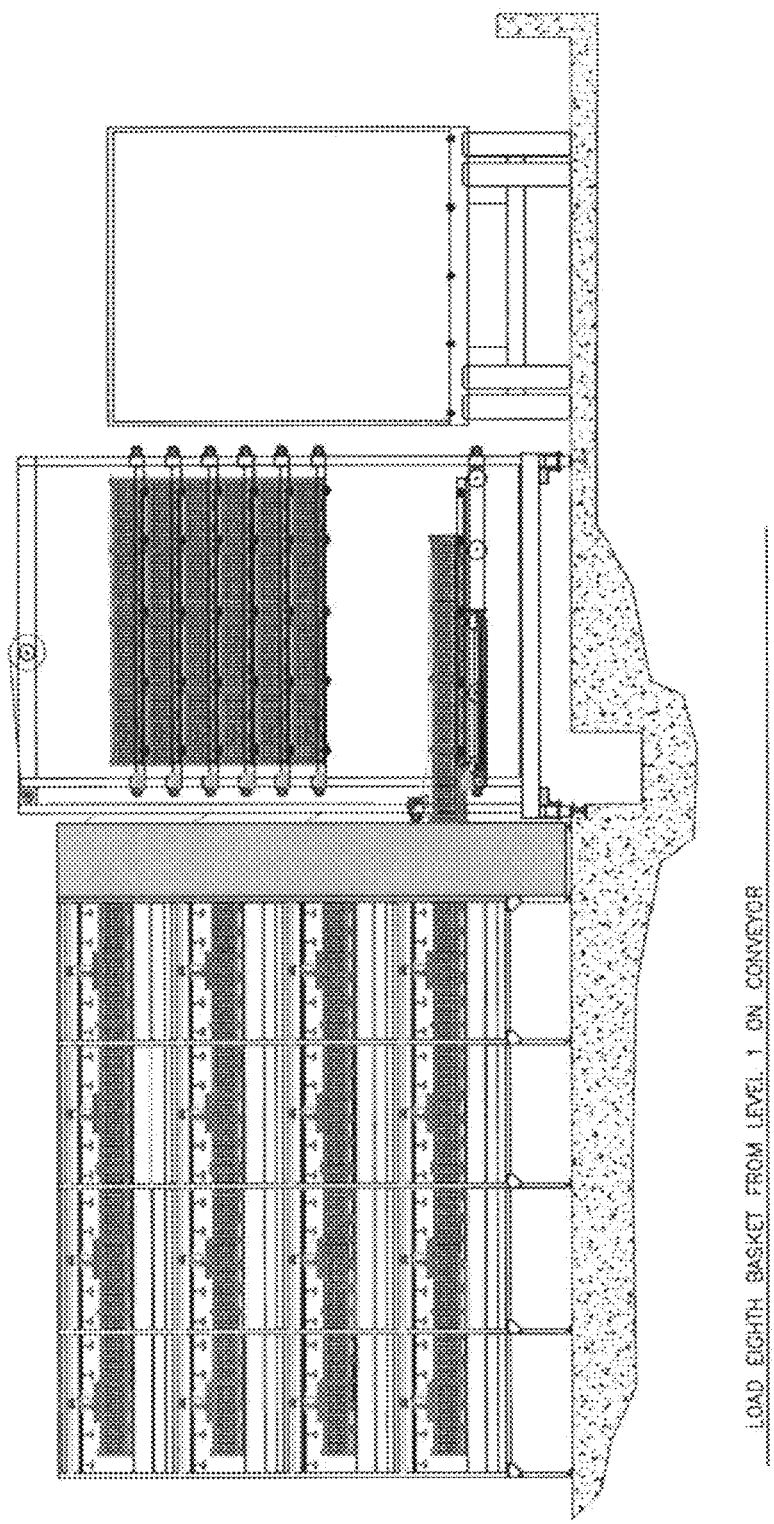
Figure 17:
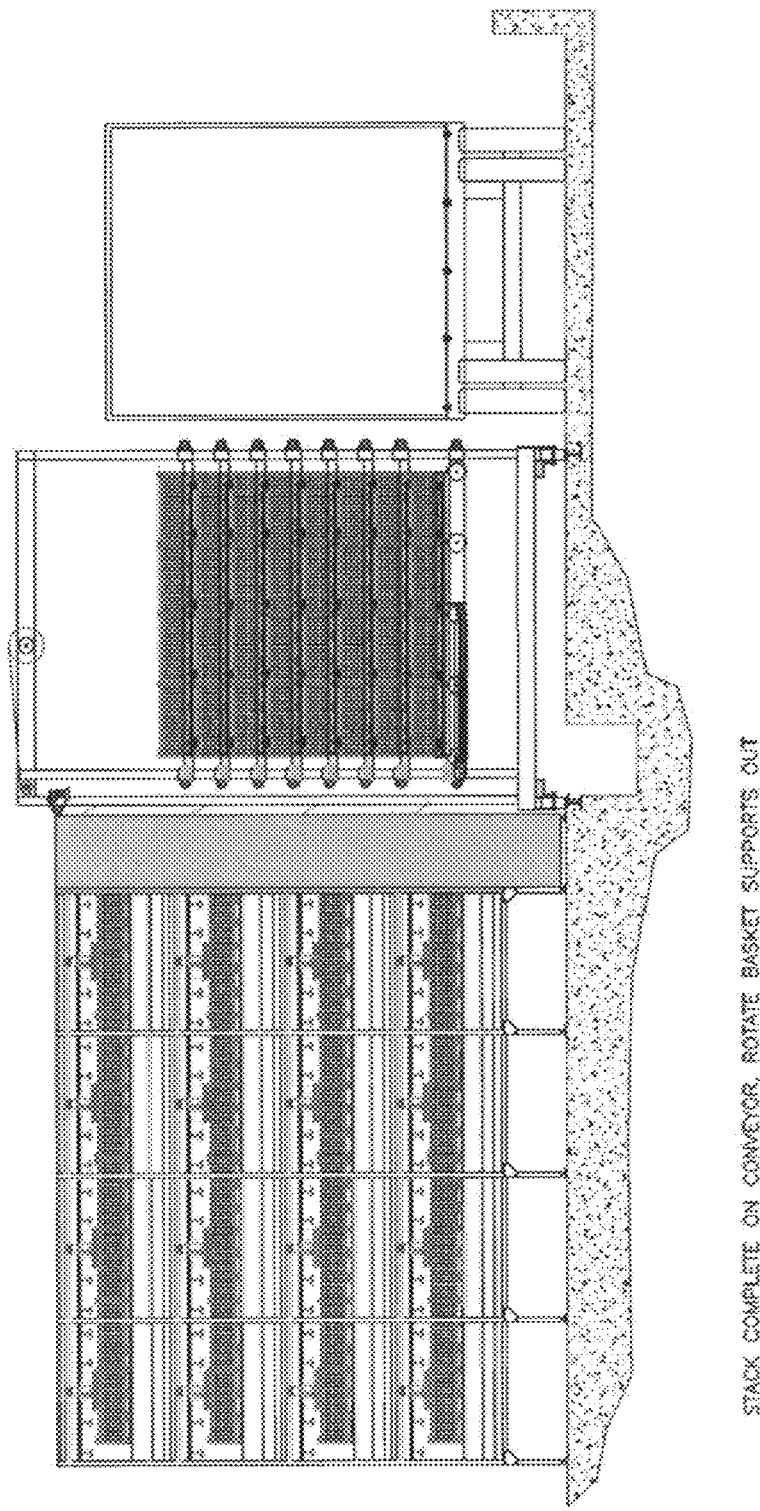
Figure 18:
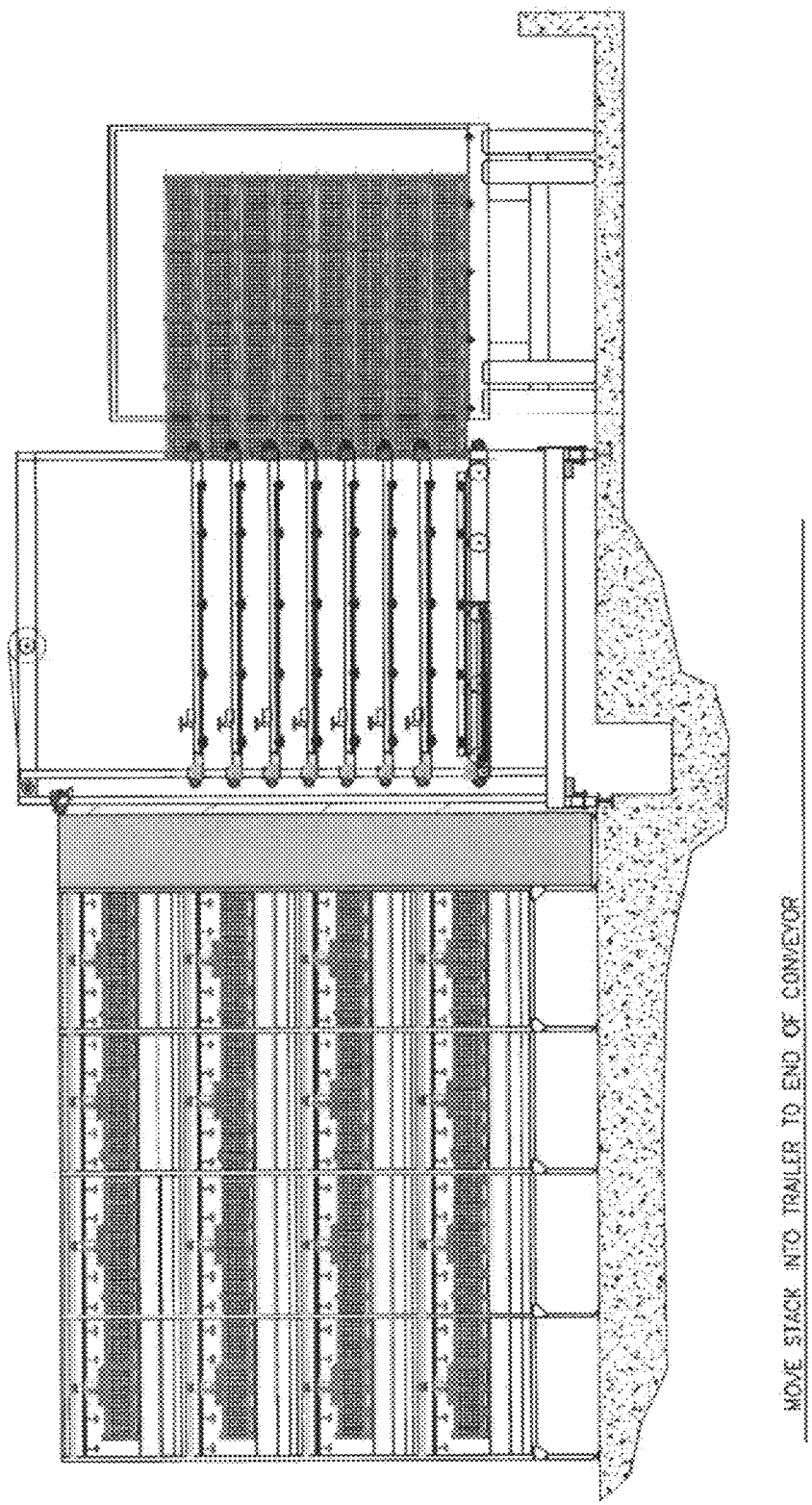
Figure 19:
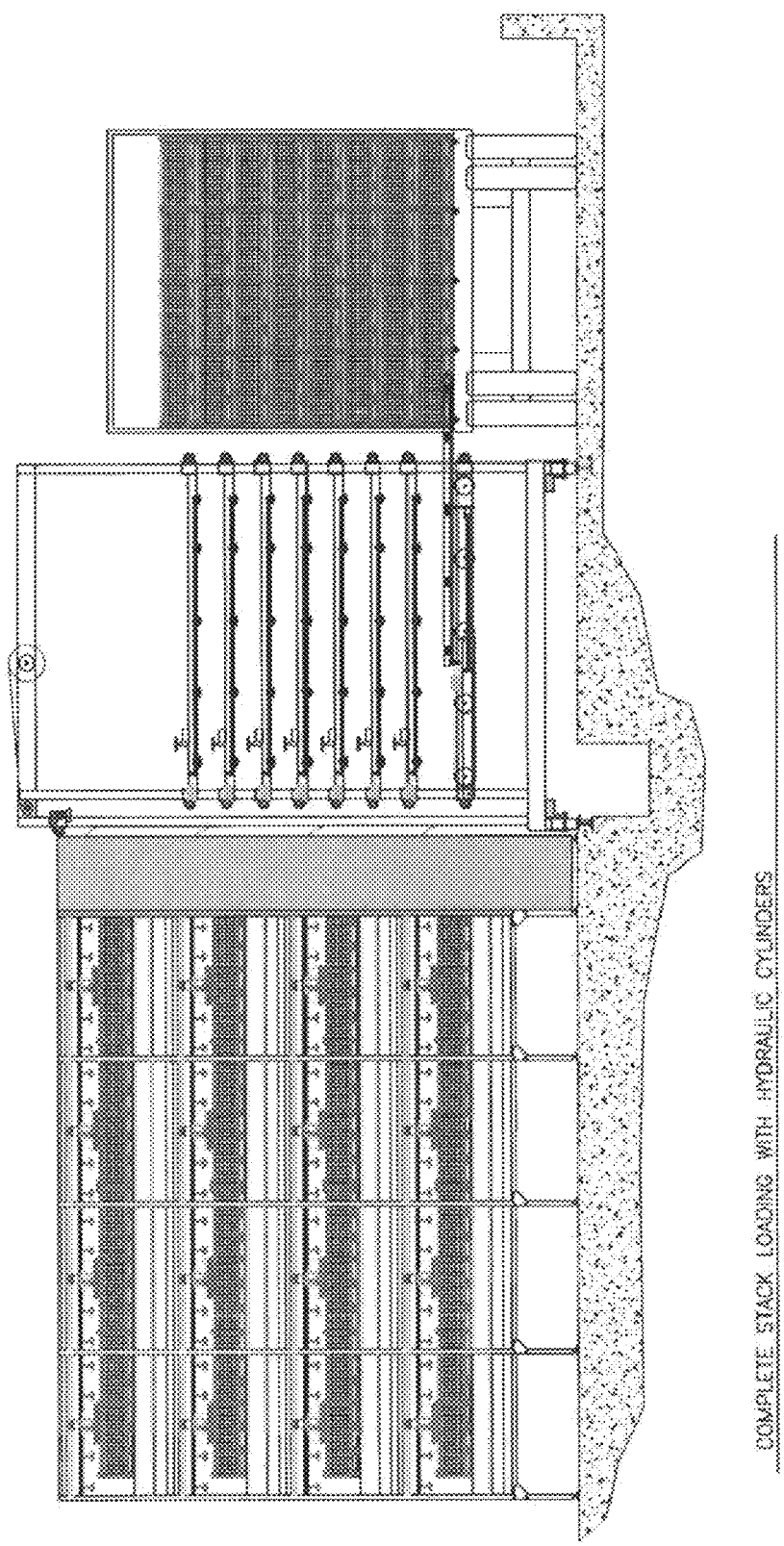

FIG. 16 reflects loading the eighth and final basket from level 1 onto the rack transfer conveyor assembly for subsequent stacking of the colony baskets. When a complete stack has been loaded, the basket supports can be rotated outward such that the rack transfer conveyor assembly can begin transferring stacks onto the transport. FIG. 17 illustrates the completed stack and ready for rotating the basket supports outward to ready the loading of the basket stacks onto the transport. FIG. 18 illustrates the rack transfer conveyor assembly conveying the basket stacks onto the flatbed of the transport. FIG. 19 illustrates the completion of the stack loading utilizing the hydraulic cylinder extension arm 1902 for placing and loading the stack onto the flatbed of the transport.

Figure 20:
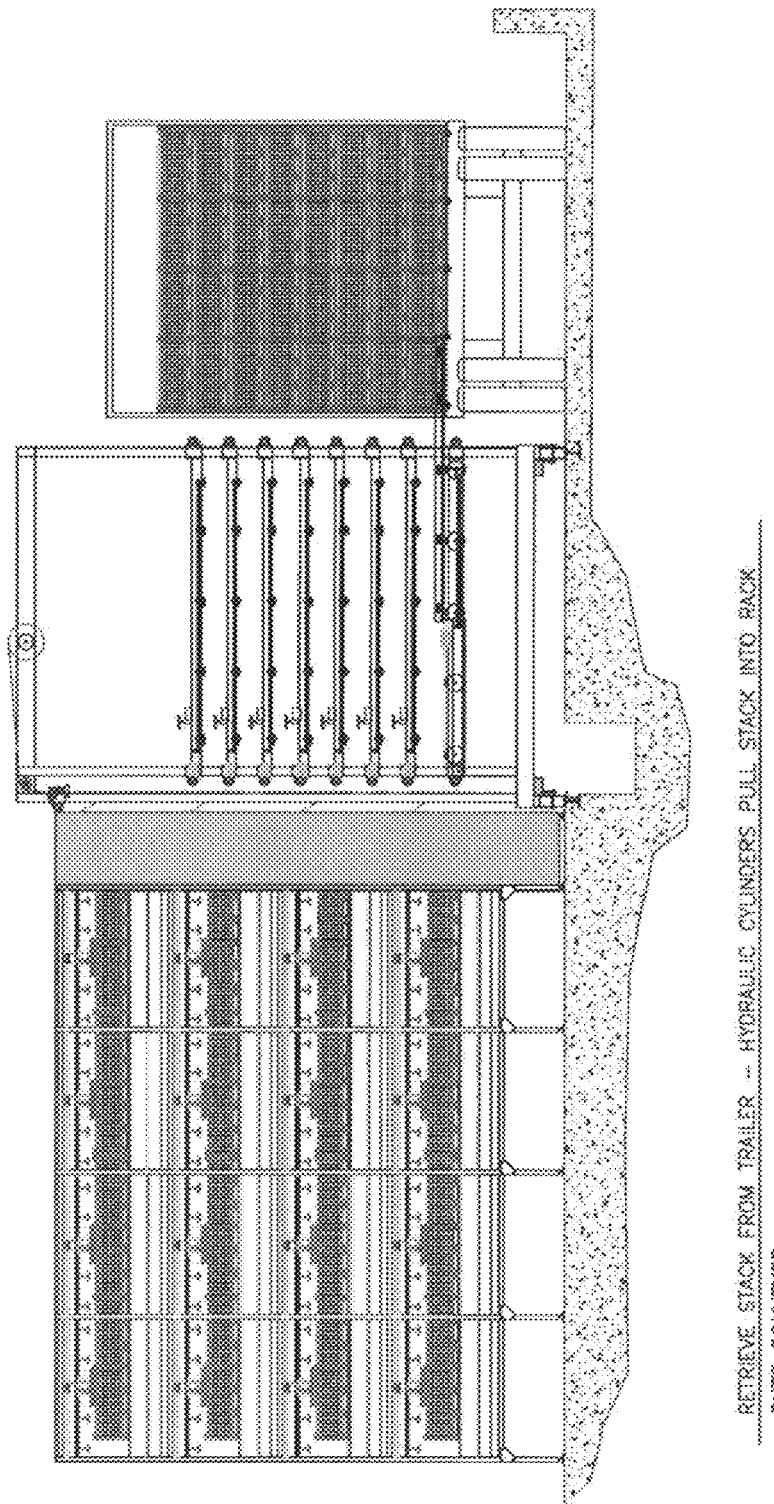
FIGS. 20, 21 and 22 are an illustration of retrieving colony basket stacks from a trailer.
Figure 21:
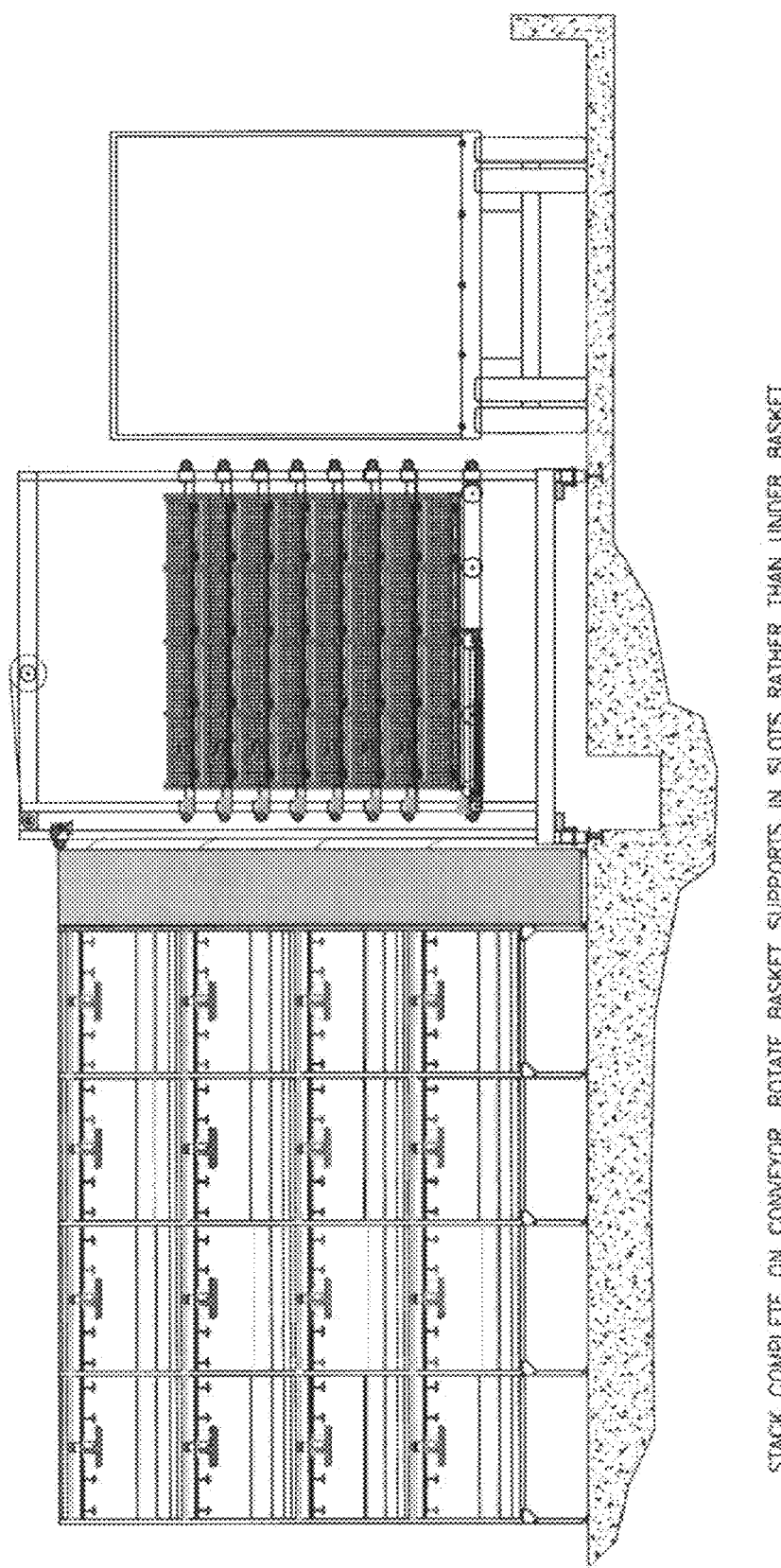
Figure 22:
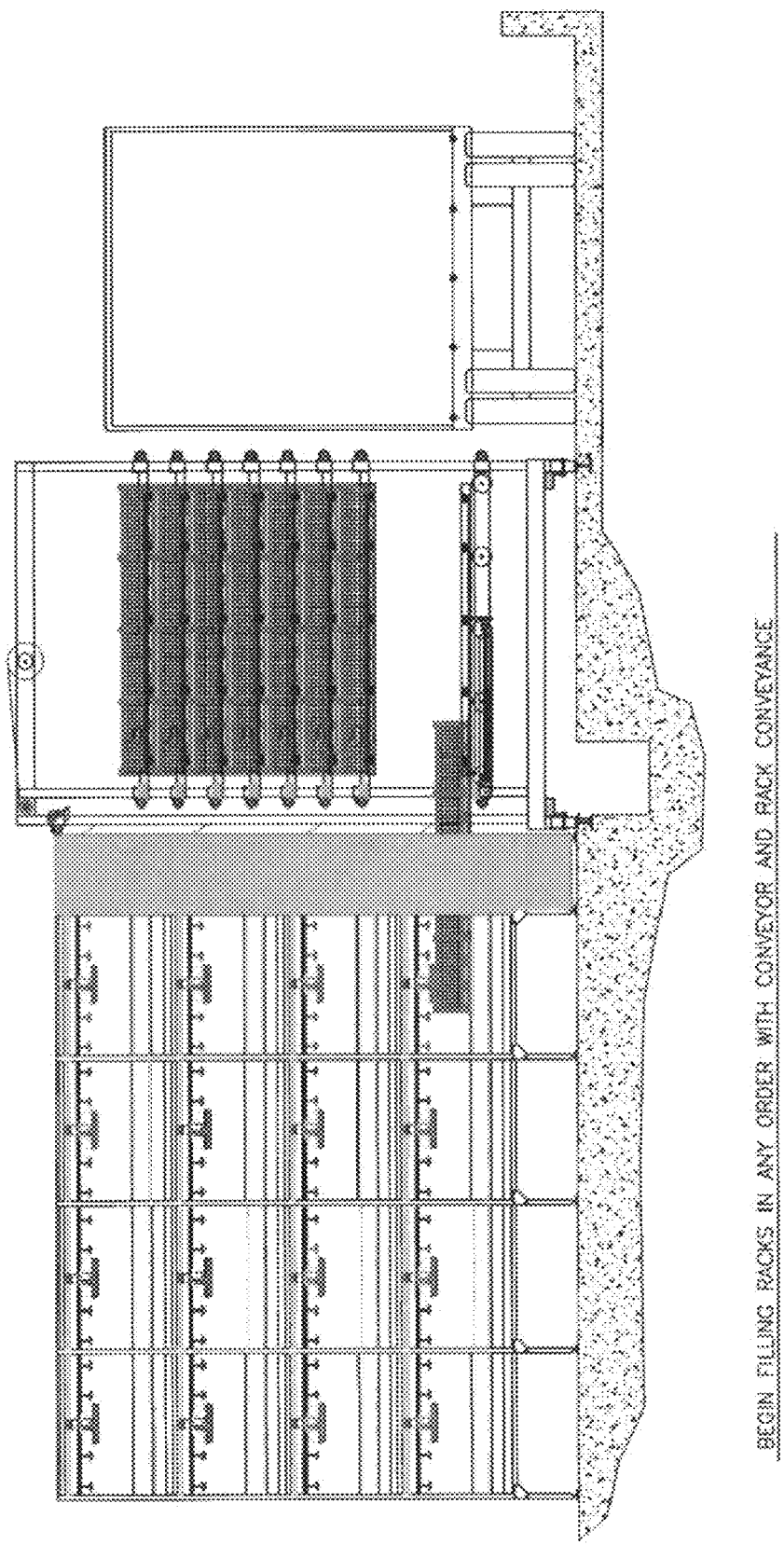

Referring to FIGS. 20-22, an illustration of retrieving colony basket stacks from a trailer is shown, which is essentially the reverse of the process for loading a trailer. FIG. 20 is an illustration of subsequently retrieving the basket stacks from the trailer using the hydraulic cylinder arm to engage and pull the stack onto the rack assembly. The hydraulic cylinder arm pulls the stack onto the rack and onto the conveyor for subsequently engaging the support transfer racks for installing and longitudinally inserting the basket into the colony system. FIG. 21 illustrates the beginning of the process for transferring the basket stacks into the colony system. The transfer support racks can be rotated to engage the colony baskets to begin the process of transferring the baskets into the colony system. A reversal of the previous process can be performed by installing two colony baskets per level, beginning with level 1 and moving upward to level 2, 3 and 4. FIG. 22 is an illustration of this process.

Figure 23:
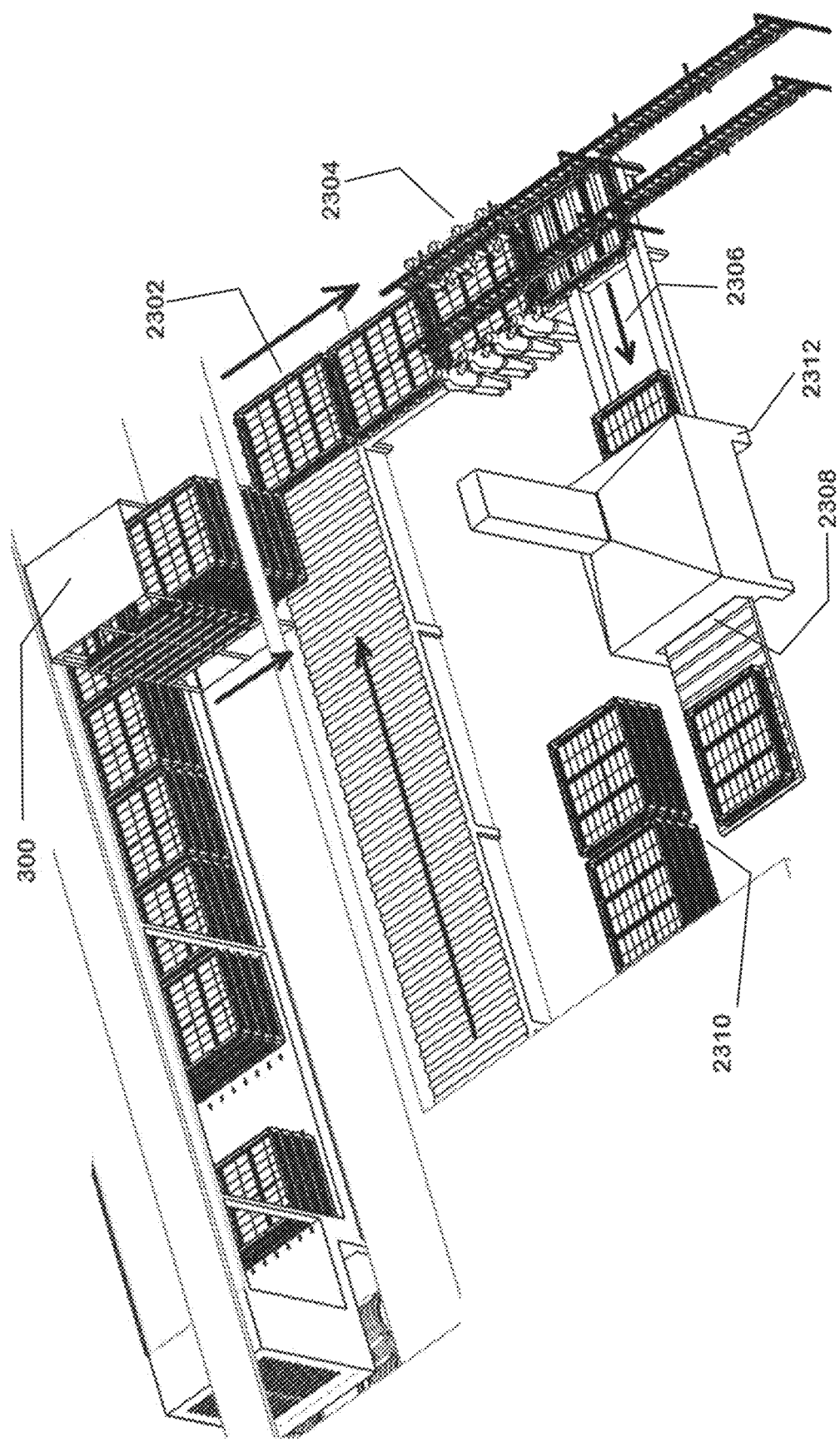
FIGS. 23 and 24 are an illustration of transferring colony baskets to a kill line.
Figure 24:
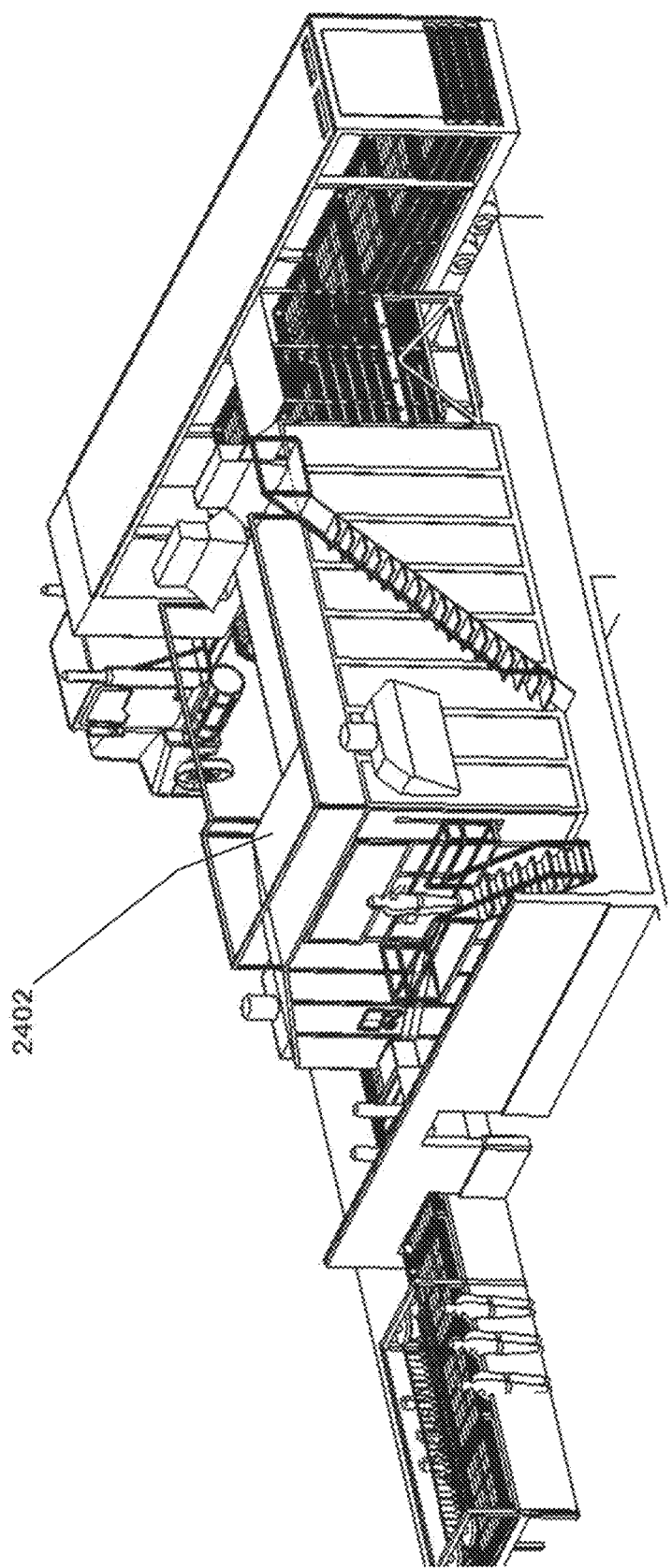

Referring to FIGS. 23-24, illustrations of transferring colony baskets to a kill line are shown. FIG. 23 is an illustration of transferring the colony baskets from the transport to the rack assembly 300 and then transferring the colony baskets onto the colony basket entry conveyor 2302 to convey the colony baskets to the rendering station 2304. Once the birds have been unloaded from each colony basket, the empty colony basket can then be transferred to the colony basket exit conveyor 2306. The colony baskets can then proceed through and along the colony basket wash conveyor 2308 which carries the colony baskets through the colony basket washer 2312. The colony baskets once they are washed can then be reconfigured in a colony basket stack 2310 where the process can be started again.

FIG. 24 is an illustration of a colony basket entry station 2402 which is another embodiment for transferring the colony basket stacks from the transport to the rendering station.

Figure 25:
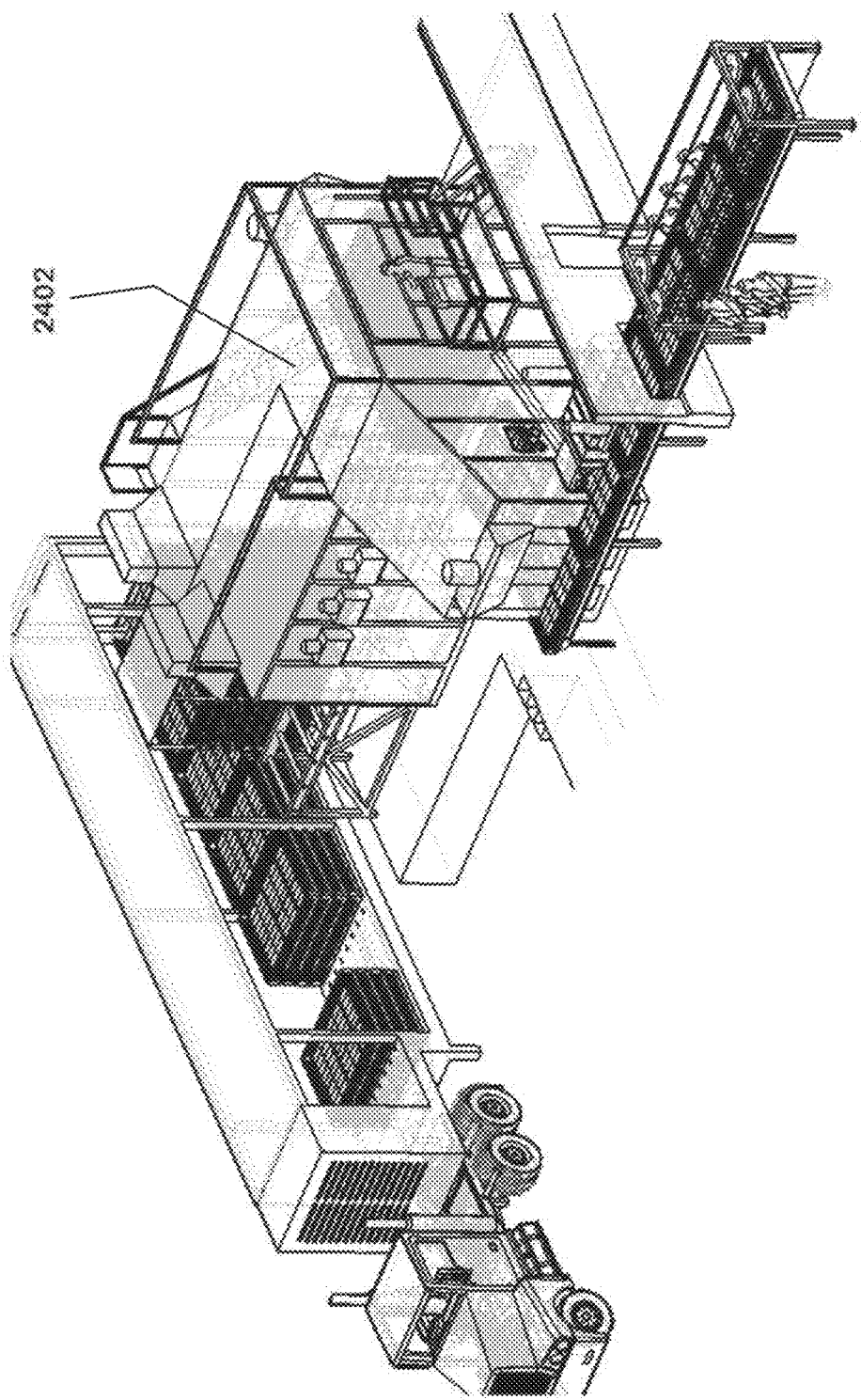
FIGS. 25 and 26 are an illustration of colony baskets traveling through the kill line and the cleaning station.
Figure 26:
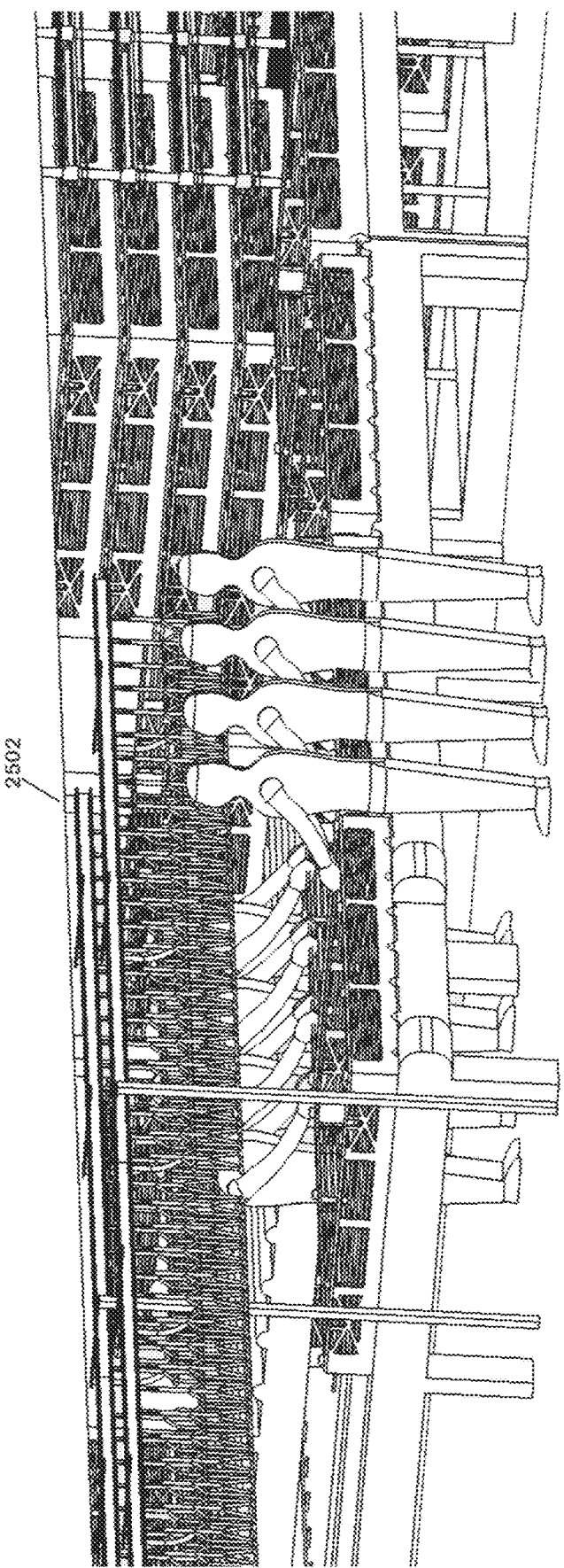

Referring to FIGS. 25-26, an illustration of colony baskets traveling through the kill line and the cleaning station is shown. FIG. 25 is a further illustration of the rendering or kill line whereby workers remove the birds from the colony baskets and hang the birds on the hanging conveyor shackles 2502.

The process can begin at the hatchery where a grouping of birds (for example DOC) are gathered and placed into a colony basket. A plurality of baskets can be stacked on over top of another for transport. A netting material can be shrouded over each colony basket to assist in containing the birds. The grouping of birds and their respective colony basket in which they are placed can remain in the same colony basket throughout the process until they are removed as broilers at the kill station. This reduces the handling of the birds to avoid injury and helps to prevent the spread of bacteria or disease between bird groupings. The grouping of DOC can be transported to a growing house in the same colony basket in which they were originally placed at the hatchery, where the poultry are grown for future processing. At the growing location there can be a series of growing colony racks for housing the colony baskets with the original grouping of birds placed therein at the hatchery. At the growing facility, the colony baskets can be integrated with water and feed channels and watering and feed troughs. The colony baskets can have a specific configuration to integrate with the watering and feeding systems as outlined herein in order to assist poultry going through the growth process and assist the operators at the growing facility for attending to the birds. When the poultry have completed the growth process, now in the broiler stage, they can be transported to a location for processing as a final food product. A transport can arrive at the growing location to receive the poultry that have completed the growth process. The transport system can be a truck and trailer combination. The trailer can be a standard flatbed trailer on which colony baskets containing the fully grown poultry can be loaded. The colony baskets containing the original grouping of birds, or some subset thereof, can be transferred from the colony racks of the colony system to the flatbed of the transport. A netting material can be shrouded over each basket before it is stacked in order to assist in retaining the bird. The colony baskets can be stacked one atop another. The transport can be loaded with the fully grown birds and transported along a travel route to an unloading station at a processing facility. The transfer system for transferring the colony baskets from the colony racks to the flatbed can be automated as described herein.

The unloading station can include an automated unloading system for automatically unloading a colony basket stack from the trailer for storage in an adjacent storage area of the processing facility. Tray stacks can be conveyed to a storage location having a climate controlled storage facility for housing the poultry in the stacked configuration prior to the rendering process. The storage area can be operated on a first in first out system such that a given colony basket stack does not dwell in the storage area for an extended period of time. The storage area can also have a system for controlling and tracking the weight of the tray stacks which could ultimately provide weight information regarding the fully grown poultry.

Within the storage facility there can be an automated unstacking system for unstacking the colony basket stacks for conveyance through the processing facility. There can be a stunning system utilized including a gaseous environment for stunning the poultry or it can include an electric shock stunning system or a combination of the two. If a gaseous environment stunning system is utilized, the gaseous environment can be a multi-stage stunning system where the first stage(s) can be a combined induction phase and the second stage(s) can be the combined stunning phase. This system can generally be referred to as a controlled atmosphere stunning system or CAS. Once the colony baskets containing the original grouping of birds/poultry have transitioned through the stunning system, the poultry can be unloaded from the trays at an unloading station. The unloading station can comprise an automated unloading system which is operable to tilt the colony baskets sufficiently to remove the stunned poultry from the colony baskets. This is the first point in the process that the birds are removed since their original placement into the colony basket at the hatchery as DOC. Once removed from the colony baskets, the stunned poultry can be conveyed to a shackling station where the poultry can be hung from a shackle conveyor for being conveyed to a plant evisceration facility.

As described the colony baskets can be stackable. Further the colony basket can have an interwoven wire mesh elevated floor above the colony basket bottom floor where the mesh openings are sufficiently large for debris to pass therethrough and also providing a means for the bird to grasp hold in order to stabilize itself and the mesh floor can be flexible in order to avoid injury to the birds. The frame of the colony baskets include various portions including perimeter top and bottom rim flanges and upright vented side walls. The upward facing surface portion of the upper perimeter top rim flange can be designed to be complimentary with respect to the downward facing portion of the bottom perimeter rim flange. This complimentary configuration can be designed such that the trays interlock when they are stacked thereby resisting longitudinal and latitudinal movement of the trays with respect to each other.

The stackable tray can be constructed having a top rim flange and a bottom rim flange, which defines the longitudinal and latitudinal dimensions of the tray. The top and bottom rim flanges can have L-shaped cross sections. The inner perimeter of the top rim flange can define an upper opening or upward facing opening through which birds can be easily inserted. The bottom rim flange defines the perimeter of the lower or downward facing opening closed off by the solid floor. The solid floor can have elevators for elevating the mesh floor proximately above the solid floor. The mesh flooring is designed with vented openings where the openings are sufficiently large to allow debris to pass there through. The flexible mesh floor design provides for a surface that can be grasped by the talons of a bird without injury. Upright side walls can be attached around the perimeter of the tray and attached to support members. The inner perimeters of the top rim flange and the bottom rim flange, which define the upper and lower openings respectively, can have substantially the same geometry.

The top rim flange can include stabilization standoffs which can extend vertically. The top rim flange can have on an upper surface a vertical standoff. The flange and the complementing recessed receptacle on the underside of the colony basket when engaged, one with respect to the other in a stackable fashion, they can resist longitudinal and latitudinal shifting of trays, one with respect to the other. Also, the stabilization standoffs can be placed along the latitudinal and longitudinal sides of the top rim flange. The spacing between the longitudinal, the latitudinal, and the corner upright support ribs define the vented openings of the tray. The spacing between the support members and the height of the support members can be optimized depending on the type of bird being contained within the stackable trays.

For stacked colony baskets the uppermost colony basket can have a top cover or a netting installed of the uppermost colony basket. The top cover can have a mesh screen for covering the opening of the uppermost tray. The perimeter of the mesh screen can be defined by the top cover flange. The top cover flange can have recessed receptacles for interfacing with the raised standoffs of the uppermost tray.

The colony basket stacks can be transitioned to the transport and loaded on the flatbed by way of a transfer rack or loading dock or other means for loading the colony basket stacks. Vertically protruding standoffs can be provided on the flatbed for and dimensioned to be received by the recessed receptacles of the lower most colony basket in a stack. The transport can have a shroud covering for better controlling the environmental exposure of the poultry. The shroud covering can be supported by transport side rails. One or both of the side panels of the shroud covering can be a retractable curtain for exposing the flatbed from either side. The shroud covering can also have a rear transport cover opening and or a side transport cover opening through which colony baskets can be loaded.

The stacked colony baskets can be loaded through the transport cover opening by sliding them along tray tracks which extend along the flatbed. The trailer can be a standard trailer; however, the trailer can have side railings for supporting shroud covering. The top surface of the flatbed can have raised standoffs that conform to the recessed receptacles on the underside of the tray to restrict lateral sliding or movement of the bottom most tray.

The technology described above includes an additional embodiment. In the additional embodiment, the colony baskets described herein above are replaced with modular baskets. The modular baskets may be utilized and integrated interchangeably with the invention described above.

Figure 27:
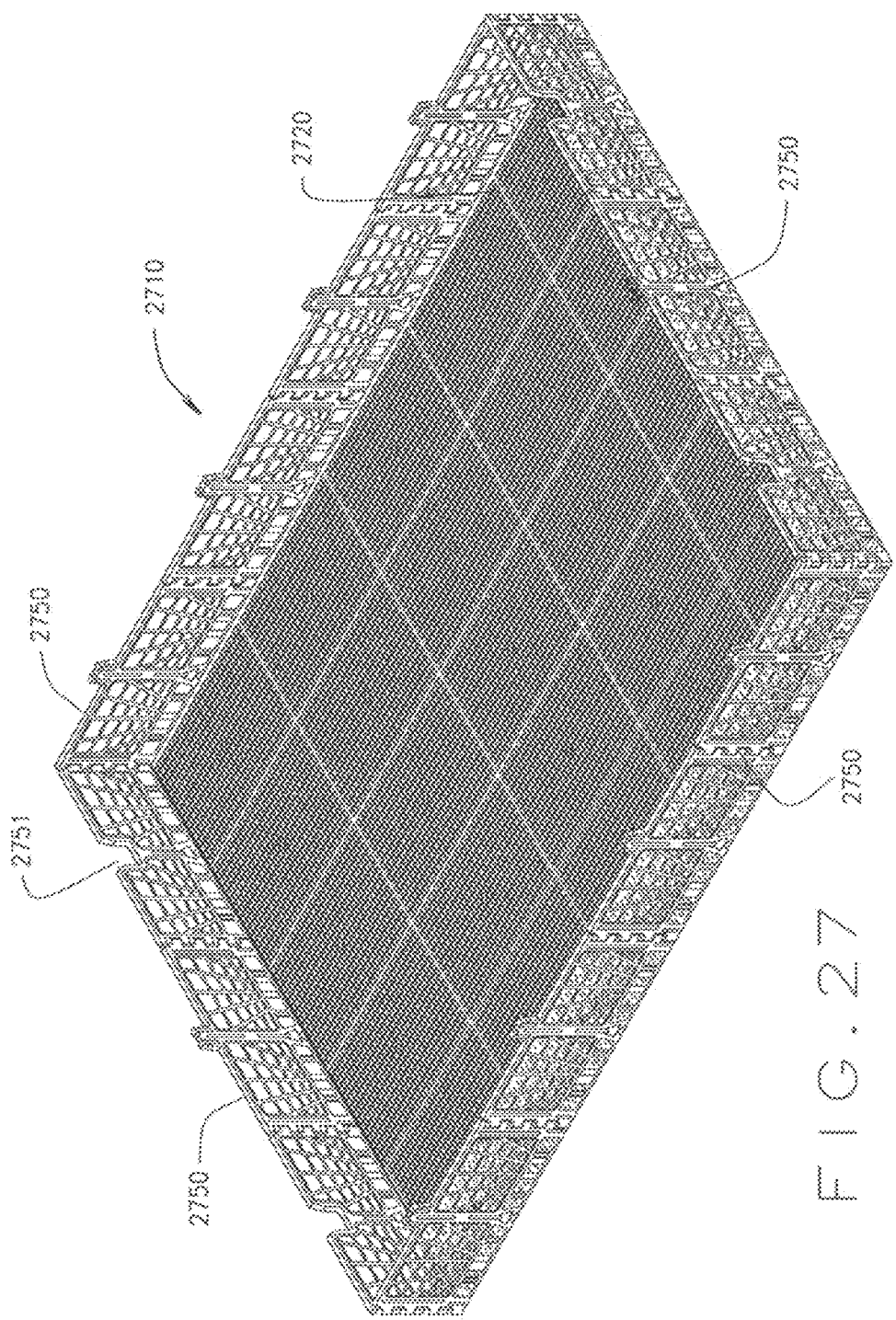
FIG. 27 is a perspective view of an assembled modular poultry raising basket according to the teachings of the present invention.
Figure 28:
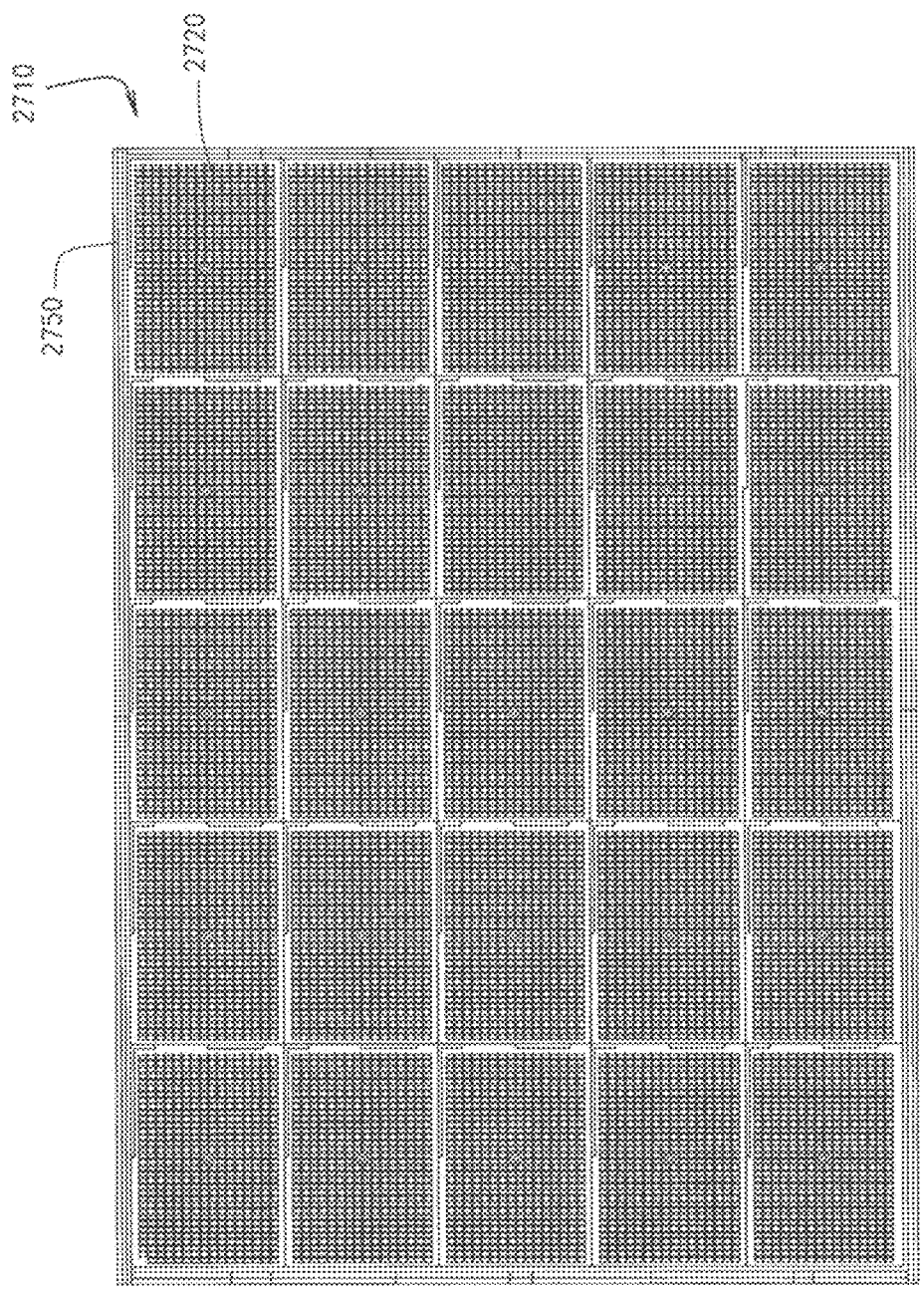
FIG. 28 is a top view of the poultry raising basket of FIG. 27.
Figure 29:
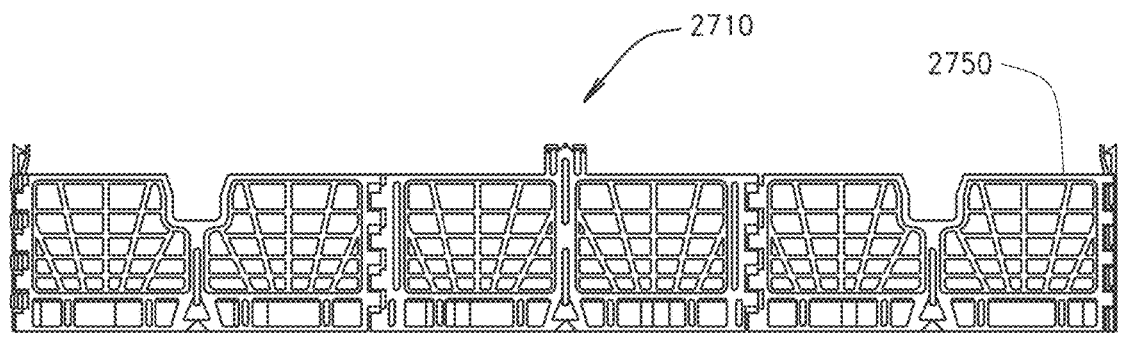
FIG. 29 is a side view of the poultry raising basket of FIG. 27.

FIGS. 27, 28 and 29 illustrate an implementation of a modular basket 2710 suitable for raising poultry or other animals and-or for transporting a product. The illustrative basket 2710 is a modular plastic basket formed of a plurality of interlocking plastic panels. The panels can be formed by injection molding, though other suitable materials and processes may be used to form the panels. In one embodiment, the panels are made of polypropylene and are connected using stainless steel beams. The modular basket 2710 is interchangeable with colony baskets 102 in the invention described herein above and can be fully integrated with other colony baskets in the overall system including integrating with the watering and feeding systems.

Each basket 2710 comprises a floor formed by an array of interconnected molded plastic floor panels 2720. The floor comprises a plurality of corner panels, edge panels and middle panels. Each floor panel can be formed as a flexible mesh panel for allowing animal waste and other debris to drop through while providing a comfortable surface for poultry. In the illustrative embodiment, each floor panels 2720 are identical and formed from the same mold, though the invention is not so limited.

Interconnected side panels 2750 are connected to the floor panels 2720 to form side walls for the basket 2710. As described below, the side panels receive beams that connect the floor panels to each other to connect the side panels to the floor. The side panels have pliable mesh of expanding size. As also described below, the basket 2710 comprises side panels having at least two different, but similar configurations.

The basket 2710 has an open top, though the invention is not so limited, and when the sides are assembled, recesses 2751 can be formed to receive watering and feeding systems.

The basket 2710 is stackable with one or more other baskets to form a vertical, space-saving stack of apartments. Multiple stacks may be arranged within a frame, or arranged side-by-side to form a colony.

The basket as illustrated comprises twenty-five floor panels 2720 and fourteen side panels 2750, though one skilled in the art will recognize that any suitable number and arrangement of panels may be used to form a basket of any suitable size, shape and configuration.

In one embodiment, each floor panel can be between about approximately fifteen and about approximately twenty inches, and one implementation can be between about eighteen and about nineteen inches, by between about approximately twelve and about approximately fifteen inches, and in one implementation can be between about approximately thirteen and about approximately fourteen inches. The side panels have a height between about approximately eight and about approximately twelve inches, and one implementation can be about ten inches and a length between about approximately twenty inches and about approximately twenty five inches.

The basket 2710 as illustrated and described may hold about ten lbs per square foot. The number of birds each basket holds depends on the intended slaughter weight of the bird. In one implementation, the basket 2710 may hold about 90 six pound birds, about 140 four pound birds or about 209 2.2 pound birds.

Figure 30A:
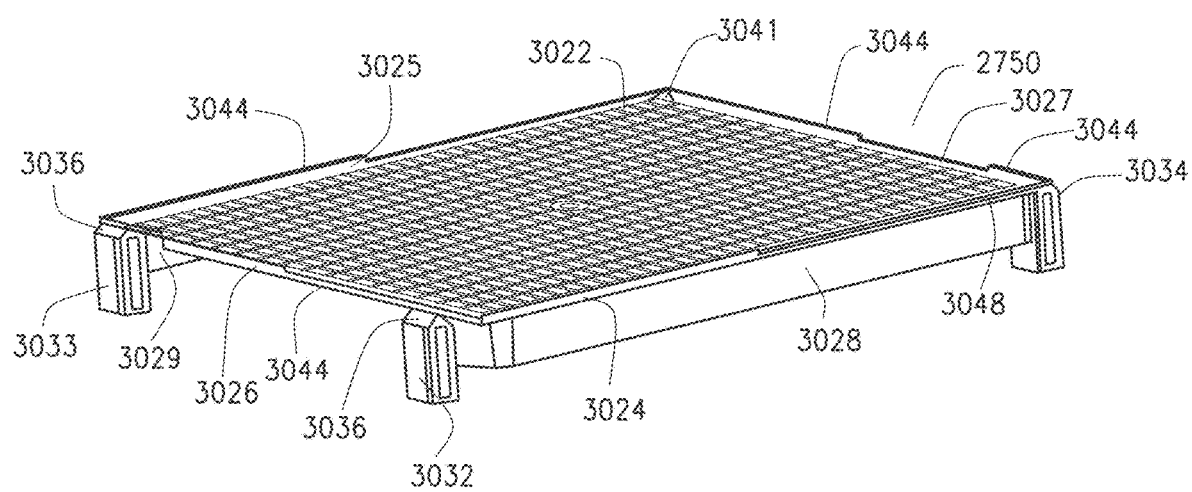
FIG. 30A is a perspective view of a floor panel for the basket of FIG. 27.

FIGS. 30A, 30B, 30C, and 30D illustrate a single floor panel 2720 suitable for forming a floor, or a portion of a floor, of a modular basket 2710. FIG. 31 is a detailed view of a corner of the floor panel 2720. Each floor panel comprises a flexible mesh floor 3022 extending between edges 3024, 3025, 3026 and 3027. A front support beam 3028 extends below edge 3024 and a rear support beam 3029 extends below edge 3025. The strands forming the mesh 3022 preferably have rounded tops to facilitate run off. In one implementation, the strands have a circular cross-section that is between about 0.100" and about 0.140' in diameter. The illustrative strands form square openings 3123 that are between about 0.375" and about 0.615" across, though the invention is not limited to the illustrative size and shape. The flexible mesh floor preferably has a certain flexibility to promote comfort and cleanliness. In one embodiment, the flexible mesh floor deflects about 0.5 inches at size pounds of weight in the center. The flexible floor may be more comfortable for the animals. In addition, the flexing may contribute to dried manure cracking off without requiring additional cleaning.

The edges slope downwards to create a bowl channeling debris through the mesh openings 3023. As shown in FIGS. 30A, 30B, and 31, the corners of each floor panel 2720 form downward sloping ramps 3041 for channeling debris through the mesh openings. The illustrative ramps 3041 are triangular in shape and widen from the top to the bottom.

The center of the floor panel 2720 may be solid for injection molding purposes.

Figure 32:
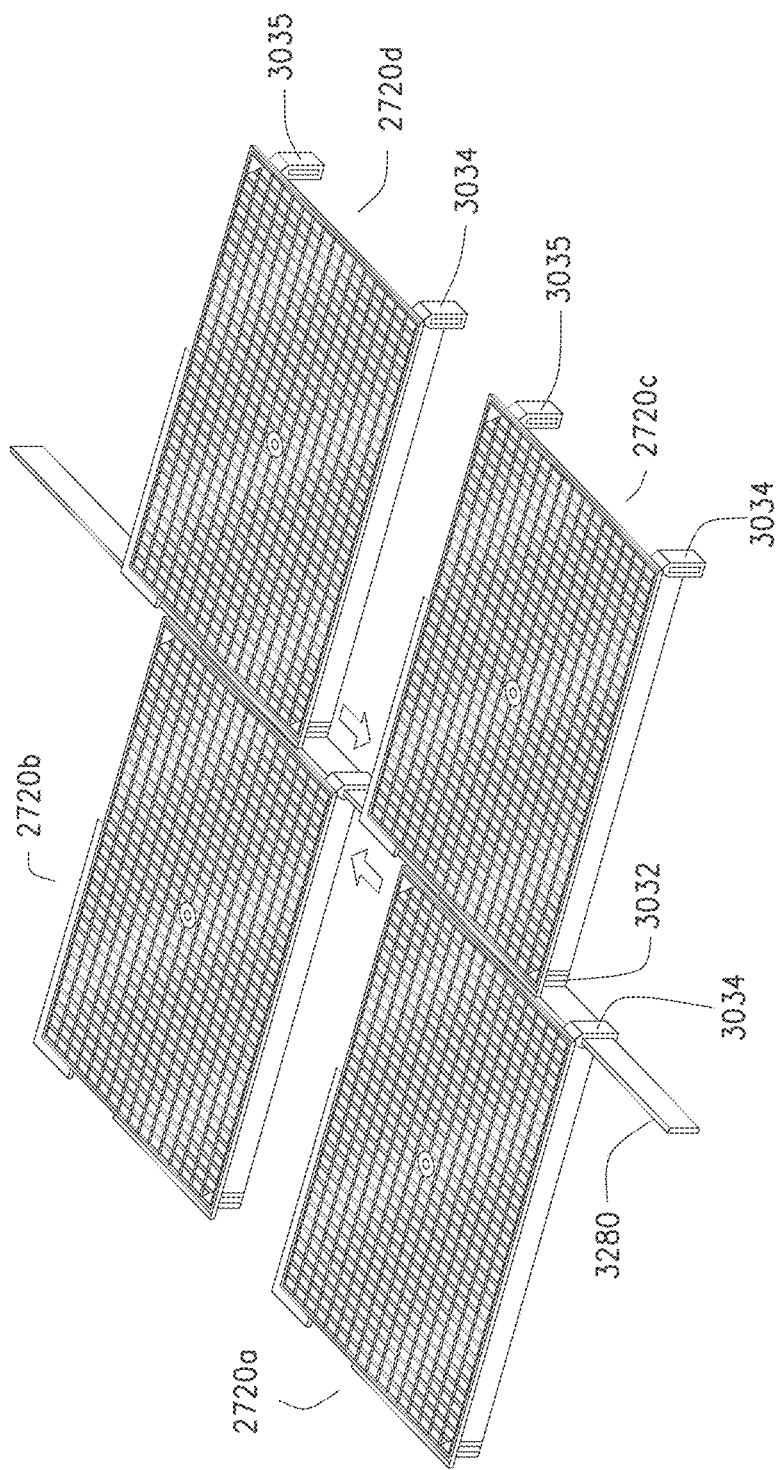
FIG. 32 is an exploded perspective view of assembling four floor panels using a beam for the basket of FIG. 27.
Figure 33:
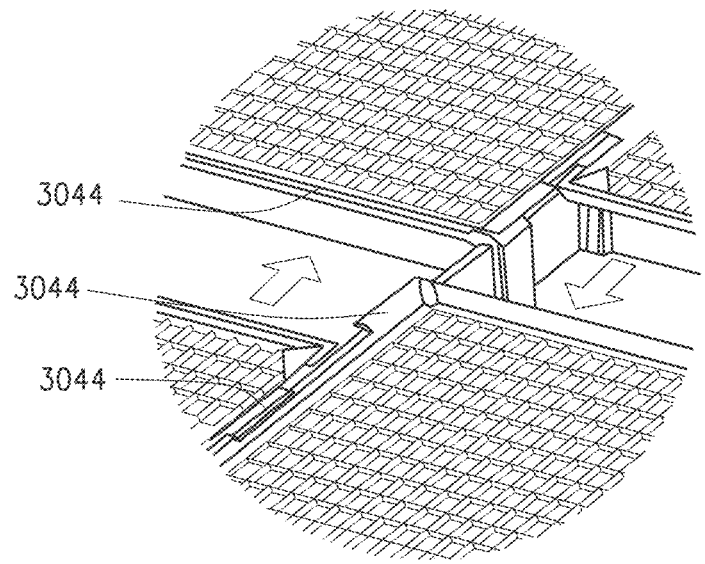
FIG. 33 is a detailed view of the intersection of the four floor panels of FIG. 32.

The floor panels 2720 include hinge elements 3032, 3033, 3034, 3035 extending below the mesh floor 3022 from each end of edges 3026 and 3027. A first pair of hinge elements 3032, 3033 extends down from edge 3026, and a second pair of hinge elements 3034, 3035 extends down from edge 3027. The second pair of hinge elements is offset from the first pair. As shown, hinge 3033 is positioned at a corner of the generally rectangular floor panel, whereas hinge 3032 is offset from the corner of the floor panel thereby allowing hinge 3034 of an interfacing abutting floor panel to be position adjacent hinge 3032 and aligned such that beam 3280 may be inserted through the hinge openings. Similarly, on the opposing side of the floor panel, hinge 3034 is positioned at the corner of the floor panel and hinge 3035 is positioned such that it is offset from the corner of the floor panel. Therefore, hinges 3033 and 3034 at diagonally opposing corners of the floor panel are positioned at the corner and hinges 3032 and 3035 are offset from the corner. FIGS. 32 and 33 illustrate the connection of a plurality of the floor panels 2720 using a beam 3280. As shown in FIGS. 32 and 33, the hinges 3032, 3033, 3034 and 3035 receive a beam 3280 for linking the floor panels together. The illustrative hinge elements include sloped upper surfaces 3036, flat sides and flat bottoms, though the invention is not so limited. Each hinge element includes a hinge opening 3039 for receiving the beam 3280. The illustrative hinge openings 3039 are bone shaped to ease beam insertion and facilitate manufacturability. The illustrative beam 3280 has a rectangular cross-section, but the invention is not so limited.

As shown in FIGS. 32 and 33, a beam 3280 may be used to join two columns of floor panels to form a floor of a basket, such as the basket 2710 of FIG. 27. The illustrative basket 2710 of FIG. 27 has five columns of floor panels 2720 in five rows, connected using six beams 3280, though the basket may comprise any suitable number of floor panels in any suitable arrangement. In addition, the floor may comprise multiple beams 3280 per column. FIGS. 32 and 33 show four floor panels 2720a, 2720b, 2720c, 2720d joined together by aligning the hinge elements 3034 and 3035 of the left floor panels 2720a, 2720b with the hinge elements 3032, 3033 of the right floor panels 2720c, 2720d and inserting a beam 3280 through the aligned hinge elements.

Figure 30C:
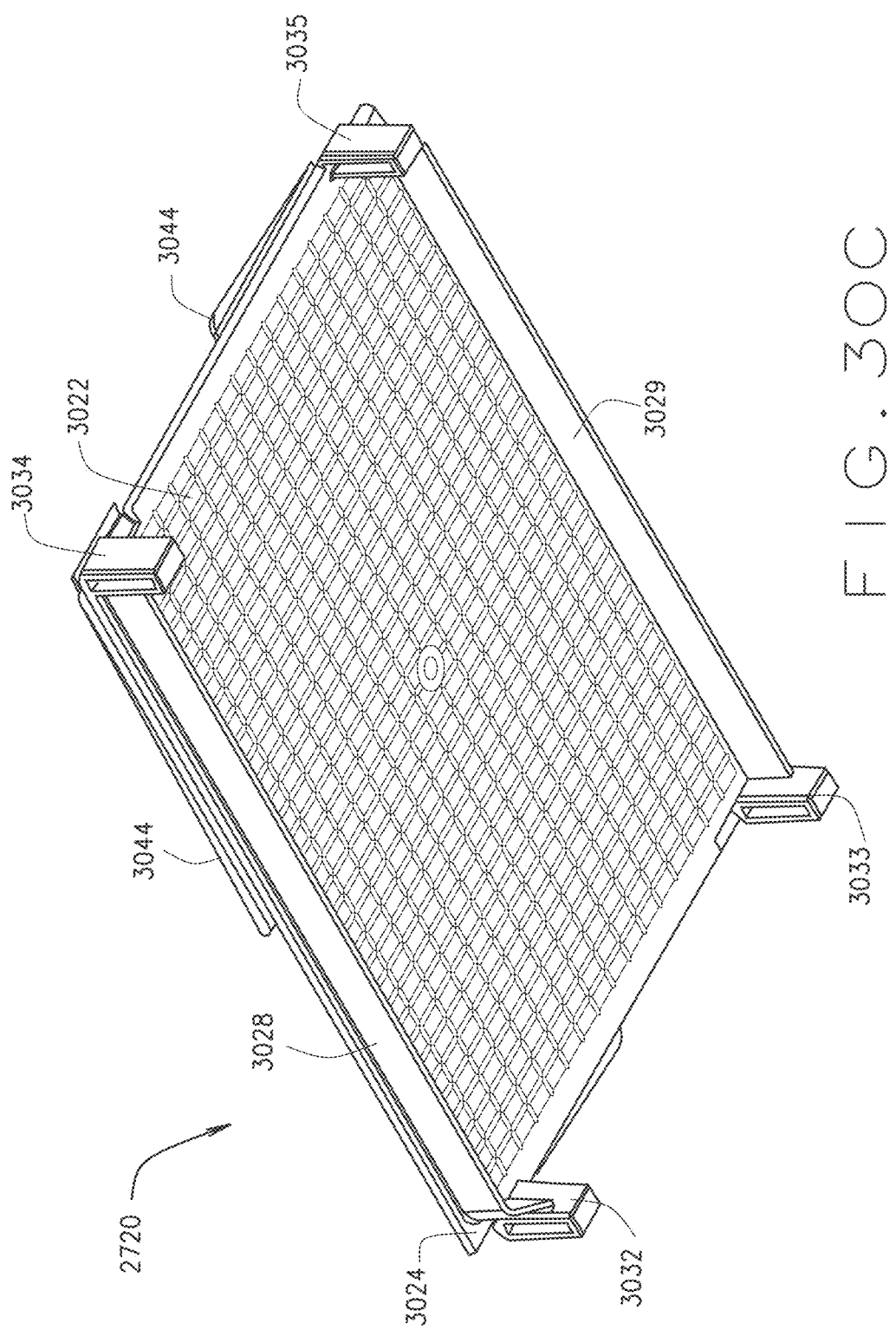
FIG. 30C is a bottom perspective view of the floor panel of FIGS. 30A and 30B.
Figure 30D:
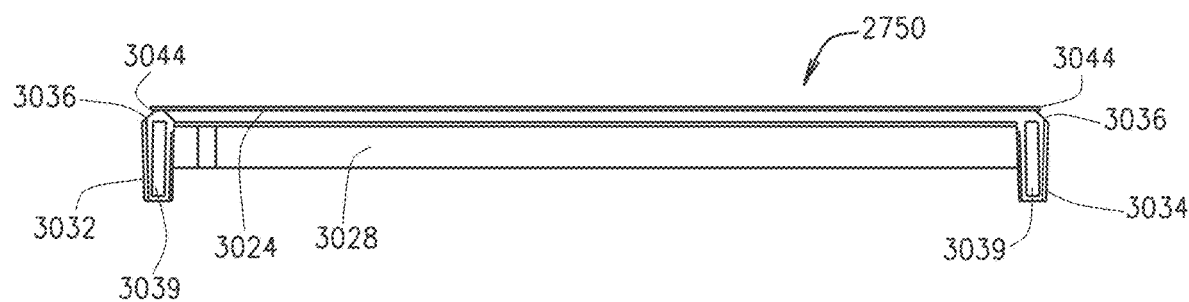
FIG. 30D is a front view of the floor panel of FIGS. 30A, 30B, and 30C.
Figure 31:
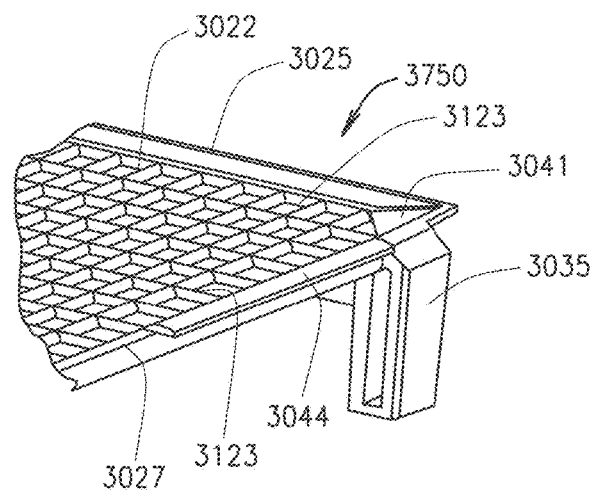
FIG. 31 is a detailed view of a corner of the floor panel of FIGS. 30A and 30B.

As clearly illustrated in FIG. 30C, the front hinge elements 3032 and 3034 of each floor panel are offset from each other, so that the hinge element 3032 of a right floor panel 2720c or 2720d is adjacent to and behind the hinge element 3034 of a left floor panel 2720a or 2720b when the floor panels are joined. The hinge element 3032 is spaced from the front edge 3024 of the floor panel by a distance that is equal to or greater than the width of the hinge element 3034 along the length of edge 3026, so that the corresponding hinge element 3034 fits between the front of the floor panel and the hinge element 3032. The rear hinge elements 3033, 3035 are also offset from each other to allow alignment of the hinges when the edges of the floor panels are brought together. The hinge elements of mating floor panels may abut each other or be spaced apart when joined. The floor panels may have more or fewer hinge elements that interlace.

Figure 34:
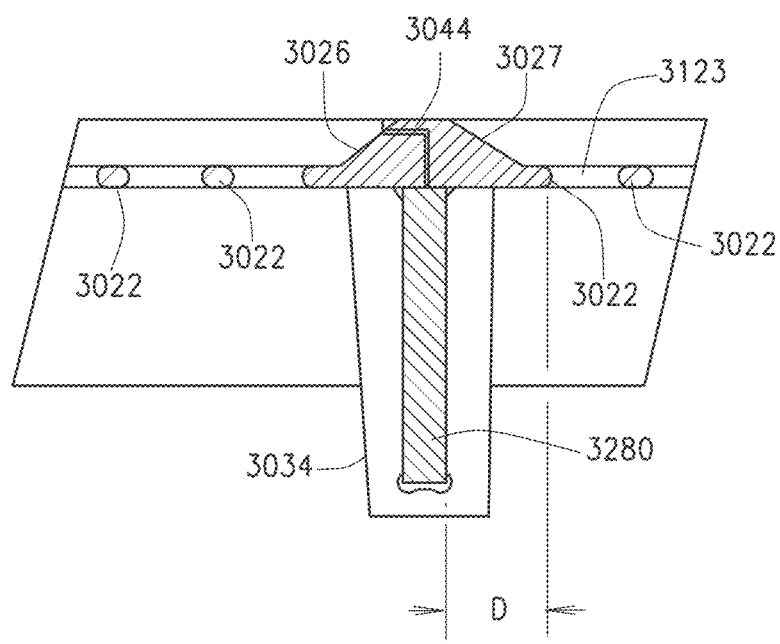
FIG. 34 is a cross-section view of an intersection between two adjacent floor panels using a beam for the basket of FIG. 27.

As shown in FIGS. 30A-34, each of the edges 3024, 3025, 3026 and 3027 includes lips 3044 that protrude from the edges. The lip 3044 in one implementation extend along a portion of an edge and is offset to one end of the edge. The lip 3044 is offset to one end of 3025, whereas the lip 3044 is offset to an opposing end of edge 3024. Edges 3024, 3025, 3026 and 3027 also slope downwards to promote debris channeling through the mesh 3022. Edges 3026 and 3027 are complementary, and edges 3024 and 3025 are complementary, so that the lips of one edge, such as edge 3027, fit in recesses between lips of a mating edge, such as edge 3026, as shown in FIG. 30. The shaped edges ensure that there is no seam over the beam 3280 to promote cleanliness. The overlapping edges ensure that the seams between the adjoined floor panels remain covered even as the weight of the animals increases and flexes the floor panels. In addition, the edges 3024, 3025, 3026 and 3027 extend inwards past the beam 3280 by a selected amount to promote the channeling of debris through the mesh 3022 and prevent soiling of the beam 3280. Thus, the outside edges of the floor 3022 are solid to protect the beam 3280. For example, in the embodiment shown in FIG. 34 the distance D between the front of the beam 8320 and the interface between the edge 3027 and mesh 3022 is at least 0.25" and preferably at least 0.5". Lip 3044 extends over edge 3026 as illustrated in FIG. 34 so that the seam is sealed.

Figure 35:
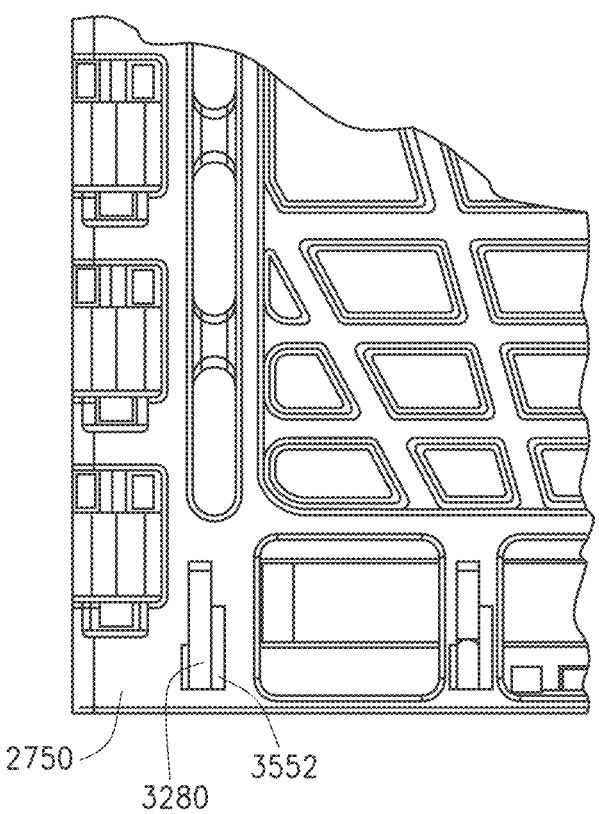
FIG. 35 is an illustration of a front lower corner of the basket of FIG. 27.
Figure 38A:
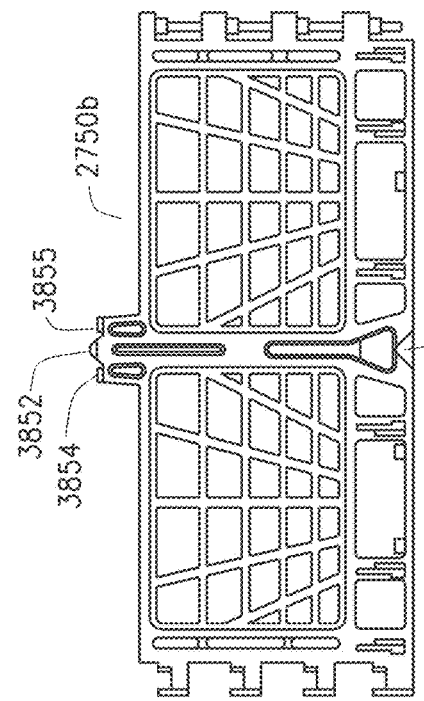
FIGS. 38A, 38B, 38C, 38D, 38E and 38F illustrate an embodiment of a second side panel configured to mate with the first side panel.
Figure 38B:
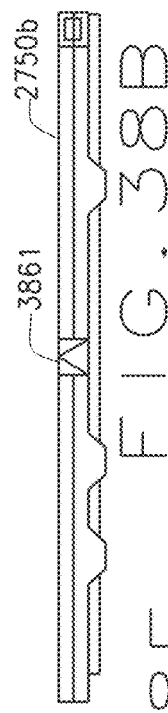
Figure 38C:
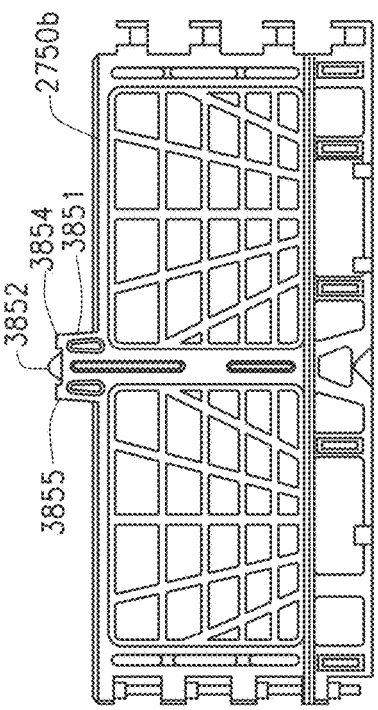
Figure 38D:
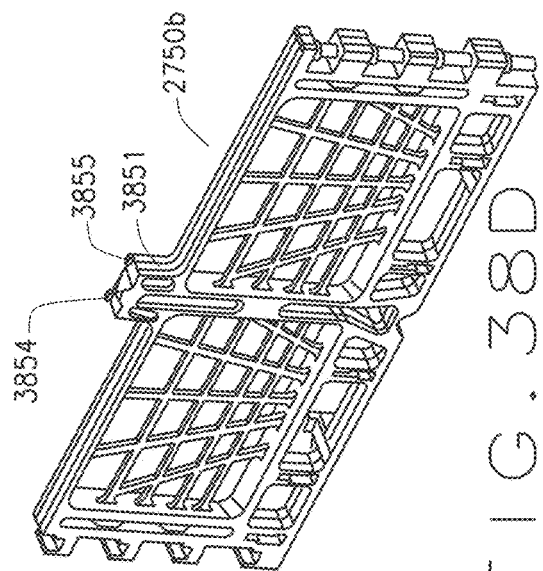
Figure 38E:
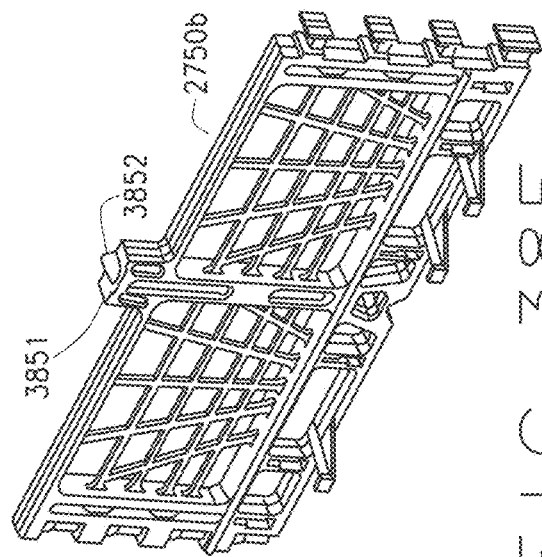
Figure 38F:
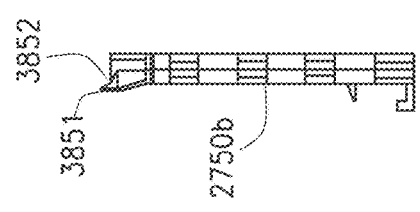

The side panels 2750 connect to the floor using the beams 3280. FIG. 35 is a detailed view of area 3 of FIG. 29, showing the connection between a beam 3280 and a side panel 2750 forming a side wall of the basket 2710. The beam 3280 that passes through and joins adjacent columns of floor panels passes into an opening 3552 in the side panel. The opening 3552 includes recesses to allow twisting of the beam end to lock the beam into place. In the illustrative embodiment, each beam 3280 linking two columns of floor panels passes into an opening in a side panel, but not all side panels receive beams. The edge beams 3280 extend through the hinges of the floor panels along each opposing end forming the short side of the basket floor and the edge beam also extends through the hooks 3769 of each side panel extending along the short side of the basket and these edge beams 3280 extend into the opening 3552 of a side panel 2750b extending along a long side of a basket and adjacent a corner.

The side panels 2750 are connected together to form the side walls of the basket 2710. In the illustrative embodiment, each side panel includes links along the first side and second side edges for connecting the side panel to an adjacent side panel. The links are configured such that the side panels may be connected at either 90° or 180°, as shown in FIG. 36 to form a corner of a side wall. Items 2750a and 2750b can be configured at a 90 degree angle to form a corner portion of the side wall.

The illustrative basket comprises four different configurations of side panels, each with similar features, as described below.

FIGS. 37A-37F are various views of a first side panel 2750a suitable for forming a side of a modular basket. The illustrative side panels 2750a are used adjacent to diagonally opposite corners on the short side of the basket 2710 of FIG. 27. Each side panel comprises a mesh wall formed between upper, lower and side edges. Each side panel 2750 includes female links 3762 on a first side and male links 3772 on an opposite side. The female links each comprise a protrusion 3763 extending from the side edge. The protrusion forming the female link includes two intersecting recesses 3764, 3765. The recesses 3764 and 3765 are perpendicular and have a square-shaped cross-section. The male links 3772 comprise protrusions 3773 aligned with spaces 3766 between the female protrusions. Rods 3775 extend between the protrusions. The illustrative rods 3775 have a square cross-section, with a thicker upper portion and a thinner lower portion. The female links 3762 receive the male links 3772 at either a 90° or 180° to connect two side panels together. As shown in FIG. 36, a u-shaped pin 3679 may be inserted into a space between the female protrusions 3763 and male protrusions 3773 to hold the links in place.

The side panels 2750a further include hooks 3769 extending from the bottom edge for receiving edge beams 3280 that connect floor panels together.

The side panels 2750a further include a cavity, illustrated as recess 3781, formed in the top edge for allowing the passage of feeding tubes or pipes. As illustrated, these side panels 2750a can be positioned to extend along the short side wall of the basket adjacent the corner of the basket.

An inside ledge 3791 extends between the links 3762, 3772 above the beam openings 3552. The ledge 3791 slopes downwards and overlaps the floor panels 2720 when the basket is assembled to promote cleanliness. Even when the floor panels bow under the weight of animals in the basket, the overlap between the inside ledges 3791 and floor panel edges prevent separation between the components.

Above the ledge 3791, the space between the edges of the panels forms an expanding mesh 3793. The openings 3795 in the mesh 3793 grow larger the higher they are to accommodate growing poultry. In one implementation, the openings are between about approximately one and about approximately three inches wide, where in one implementation the openings are about approximately 2.2 inches and between about one and about approximately two inches tall, preferably about approximately 1.5 inches tall.

The side panel 2750a further includes openings 3797 below the ledge 3791 to promote airflow. The side panels used in the opposite corners from the side panels 2750a are substantially similar, except for the length of the inside ledge 3791.

FIGS. 38A-38F illustrate an embodiment of a second side panel 2750b configured to mate with the first side panel 2750a. A second side panel 2750b is disposed between two first side panels 2750a on the short side of the basket 2710 of FIG. 27, and a series (four, in the illustrative embodiment) of second side panels are connected at 180° angles along the long side of the basket 2710. The second side panel 2750b includes the same female and male links, mesh, ledge, hooks and openings and further includes a stacking tip 3851 extending upwards from the top edge. The bottom edge includes a recess 3861 for receiving the stacking tip of a side panel in a basket below. For the long side of the basket, the second side panel 2750b has a minimal inside ledge 3791.

FIGS. 39-43 further illustrate the means by which side panels 2750b of baskets 2710 stacked on top of one another engage one another. As illustrated, stacking tip 3851 includes a pyramid-shaped protrusion 3852 having a flat front face 4153 and two straight protrusions 3854, 3855 opposing the pyramid-shaped protrusion for gripping the bottom edge of an overhead panel. When stacked, the stacking tip allows for a space 4070 to be formed between the overhead and below baskets.

Figure 44:
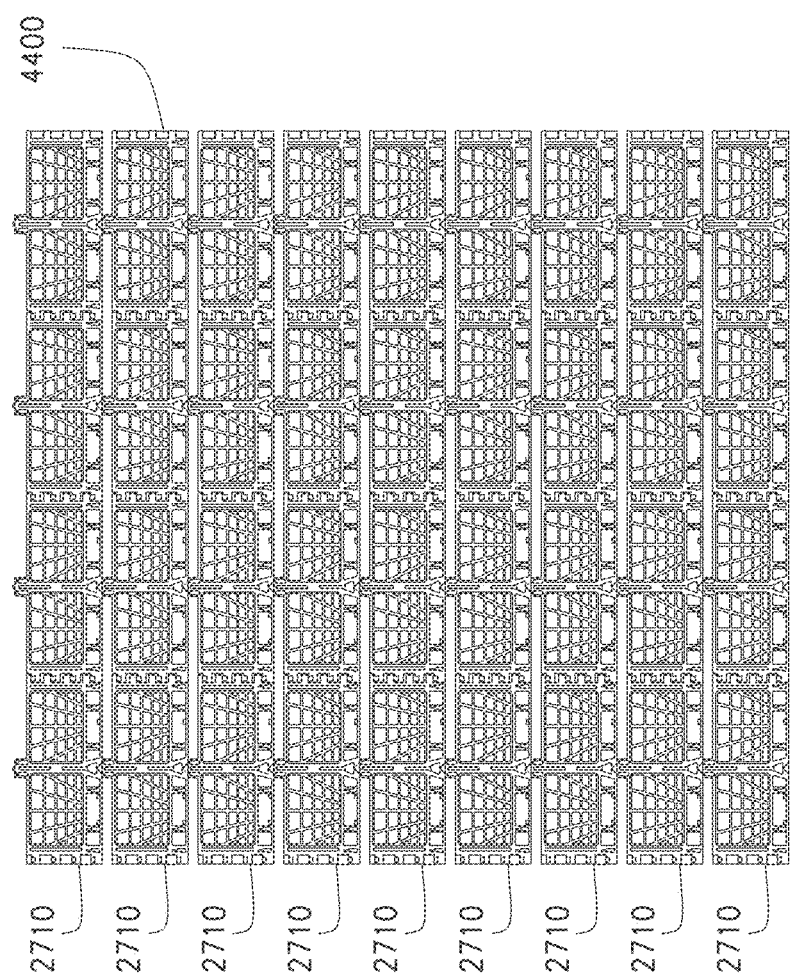
FIG. 44 illustrates a stack of modular baskets according to an embodiment of the invention.
Figure 39:
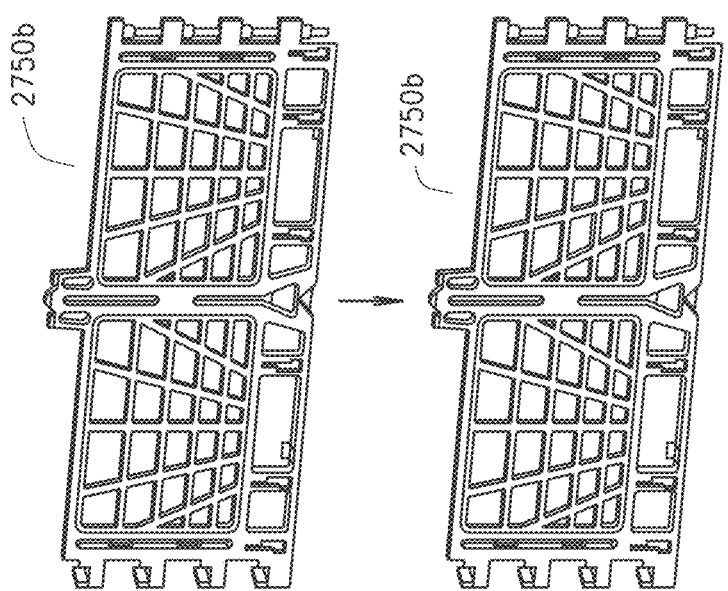
FIG. 39 illustrates the stacking of two side panels according to an illustrative embodiment of the invention.
Figure 43:
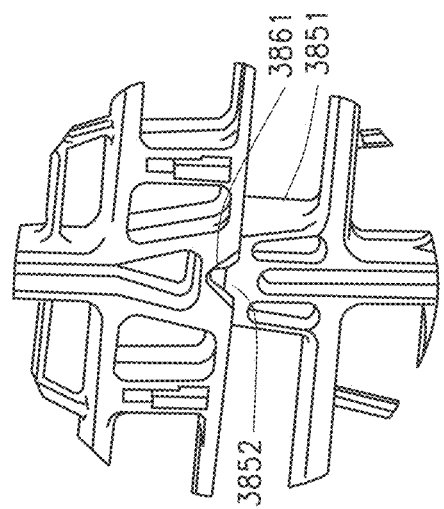
FIG. 43 is an enlarged illustration of region B of FIG. 42.
Figure 42:
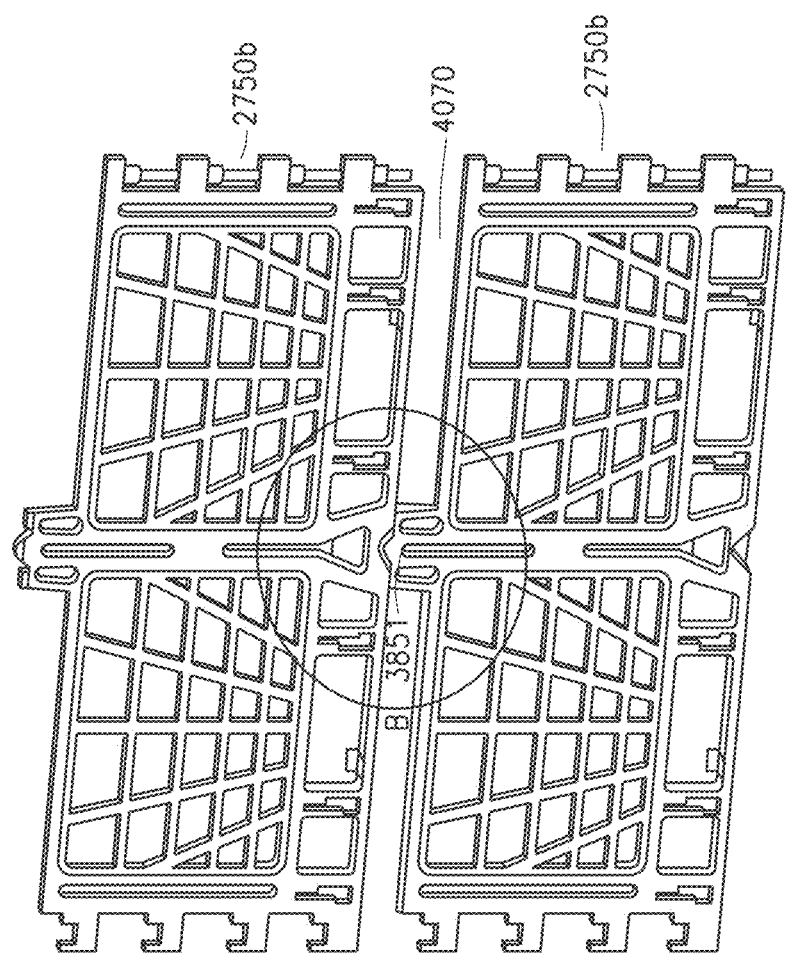
FIG. 42 is an illustration of the outside of the stacked side panels of FIG. 40.

FIG. 44 illustrates a stack 4400 of nine modular baskets 2710. Multiple baskets may be stacked together for transportation as described in the previous embodiment. The baskets are self-stacking and stabilized on top of each other.

FIG. 45 illustrates a frame 4500 for a chicken colony employing modular baskets. The frame includes multiple levels, each level housing a row or more of modular baskets. A conveyor belt may be used to convey the modular baskets 2710 on and off of the frame as described in the previous embodiment.

The illustrative modular plastic basket provides a comfortable, sanitary, accessible environment with optimal air flow and ventilation for raising chickens or other products. The modular plastic baskets are easily assembled and stackable to save space.

Poultry can be raised in the basket from the beginning to the end of life. The basket may be easily removed from a poultry house and trucked to a process facility, where it is unloaded, cleaned, then sent back to a hatchery or poultry house.

One implementation of a colony system for growing poultry is illustrated in FIGS. 46 through 56, including a colony rack system including vertically and horizontally oriented support members, where said support members are structurally interconnected forming multiple vertically tiered channels extending horizontally at multiple vertical levels through which a poultry colony basket can be conveyed, and where each channel has an entry end and an exit end. For one implementation of the colony system, each channel at the various vertical levels includes a left and right entry end winch system or winch assembly, where each of said left and right entry end winch assemblies includes an upper and lower winch. Each of the upper and lower winches includes a multiple groove spool with a gear crank attached on one end of the spool where the gear crank and the spool have a common hub and a common cylindrical axis. Each of the upper and lower winches also include a jack screw key that interfaces with the crank gear in a rack and pinion like arrangement where the thread portion of the jack screw key acts as the linear actuator or "the rack" in the arrangement, which engages with the teeth of the gear crank, where the gear crank acts as "the pinion" to affect rotation of the multiple groove spool. The jack screw key is screwed in and out to increase or decrease the tension of a tension cable by winding and unwinding the cable around the spool, where one end of the cable is wrapped around and anchored to the spool and whose opposing end extends from the spool to attach to an adjustable pulley whose hub or vertical axis adjustably traverses forward toward an exit end or aft toward the entry end and along the direction in which the channel extends.

The adjustable pulley acts as a secondary adjustable pulley in combination with a main multi-groove pulley to form a serpentine belt and pulley assembly. At the entry end of the colony rack are left and right serpentine belt and pulley assemblies. The left and right serpentine belt and pulley assemblies provide a conveyance means where a top run of a left and right endless conveyor belt conveys the baskets through the colony channel at each level. The left and right endless conveyor belts wrap around the pulleys of the left and right belt and pulley assemblies respectively in a serpentine manner and the left and right endless conveyor belts have a top run that extends from the respective serpentine belt and pulley system between the entry end and an exit, and a return run of the endless conveyor belt that extends from the respective serpentine belt and pulley system between the entry end and an exit end. The adjustment of the jack screw key adjusts the tension of the tension cable to adjust the adjustable or secondary pulley's position with respect to the position of the main multi-groove pulley. For one implementation, the jack screw key has a key head configured as a loop or ring structure that can be used to screw the jack screw key.

The relative positions between the secondary pulley and the main multi-groove pulley increases or decreases the tension in the endless conveyor belt. The secondary and main pulleys have the respective endless belt inter-wrapped from the main pulley to the secondary pulley and extending there between one to the other, where the endless belt wraps three times around each of the secondary and main pulley and where each of the portions of the endless belts extending between the secondary and main pulley (belt tangents) after each wrap are crossed with the prior portion of the endless belt extending between the pulleys thereby forming multiple crossed belt tangents. The inter-wrapping configuration resists slipping of the endless belt with respect to the pulleys and maintains the desired tension in the endless belt as it has been adjusted. A top run of the endless conveyor belt and a return run of the endless conveyor belt extends from the entry end to the exit end of the colony rack Each of the left and right main and secondary pulleys have multiple side-by-pulley grooves around the cylindrical circumference of each of the pulleys, whereby each of the three wraps of the endless conveyor belt wraps around the cylindrical circumference of the pulley lie within one of the side by side grooves. The left and right entry end main and secondary pulleys are rotatably mounted on left and right entry end bearing axles where the left and right bearing axles of the adjustable secondary pulley have opposing ends positioned along left and right bearing slots in which the bearing axles of the secondary pulley are able to traverse forward and aft.

A top run of the endless conveyor and a return run extend from the serpentine belt and pulley assembly toward the exit end of the colony rack to an exit end belt and pulley assembly. The exit end belt and pulley assembly includes primary exit end return pulley and a secondary exit end return pulley. Each of said left and right exit end primary return pulleys have multiple side-by-side exit end pulley grooves around the cylindrical circumference of each of the left and right exit end primary return pulleys, and where said left and right exit end primary return pulley is rotatably mounted on left and right exit end bearing axles where each of the left and right exit end bearing axles have opposing ends fixedly positioned.

The secondary and primary exit end return pulleys have the respective endless belt inter-wrapped from the primary return pulley to the secondary return pulley and extending there between one to the other, where the endless belt wraps three times around primary return pulley and where a portion of the endless belts extends between the secondary and primary return pulleys (belt tangents) after the third wrap around the primary return pulley thereby forming a crossed belt tangent. The inter-wrapping configuration resists slipping of the endless belt with respect to the return pulleys and maintains the desired tension in the endless belt as it has been adjusted. The top run of the endless conveyor belt at the exit end does not contact the secondary return pulley and the return run of the endless conveyor belt extends from the primary return pulley to the secondary return pulley secondary return pulley supports a return run of the endless conveyor belt as it extends from the exit end to the entry end.

Further, for one implementation, each of the left and right entry end winch assemblies above the lowest left and right winch assemblies, includes a left and right inner winch. The inner winch, similar to the upper and lower winches, includes a multiple groove inner spool with an inner gear crank attached on one end of the inner spool where the inner gear crank and the inner spool have a common inner hub and a common inner cylindrical axis. Each of inner winches also include an inner jack screw key that interfaces with the inner crank gear in a rack and pinion like arrangement where the thread portion of the inner jack screw key acts as the linear actuator or "the rack" in the arrangement, which engages with the teeth of the inner gear crank, where the inner gear crank acts as "the pinion" to affect rotation of the multiple groove inner spool. The inner jack screw key is screwed in and out to increase or decrease the tension of an inner tension cable whose one end is wrapped around and anchored to the inner spool and whose opposing end extends from the inner spool to attach to an adjustable feeding system, which can move forward toward an exit end or aft toward the entry end and along the direction of the channel. The inner tensioning cable can also adjust the height of the feeding system.

For one implementation of the colony rack system, each channel of each level includes a wide debris cleaning endless conveyor belt that extends from the entry end to the exit end and each of the debris cleaning endless conveyor belts at each level extends immediately under the colony basket conveyor belt top and return runs. The debris cleaning endless conveyor belt includes a top run that is positioned to catch debris falling from the colony baskets being conveyed above on the endless colony basket conveyor belt. The endless debris cleaning conveyor belt is swiped clean and/or spray cleaned as the debris cleaning conveyor belt transitions from the top run to the return run. For one implementation, an overhead feeding system can also extend down the channel from the entry end to the exit end, where the feeding system includes watering troughs and feed troughs.

For one implementation, each of the upper and lower tensioning cables at each level are attached to the upper and lower spools respectively and wrapped circumferentially there about, and the tensioning cables have an opposing end attached to an adjustment bar whose upper and lower opposing ends of the adjustment bar are attached respectively to upper and lower adjustable pulley brackets on which the adjustment pulley bearings are mounted whereby the crank gear can be ratcheted using the jack screw key to increase or decrease the tension in the tensioning cable to thereby adjust the tension in the endless conveyor belt.

One implementation of the colony system includes a method for growing poultry in a colony including providing a rack system including vertically and horizontally oriented support members, where said support members are structurally interconnected forming multiple vertically tiered channels through which a poultry basket can be conveyed, and where each channel has an entry end and an exit end. One implementation of the method includes inserting a colony basket into an entry end of one or more vertically tiered horizontally extending channels and placing the colony basket on an endless conveyor cable, where the endless cable has an upper top run and a lower return run, and where each top and return run extends between an entry end pulley assembly and an exit end pulley assembly, and where the endless cable circumferentially wraps around the entry end pulley multiple time, and circumferentially wraps around the exit end pulley multiple times. The method includes conveying a poultry basket on the upper top run of the endless conveyor belt and thereby conveying the colony basket placed along the channel on said endless conveyor belt from an entry end to an exit end.

Figure 46:
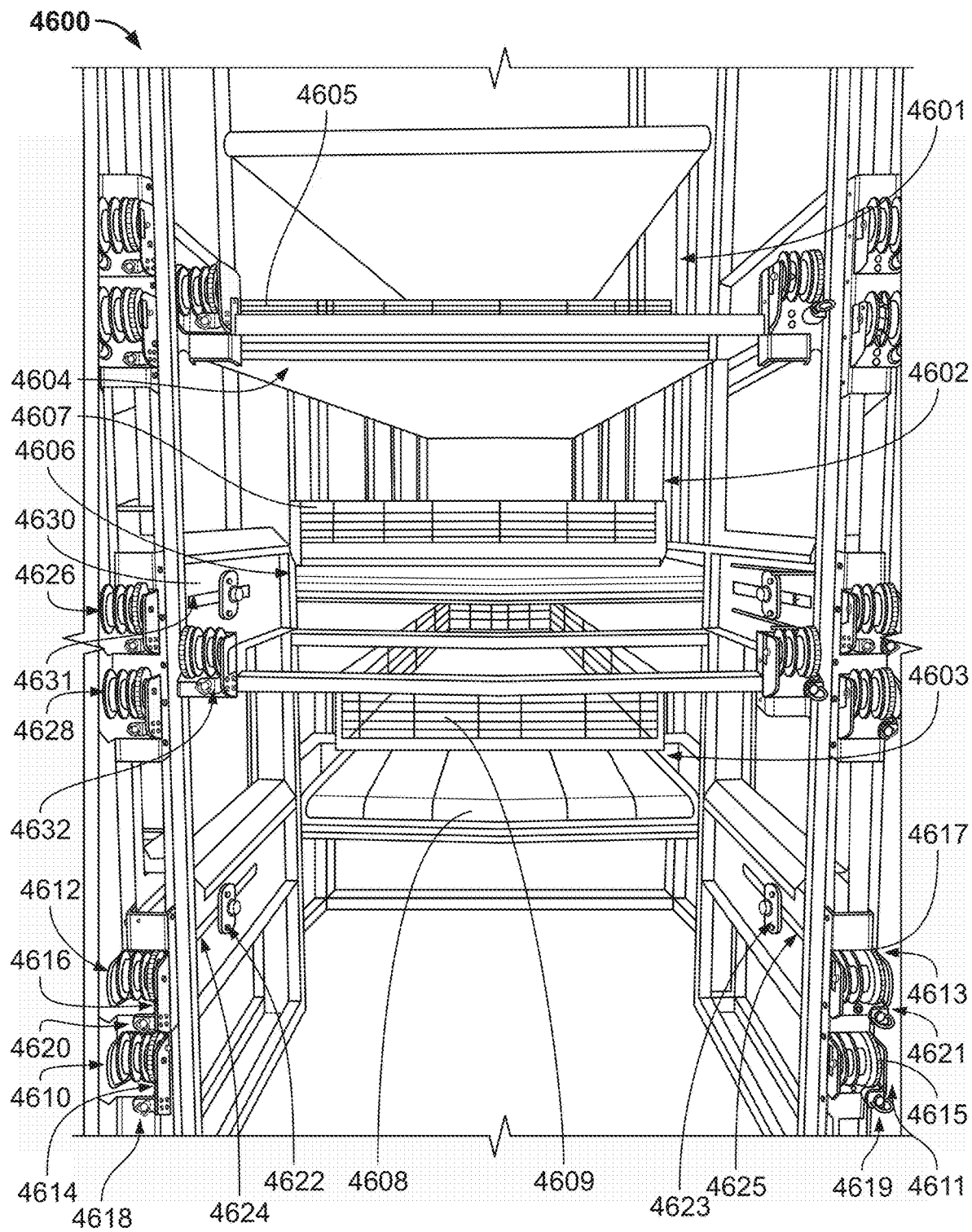
FIG. 46 is an illustration of an entry end view of one implementation a colony rack system.

FIG. 46 is an illustration of one implementation of an entry end view of a colony rack system 4600. One implementation of a colony system for growing poultry includes a colony rack system including vertically and horizontally oriented support members as illustrated in FIG. 46, where said support members are structurally interconnected forming multiple vertically tiered horizontally extending channels 4601, 4602 and 4603 at multiple vertical levels through which a poultry colony basket, as shown by items 4605, 4607 and 4609, can be conveyed, and where each channel has an entry end as shown and an exit end (not shown in this view). For one implementation of the colony system 4600, each channel, 4601, 4602 and 4603 at the various vertical levels includes a left and right entry end winch assembly, where each of said left and right entry end winch assemblies includes an upper and lower winch as illustrated by items 4612, 4613, 4626 and 4610, 4611, 4628 respectively. Each of the upper and lower winches includes a multiple groove spool with a gear crank 4614, 4615, 4616, 4617 attached on one end of the spool where the gear crank and the spool have a common hub and a common cylindrical axis.

Each of the upper and lower winches also include a jack screw key, illustrated by items 4620, 4621 and 4618, 4619 respectively, that interfaces with the gear cranks, as illustrated by 4614, 4615, 4616, and 4617 in a rack and pinion like arrangement where the thread portion of the jack screw key acts as the linear actuator or "the rack" in the arrangement, which engages with teeth of the crank gears, where the crank gears acts as "the pinion" to affect rotation of the multiple groove spool. The jack screw key is screwed in and out to increase or decrease the tension of a tension cable whose one end is wrapped around and anchored to the spool and whose opposing end extends from the spool to attach to an adjustable pulley whose hub or vertical axis adjustably traverses forward toward an exit end or aft toward the entry end and along the direction of the channel.

The adjustable pulley, as illustrated by items 4622, 4623, and 4630, acts as a secondary pulley in combination with a main multi-groove pulley to form a serpentine belt and pulley assembly. At the entry end of the colony rack are left and right serpentine belt and pulley assemblies. The left and right serpentine belt and pulley assemblies provide a conveyance means for the colony baskets where the top run of a left and right endless conveyor belt conveys the baskets through the colony channel. The left and right endless conveyor belts wrap around the left and right belt and pulley assemblies respectively in a serpentine manner and the left and right endless conveyor belts have a top run that extends from the respective serpentine belt and pulley system between the entry end and an exit, and a return run that extends from the respective serpentine belt and pulley system between the entry end and an exit end. The adjustment of the jack screw key, as illustrated by items, 4620, 4621 and 4618, 4619, adjusts the tension of the tension cable to adjust the adjustable or secondary pulley's position with respect to the position of the main multi-groove pulley, thereby increasing or decreasing the tension in the colony basket conveyor belt.

Further, for one implementation, each of the left and right entry end winch assemblies above the lowest left and right winch assembly, illustrated as items 4610, 4611, 4612, and 4613, includes a left 4632 and right inner winch. The inner winch, similar to the upper and lower winches 4626 and 4628, includes a multiple groove inner spool with an inner gear crank attached on one end of the inner spool where the inner gear crank and the inner spool have a common inner hub and a common inner cylindrical axis. Each of inner winches also include an inner jack screw key that interfaces with the inner crank gear in a rack and pinion like arrangement where the thread portion of the inner jack screw key acts as the linear actuator or "the rack" in the arrangement, which engages with the teeth of the inner gear crank, where the inner gear crank acts as "the pinion" to affect rotation of the multiple groove inner spool. The inner jack screw key is screwed in and out to increase or decrease the tension of an inner tension cable whose one end is wrapped around and anchored to the inner spool and whose opposing end extends from the inner spool to attach to an adjustable feeding system, which can move forward toward an exit end or aft toward the entry end and along the direction of the channel. The inner tensioning cable can also adjust the height of the feeding system.

For one implementation of the colony rack system, each channel, items 4601, 4602 and 4603, of each level includes a wide debris cleaning endless conveyor belt, items 4604, 4606, and 4608, that extends from the entry end to the exit end and each of the debris cleaning endless conveyor belts at each level extends immediately under the serpentine top and return runs. The debris cleaning endless conveyor belt includes a top run that is positioned to catch debris falling from the colony baskets being conveyed above on the endless colony basket conveyor belt. The debris cleaning endless conveyor belt is swiped clean and/or spray cleaned as the debris cleaning conveyor belt transitions from the top run to the return run. For one implementation, an overhead feeding system can also extend down the channel from the entry end to the exit end, where the feeding system includes watering troughs and feed troughs.

Figure 47:
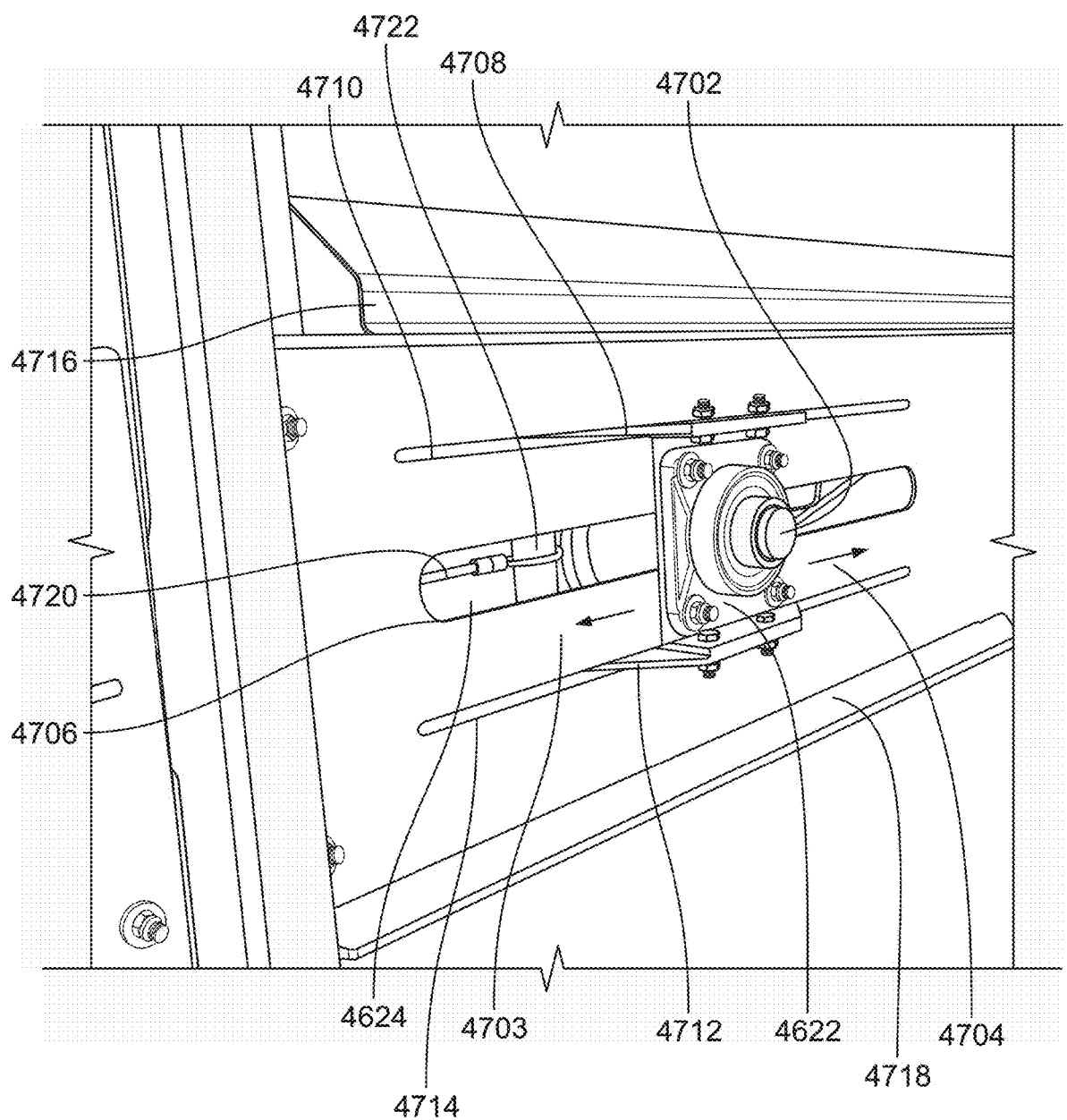
FIG. 47 is an illustration of a tensioning pulley.

FIG. 47 is an illustration of a tensioning pulley. The adjustable pulley, as illustrated by items 4622, 4623, and 4630, acts as a secondary pulley in combination with a main multi-groove pulley to form a serpentine belt and pulley assembly. At the entry end of the colony rack are left and right serpentine belt and pulley assemblies. The left and right serpentine belt and pulley assemblies provide a conveyance means where the top run of a left and right endless conveyor belt conveys the baskets through the colony channel. The left and right endless conveyor belts wrap around the left and right belt and pulley assemblies respectively in a serpentine manner and the left and right endless conveyor belts have a top run that extends from the respective serpentine belt and pulley system between the entry end and an exit, and a return run that extends from the respective serpentine belt and pulley system between the entry end and an exit end. The adjustment of the jack screw key, as illustrated by items, 4620, 4621 and 4618, 4619, adjusts the tension of the tension cable 4720 to adjust the adjustable or secondary pulley's position with respect to the position of the main multi-groove pulley.

The relative positions between the secondary pulley and the main multi-groove pulley increases or decreases the tension in the endless conveyor belt. The further apart the main and secondary pulleys are, the greater the tension in the colony basket conveyor belt and the closer the pulleys are, the lesser the tension. For one implementation the hub 4702 or rotational axis of the secondary pulley is parallel with respect to the hub or rotational axis of the main pulley, and the pulleys are substantially in line. The secondary and main pulleys have the respective endless belt inter-wrapped from the main pulley to the secondary pulley and extending there between one to the other, where the endless belt wraps two or more times around each of the secondary and main pulley and where each of the portions of the endless belts extending between the secondary and main pulley (belt tangents) after each wrap are crossed with the prior portion extending between the pulleys thereby forming multiple crossed belt tangents. The inter-wrapping configuration resists slipping of the endless belt with respect to the pulleys and maintains the desire tension in the endless belt as it has been adjusted. A top run of the endless conveyor belt and a return run of the endless conveyor belt extends from the entry end to the exit end of the colony rack For one implementation, each of the upper and lower tensioning cables at each level are attached to the upper and lower spools respectively and wrapped circumferentially there about, and the tensioning cables have an opposing end attached to an adjustment bar 4722 whose upper and lower opposing ends of the adjustment bar 4722 are attached respectively to upper and lower adjustable pulley brackets 4708 and 4712 on which the adjustment pulley bearings are mounted whereby the crank gear can be ratcheted using the jack screw key to increase or decrease the tension in the tensioning cable to thereby adjust the tension in the endless conveyor belt by adjusting the adjustable pulley in the directions indicated by directional arrows 4703 and 4704.

The adjustment of the jack screw key adjusts the tension of the tension cable to adjust the adjustable or secondary pulley's 4622 position with respect to the position of the main multi-groove pulley. The relative positions between the secondary pulley and the main multi-groove pulley increases or decreases the tension in the endless conveyor belt. The secondary and main pulleys have the respective endless belt inter-wrapped from the main pulley to the secondary pulley and extending there between one to the other, where the endless belt wraps three times around each of the secondary and main pulley and where each of the portions of the endless belts extending between the secondary and main pulley (belt tangents) after each wrap are crossed with the prior portion extending between the pulleys thereby forming multiple crossed belt tangents For one implementation, each of the upper and lower tensioning cables at each level are attached to the upper and lower spools respectively and wrapped circumferentially there about, and the tensioning cables 4720 have an opposing end attached to an adjustment bar 4722 whose upper and lower opposing ends of the adjustment bar are attached respectively to upper and lower adjustable pulley brackets, 4708 and 4712 on which the adjustment pulley bearings are mounted whereby the crank gear can be ratcheted using the jack screw key to increase or decrease the tension in the tensioning cable 4720 to thereby adjust the tension in the endless conveyor belt. The position of the adjustable pulley 4622 can be adjusted to translate in a forward exit end direction 4704 and to translate in an aft entry end direction 4703. The brackets 4708 and 4712 on which the adjustable pulley is mounted can translate along slots 4710 and 4714 respectively and the hub (adjustment pulley bearing 4702) of the adjustable pulley can translate along slot 4624. Also illustrated in this view is a poultry basket guide rail 4716, which extends down the channel to the exit end. A support lip 4718 is also illustrated. The tensioning cable 4720 is attached to the adjustment bar by an Adjustment Bar Cable Loop 4722.

Figure 48:
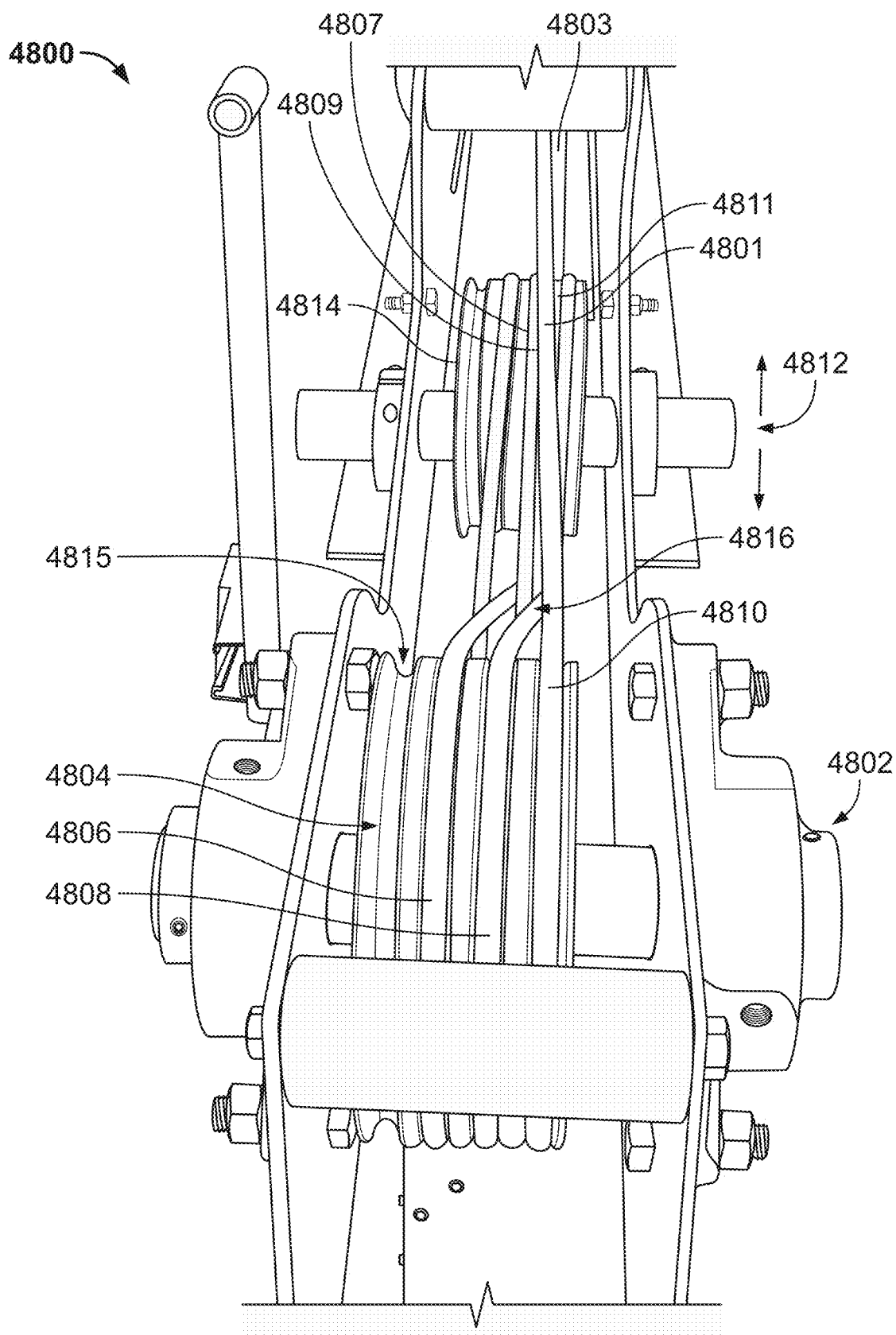
FIG. 48 is an illustration of an entry end pulley system.

FIG. 48 is an illustration of an entry end serpentine belt and pulley system 4800. The adjustable pulley, as illustrated by item 4814, acts as a secondary pulley in combination with a main multi-groove pulley 4804 to form a serpentine belt and pulley assembly 4800. At the entry end of the colony rack are left and right serpentine belt and pulley assemblies. The left and right serpentine belt and pulley assemblies provide a conveyance means where the top run 4801 of a left and right endless conveyor belt conveys the baskets through the colony channel. The left and right endless conveyor belt wraps around the left and right belt and pulley assemblies respectively in a serpentine manner and the left and right endless conveyor cables have a top run 4801 that extends from the respective serpentine belt and pulley system between the entry end and an exit, and a return run 4803 that extends from the respective serpentine belt and pulley system between the entry end and an exit end. The adjustment of the jack screw key (not shown in FIG. 48), as illustrated by items, 4620, 4621 and 4618, 4619, adjusts the tension of the tension cable to adjust the adjustable or secondary pulley's 4814 position with respect to the position of the main multi-groove pulley 4804. The further apart the respective substantially parallel hubs 4801 and 4802 and axis are the greater the tension in the colony basket conveyor belt.

The relative positions between the secondary pulley and the main multi-groove pulley increases or decreases the tension in the endless conveyor belt. The secondary and main pulleys have the endless belt inter-wrapped from the main pulley 4804 to the secondary pulley 4814 and extending there between one to the other, where the endless belt wraps three times around each of the secondary 4807, 4809, 4811 and main pulley 4806, 4808, 4810 (see wraps around main pulley) and where each of the portions of the endless belts extending between the secondary and main pulley (belt tangents) after each wrap are crossed 4816 with the prior portion extending between the pulleys thereby forming multiple crossed belt tangents. Each belt wrap lies within the side-by-side recessed grooves, as illustrated by item 4804, as the belt wraps around the cylindrical circumference of the pulley. The inter-wrapping configuration resists slipping of the endless belt with respect to the pulleys and maintains the desired tension in the endless belt as it has been adjusted. A top run 4801 of the endless conveyor belt and a return run 4803 of the endless conveyor belt extends from the entry end to the exit end of the colony rack.

Each of the left and right main and secondary pulleys have multiple side-by-pulley grooves, as illustrated by item 4815, around the cylindrical circumference of each of the pulleys, whereby each of the three wraps of the endless conveyor belt wraps around the cylindrical circumference of the pulley in one of the side by side grooves. The left and right entry end main and secondary pulleys are rotatably mounted on left and right entry end bearing axles 4802 and 4812, respectively, where the left and right bearing axle 4802 of the secondary pulley 4814 have opposing ends positioned along left and right bearing slots, as illustrated by items 4624 of FIG. 46 and 5010 of FIG. 50.

A top run of the endless conveyor and a return run extend from the serpentine belt and pulley assembly toward the exit end of the colony rack to an exit end belt and pulley assembly. Colony baskets are seated atop the top run and are conveyed along the channel at each of the levels. The exit end belt and pulley assembly includes primary exit end return pulley and a secondary exit end return pulley. Each of said left and right exit end primary return pulley has multiple side-by-side exit end pulley grooves around the cylindrical circumference of each of the left and right exit end primary return pulley, and the left and right exit end primary return pulley is rotatably mounted on left and right exit end bearing axles where each of the left and right exit end bearing axles have opposing ends fixedly positioned.

Figure 49:
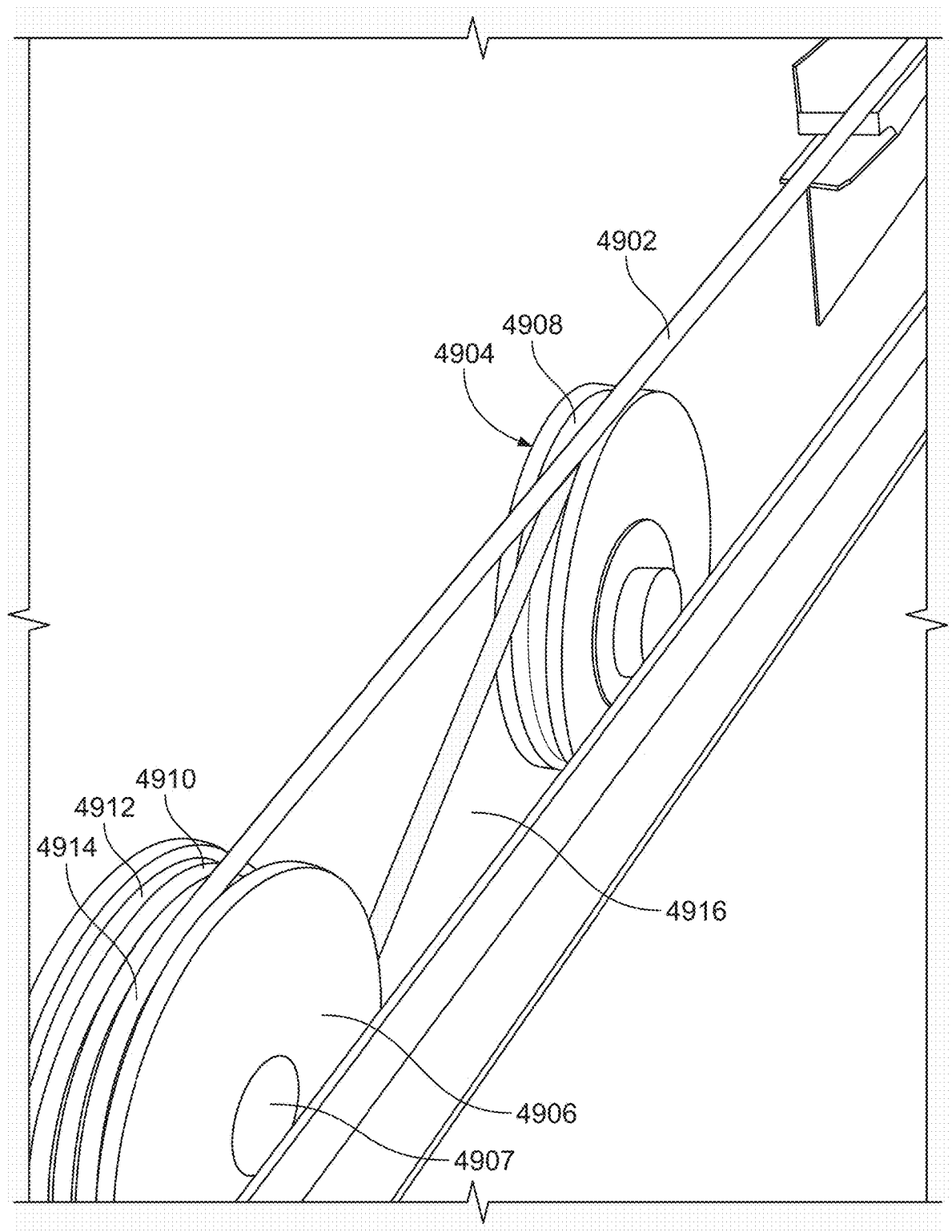
FIG. 49 is an illustration of an exit end pulley system.

FIG. 49 is an illustration of an exit end pulley system. The exit end belt and pulley assembly includes primary exit end return pulley 4906 and a secondary exit end return pulley 4904. Each of said left and right exit end primary return pulley has multiple side-by-side exit end pulley grooves around the cylindrical circumference of each of the left and right exit end primary return pulleys. The left and right exit end primary return pulley is rotatably mounted on left and right exit end primary bearing axles, as illustrated by item 4907, where each of the left and right exit end bearing axles are substantially parallel one with respect to the other and each have opposing ends fixedly positioned. The secondary and primary exit end return pulleys have the respective endless belt inter-wrapped from the primary return pulley 4906 to the secondary return pulley 4904 and extending there between one to the other, where the endless belt wraps three times 4910, 4912, 4914 around the primary return pulley and where a portion 4916 of the endless belts extends between the secondary and primary return pulleys (belt tangents) after the third wrap around the primary return pulley thereby forming a crossed belt tangent. The inter-wrapping configuration resists slipping of the endless belt with respect to the return pulleys and maintains the desired tension in the endless belt as it has been adjusted. The top run 4902 of the endless conveyor belt at the exit end does not contact the secondary return pulley and the return run of the endless conveyor belt extends from the primary return pulley to the secondary return pulley secondary return pulley supports a return run of the endless conveyor belt as it extends from the exit end to the entry end.

Figure 50:
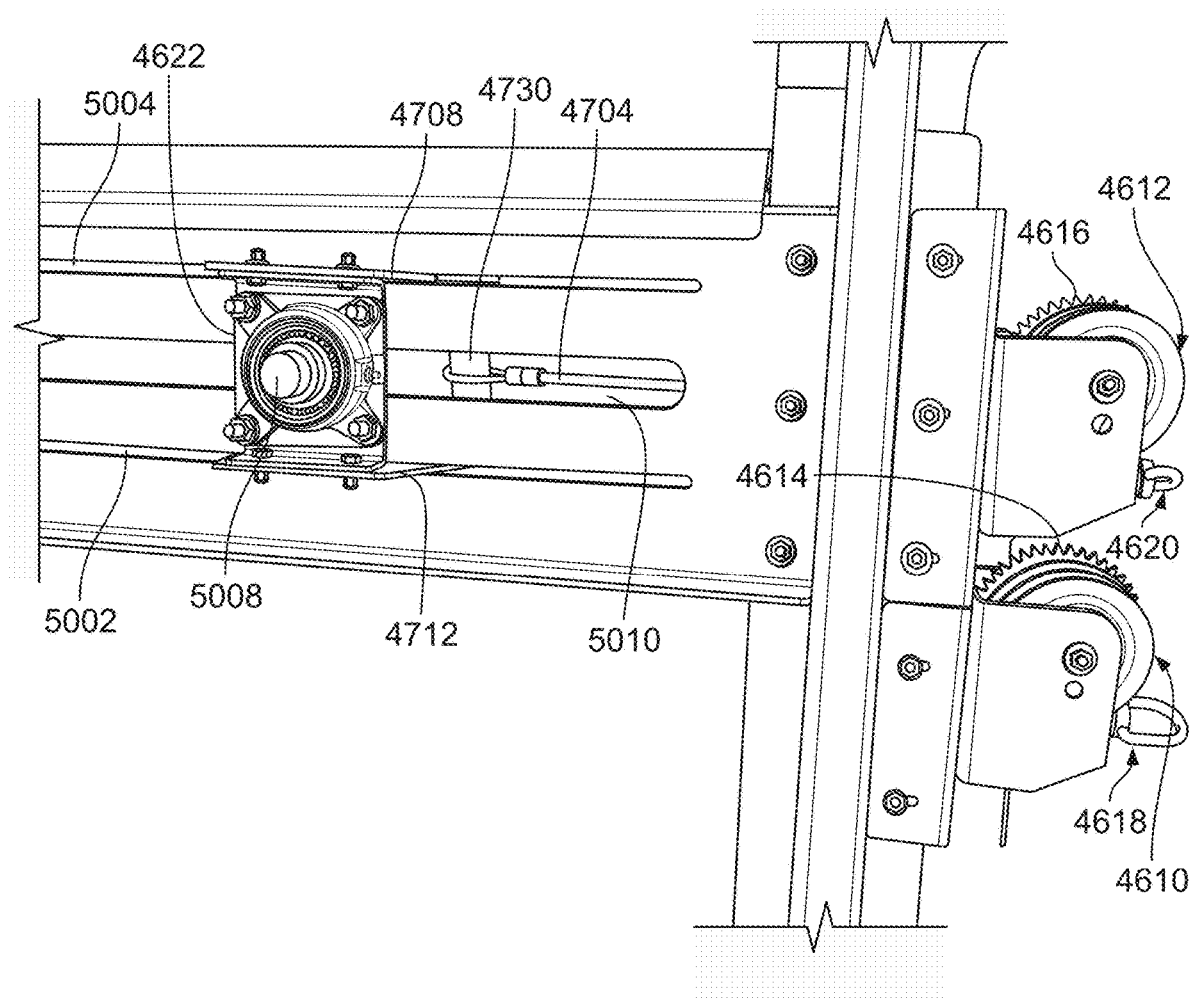
FIG. 50 is an illustration of the tensioning pulley.

FIG. 50 is an illustration of the adjustable tensioning pulley 4622, shown from an opposing side with respect to the illustration in FIG. 47. The adjustable pulley 4622 acts as a secondary pulley in combination with a main multi-groove pulley to form a serpentine belt and pulley assembly. At the entry end of the colony rack are left and right serpentine belt and pulley assemblies. The left and right serpentine belt and pulley assemblies provide a conveyance means where the top run of a left and right endless conveyor cable conveys the baskets through the colony channel. The left and right endless conveyor cables wrap around the left and right belt and pulley assemblies respectively in a serpentine manner and the left and right endless conveyor cables have a top run that extends from the respective serpentine belt and pulley system between the entry end and an exit, and a return run that extends from the respective serpentine belt and pulley system between the entry end and an exit end. The adjustment of the jack screw key, as illustrated by items, 4620 and 4618 adjusts the tension of the tension cable 4704 to adjust the adjustable or secondary pulley's 4622 position with respect to the position of the main multi-groove pulley.

The relative positions between the secondary pulley and the main multi-groove pulley increases or decreases the tension in the endless conveyor belt. The secondary and main pulleys have the respective endless belt inter-wrapped from the main pulley to the secondary pulley and extending there between one to the other, where the endless belt wraps three times around each of the secondary and main pulley and where each of the portions of the endless belts extending between the secondary and main pulley (belt tangents) after each wrap are crossed with the prior portion extending between the pulleys thereby forming multiple crossed belt tangents. The inter-wrapping configuration resists slipping of the endless belt with respect to the pulleys and maintains the desire tension in the endless belt as it has been adjusted. A top run of the endless conveyor belt and a return run of the endless conveyor belt extends from the entry end to the exit end of the colony rack Each of the upper and lower winches also include a jack screw key, illustrated by items 4620 and 4618 respectively, that interfaces with the crank gears, as illustrated by 4614 and 4616 in a rack and pinion like arrangement where the thread portion of the jack screw key acts as the linear actuator or "the rack" in the arrangement, which engages with teeth of the crank gears, where the crank gears acts as "the pinion" to affect rotation of the multiple groove spool. The jack screw key is screwed in and out to increase or decrease the tension of a tension cable whose one end is wrapped around and anchored to the spool and whose opposing end extends from the spool to attach to an adjustable pulley whose hub or vertical axis forward toward an exit end or aft toward the entry end and along the direction of the channel.

The adjustable pulley, as illustrated by items 4622 acts as a secondary pulley in combination with a main multi-groove pulley to form a serpentine belt and pulley assembly. The adjustment of the jack screw key, as illustrated by items, 4620 and 4618 adjusts the tension of the tension cable to adjust the adjustable or secondary pulley's position with respect to the position of the main multi-groove pulley.

The jack screw key is screwed in and out to increase or decrease the tension of a tension cable 4704 whose one end is wrapped around and anchored to the spool, illustrated by items 4610 and 4612, and whose opposing end extends from the spool to attach to an adjustable pulley 4622 whose hub 5008 or vertical axis adjusts forward toward an exit end or aft toward the entry end along slot 5010 and along the direction of the channel. The left and right entry end main and secondary pulleys are rotatably mounted on left and right entry end bearing axles where each of the left and right bearing axles have opposing ends positioned along left and right bearing slots 5010 and 4624. For one implementation, each of the upper and lower tensioning cables at each level are attached to the upper and lower spools respectively and wrapped circumferentially there about, and the tensioning cables have an opposing end attached to an adjustment bar 4730 whose upper and lower opposing ends of the adjustment bar are attached respectively to upper and lower adjustable pulley brackets, 4708 and 4712 on which the adjustment pulley bearings are mounted whereby the crank gear can be ratcheted using the jack screw key to increase or decrease the tension in the tensioning cable to thereby adjust the tension in the endless conveyor belt and thereby cause the brackets to travers along support slots 5004 and 5002.

Figure 51:
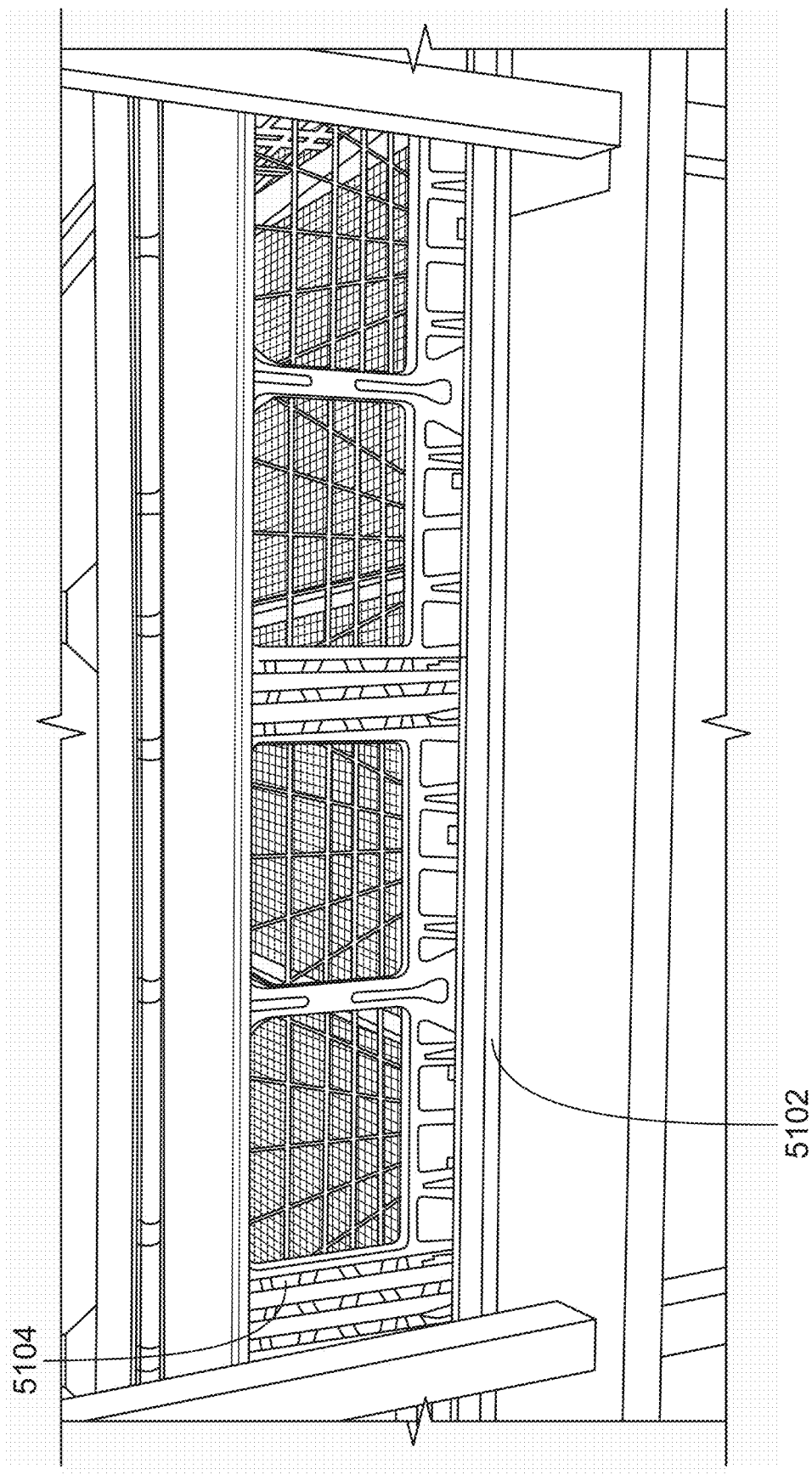
FIG. 51 is an illustration of a basket being conveyed on cable system.

FIG. 51 is an illustration of a colony basket 5104 being conveyed on a conveyor belt 5102 having the appropriate tension to support the colony basket. A top run of the endless conveyor belt 5102 and a return run extend from the serpentine belt and pulley assembly at the entry end toward the exit end of the colony rack to an exit end belt and pulley assembly. One implementation of the method includes inserting a colony basket into an entry end of one or more vertically tiered channels and placing the colony basket on a top run 5102 of an endless conveyor belt, where the endless conveyor belt has an upper top run 5102 and a lower return run, and where each top and return run extends between an entry end pulley assembly and an exit end pulley assembly, and where the endless cable circumferentially wraps around the entry end pulley multiple time, and circumferentially wraps around the exit end pulley multiple times. The method includes conveying a colony basket 5104 on the upper top run 5102 of the endless conveyor belt and thereby conveying the colony basket along the channel on the endless conveyor belt from an entry end to an exit end. The weight of the colony basket and the appropriate tension in the conveyor belt creates a sufficient frictional interface between the bottom of the basket and the conveyor belt such that the colony basket is conveyed.

Figure 52:
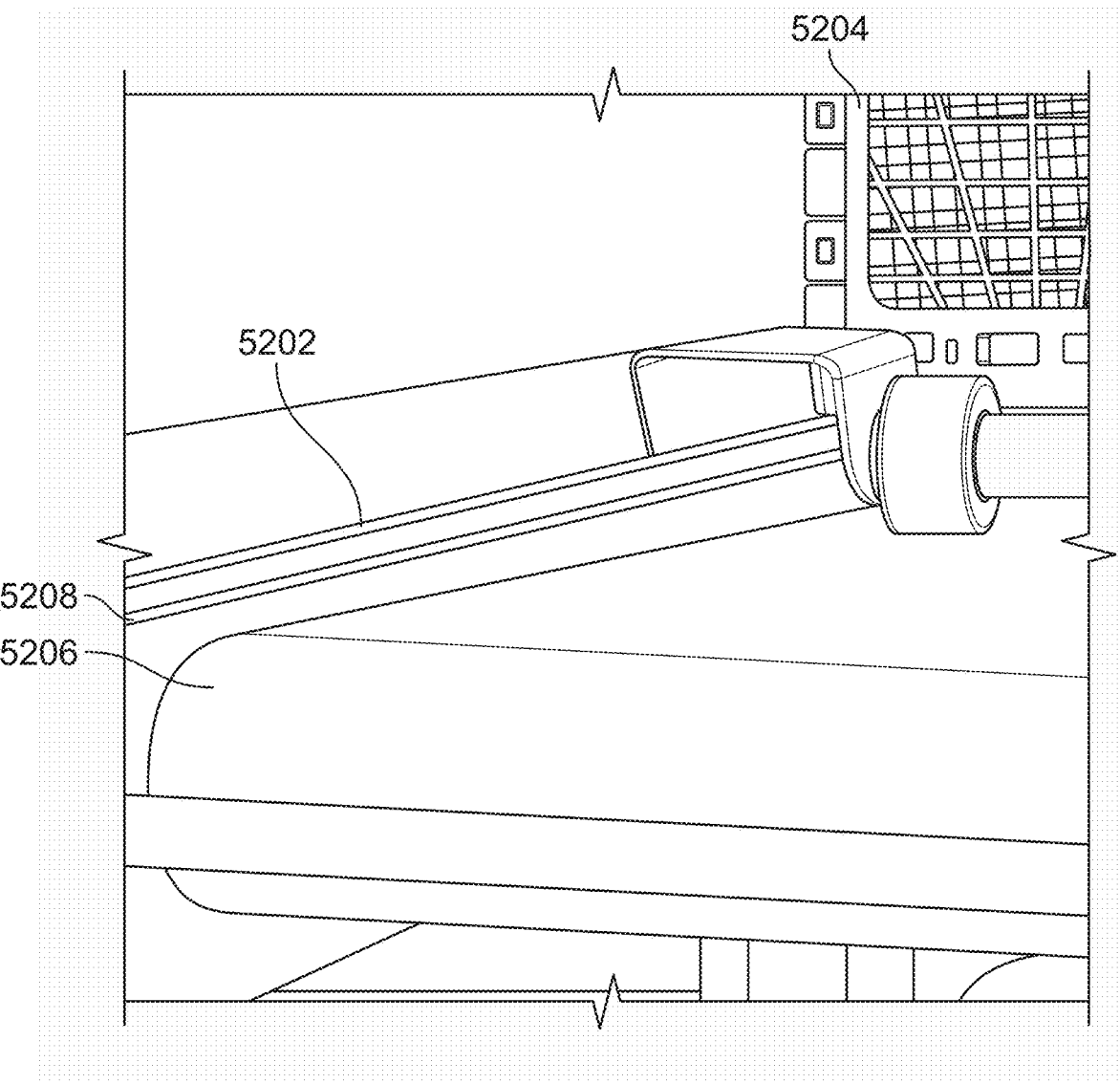
FIG. 52 is an illustration of an exit end of a waste conveyor.

FIG. 52 is an illustration of an exit end of a waste conveyor 5206. For one implementation of the colony rack system, each channel of each level includes a wide debris cleaning endless conveyor belt that extends from the entry end to the exit end and each of the debris cleaning endless conveyor belts at each level extends immediately under the top and return runs of the colony basket conveyor belt 5208. The debris cleaning endless conveyor belt includes a top run that is positioned to catch debris falling from the colony baskets being conveyed above on the endless colony basket conveyor belt. The endless waste debris cleaning conveyor belt 5206 is swiped clean and/or spray cleaned as the waste debris cleaning conveyor belt transitions from the top run to the return run. A colony basket 5204 is illustrated being conveyed on the top run of the colony basket conveyor belt 5202. The return run 5208 is also illustrated. The colony basket 5204 is being conveyed immediately above the waste conveyor such that any debris falling through the vented floor of the colony basket will fall onto the waste conveyor such that waste is captured and removed.

Figure 53:
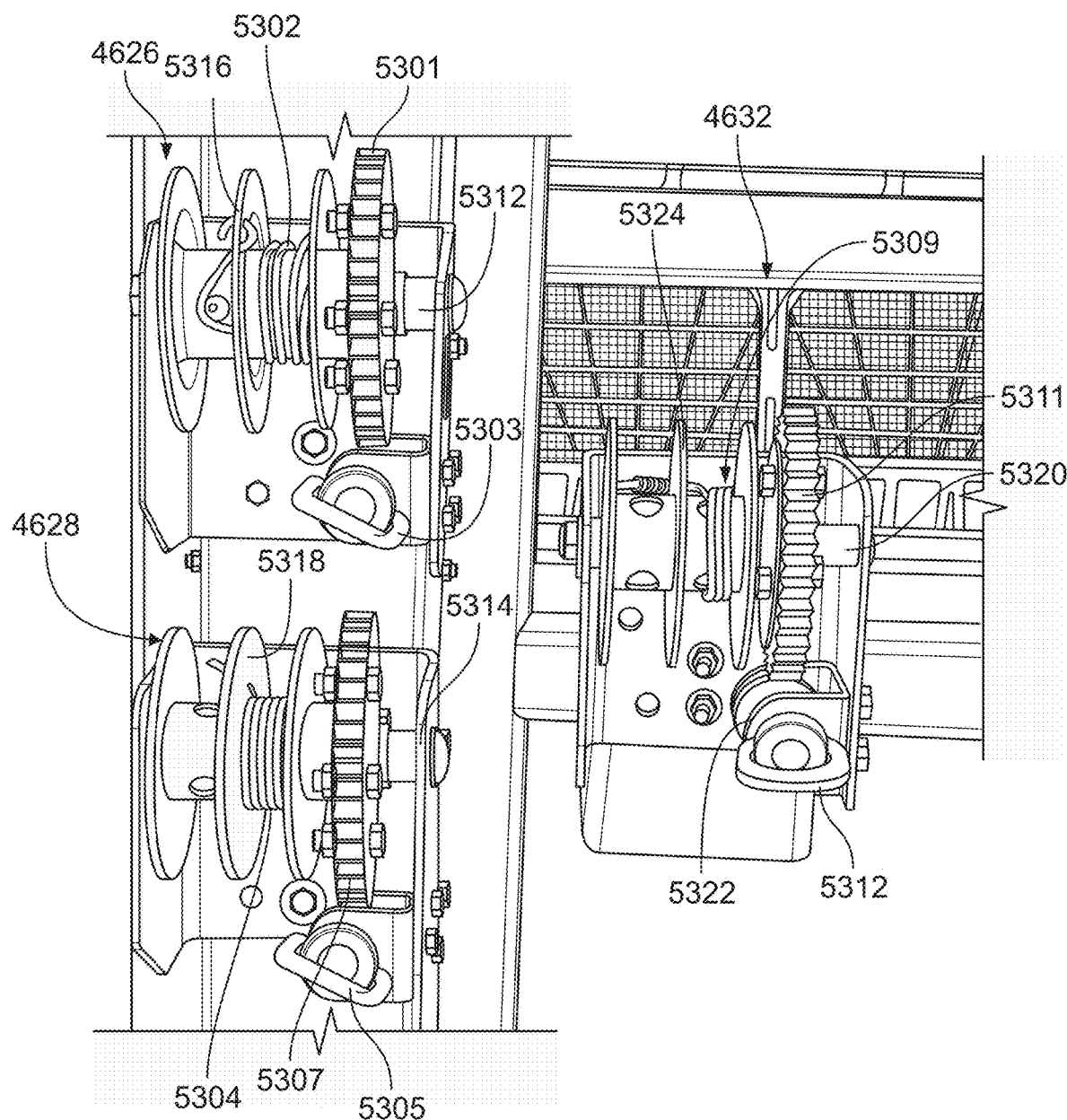
FIG. 53 is a further illustration of an entry end pulley system.

FIG. 53 is a further illustration of an entry end winch system. Each of the upper and lower winches includes a multiple groove spool, 4626 and 4628, with a gear crank 5301 and 5307 attached on one end of the spool where the gear crank and the spool have a common hub 5312 and 5314 and a common cylindrical axis. Each of the upper and lower winches also include a jack screw key 5303 and 5305 that interfaces with the crank gear in a rack and pinion like arrangement where the thread portion of the jack screw key act as the linear actuator or "the rack" in the arrangement, which engages with teeth of the gear crank, where the gear crank acts as "the pinion" to affect rotation of the multiple groove spool. The jack screw key is screwed in and out to increase or decrease the tension of a tension cable 5302 and 5304 whose one end is wrapped around and anchored 5316 and 5318 to the spool and whose opposing end extends from the spool to attach to an adjustable pulley whose hub or vertical axis forward toward an exit end or aft toward the entry end and along the direction of the channel. The adjustable pulley acts as a secondary pulley in combination with a main multi-groove pulley to form a serpentine belt and pulley assembly. At the entry end of the colony rack are left and right serpentine belt and pulley assemblies. The left and right serpentine belt and pulley assemblies provide a conveyance means where the top run of a left and right endless conveyor cable conveys the baskets through the colony channel. The left and right endless conveyor cables wrap around the left and right belt and pulley assemblies respectively in a serpentine manner and the left and right endless conveyor cables have a top run that extends from the respective serpentine belt and pulley system between the entry end and an exit, and a return run that extends from the respective serpentine belt and pulley system between the entry end and an exit end. The adjustment of the jack screw key adjusts the tension of the tension cable to adjust the adjustable or secondary pulley's position with respect to the position of the main multi-groove pulley.

Further, for one implementation, each of the left and right entry end winch assembly above the lowest left and right winch assembly, includes a left and right inner winch. The inner winch, similar to the upper and lower winches, includes a multiple groove inner spool 5324 with an inner gear crank 5311 attached on one end of the inner spool where the inner gear crank and the inner spool have a common inner hub 5320 and a common inner cylindrical axis. Each of inner winches also include an inner jack screw key 5312 that interfaces with the inner crank gear 5311 in a rack and pinion like arrangement where the thread portion 5322 of the inner jack screw key acts as the linear actuator or "the rack" in the arrangement, which engages with the teeth of the inner gear crank, where the inner gear crank acts as "the pinion" to affect rotation of the multiple groove inner spool 5324. The inner jack screw key 5312 is screwed in and out to increase or decrease the tension of an inner tension cable 5309 whose one end is wrapped around and anchored 5324 to the inner spool and whose opposing end extends from the inner spool to attach to an adjustable feeding system, which can move forward toward an exit end or aft toward the entry end and along the direction of the channel. The inner tensioning cable can also adjust the height of the feeding system. The inner tensioning cable with one implementation is used to adjust the position of the nourishment system.

Figure 54:
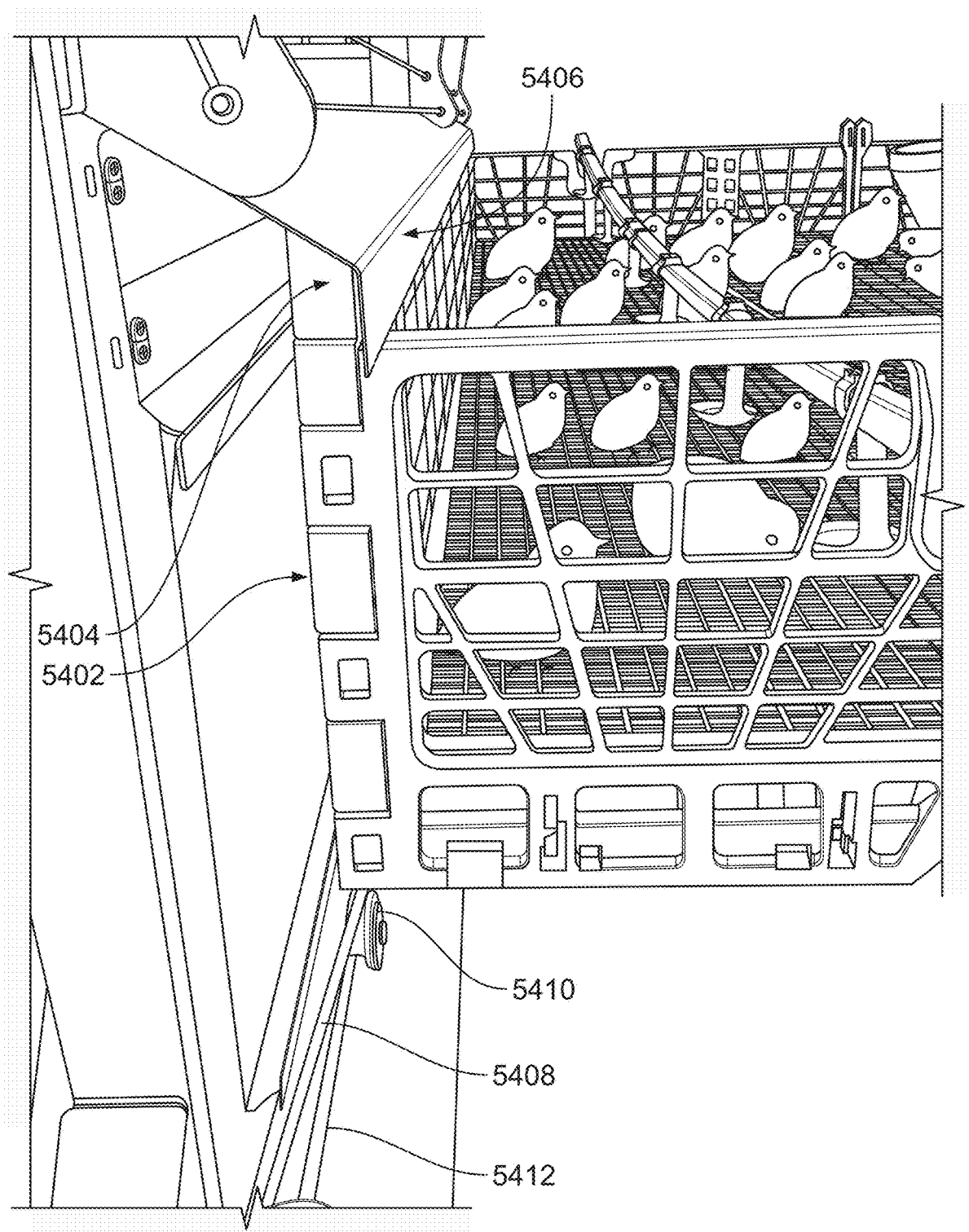
FIG. 54 is an illustration of a basket being conveyed on a conveyor cable.
Figure 55:
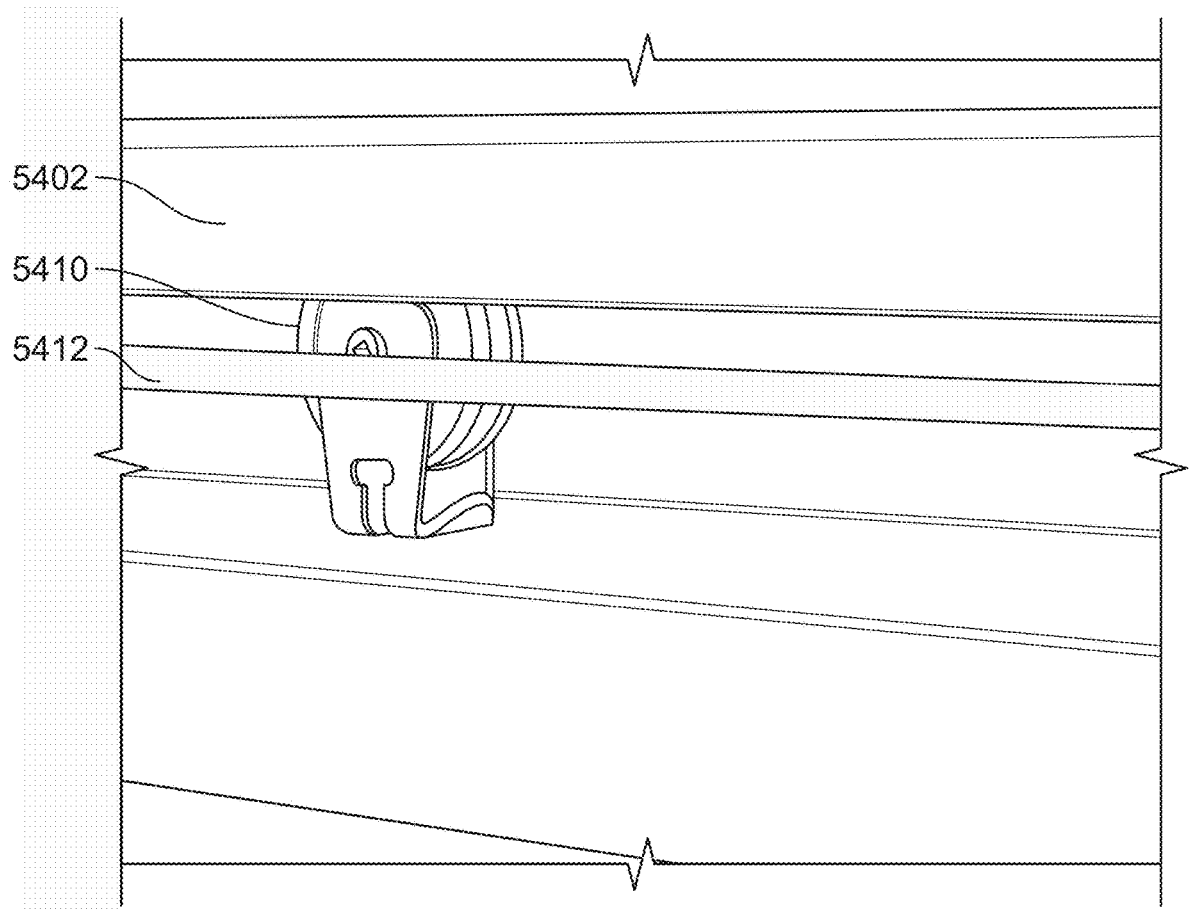
FIG. 55 is an illustration of a caster support for the conveyor cable.

FIG. 54 is an illustration of a basket being conveyed on a conveyor belt 5408. One implementation of the colony system includes a method for growing poultry in a colony including providing a rack system including vertically and horizontally oriented support members, where said support members are structurally interconnected forming multiple vertically tiered channels through which a poultry basket can be conveyed, and where each channel has an entry end and an exit end. One implementation of the method includes inserting a colony basket 5402 into an entry end of one or more vertically tiered channels and placing the colony basket on an endless conveyor belt 5408, where the endless belt has an upper top run 5408 and a lower return run 5412, and where each top and return run extends between an entry end pulley assembly and an exit end pulley assembly, and where the endless belt circumferentially wraps around the entry end pulley multiple time, and circumferentially wraps around the exit end pulley multiple times. The method includes conveying a poultry basket 5402 on the upper top run 5408 of the endless conveyor belt and thereby conveying the colony basket placed along the channel on said endless conveyor belt from an entry end to an exit end. Along the length of the channel, the rack system includes a lateral guide rail 5406 and a hold-down rail 5404. Also along the conveyance path of the channel the top run of the conveyor belt is supported by intermediate support pulley 5410 having a central groove. FIG. 55 is an illustration of a support pulley 5410 for the conveyor cable, the return run 5412 and the colony basket 5402 being conveyed. The support pulley 5410 will assist the conveyor belt to support the weight of the colony baskets, help to maintain the tension in the upper top run of the conveyor belt, and assist with maintaining alignment of the top run.

FIG. 56 is an illustration of a primary exit end pulley. The exit end belt and pulley assembly includes primary exit end return pulley 4906 and a secondary exit end return pulley 4904. Each of said left and right exit end primary return pulley has multiple side-by-side exit end pulley grooves around the cylindrical circumference of each of the left and right exit end primary return pulleys. The left and right exit end primary return pulley is rotatably mounted on left and right exit end primary bearing axles, as illustrated by item 4907, where each of the left and right exit end bearing axles have opposing ends fixedly positioned. The secondary and primary exit end return pulleys have the respective endless belt inter-wrapped from the primary return pulley 4906 to the secondary return pulley 4904 and extending there between one to the other, where the endless belt wraps three times 4910, 4912, 4914 around the primary return pulley and where a portion 4916 of the endless belts extends between the secondary and primary return pulleys (belt tangents) after the third wrap around the primary return pulley thereby forming a crossed belt tangent. The inter-wrapping configuration resists slipping of the endless belt with respect to the return pulleys and maintains the desire tension in the endless belt as it has been adjusted. The top run 4902 of the endless conveyor belt at the exit end does not contact the secondary return pulley and the return run of the endless conveyor belt extends from the primary return pulley to the secondary return pulley secondary return pulley supports a return run 5602 of the endless conveyor belt as it extends from the exit end to the entry end.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of a module is performed in any part through software, the module includes a computer-readable medium. The modules may be regarded as being communicatively coupled. The inventive subject matter may be represented in a variety of different implementations of which there are many possible permutations.

The technology as disclosed herein relates to a colony system that includes a colony rack system within a poultry growing facility. With one implementation the colony rack system includes multiple levels or tiers on which the poultry colony growing baskets are stowed and conveyed. With one implementation, the colony rack system includes an entry end and an exit end. For one implementation of the technology, the colony rack system includes watering line modules extending to and channeling water to spaced apart watering trough modules and feeding line modules extending to and channeling feed to spaced apart feed trough modules for providing nourishment to the birds while in the rack system. Channeling of water and feed through the watering line and feed line modules in one implementation is computer controlled where the computer controlled system has a nourishment software module that when executed selectively controls when water or feed is channeled through the respective lines.

The nourishment software module in one implementation also provides a graphical user interface from which a user is presented with a user interface whereby the user is presented with options to control the channeling of water and feed. As the birds are growing in the baskets on the various levels of the rack system, the baskets are slowly being conveyed by a conveyance system, whether iteratively or progressively toward the exit end where they can then be removed from the colony rack system at which time the birds are now full grown broilers. Conveying the colony baskets through the rack system in one implementation is computer controlled where the computer controlled system has a conveyor software module that when executed selectively controls when a colony basket is conveyed through the rack system. The conveyance software module in one implementation also provides a graphical user interface whereby a user is present with selectable options to control the conveyance of the colony baskets. The rack system will resolve issues relating to handling or maneuvering the colony baskets during the growing process.

The methods described herein do not have to be executed in the order described, or in any particular order. Moreover, various activities described with respect to the methods identified herein can be executed in serial or parallel fashion.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. If the rack systems of a growing house is computer controlled, each rack system within the growing house can be networked to a central server. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various colony rack method and system examples shown above illustrate colony rack system that resolves many issues as identified herein. A user of the present technology as disclosed may choose any of the above implementations, or an equivalent thereof, depending upon the desired application. In this regard, it is recognized that various forms of the subject colony rack system could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A colony system for growing poultry comprising:
   a rack system including vertically and horizontally oriented support members, where said support members are structurally interconnected forming multiple vertically tiered channels through which a poultry basket can be conveyed, and where each channel has an entry end and an exit end;
   a left entry end pulley system and right entry end pulley system positioned at the entry end of one of multiple vertically tiered channels, where each of said left entry end pulley system and right entry end pulley system has an adjustable left secondary pulley and right secondary pulley and a left main pulley and right main pulley respectively, where the left secondary pulley and right secondary pulley and the left main pulley and right main pulley each have multiple side-by-side left entry end pulley grooves and right entry end pulley grooves around an entry end pulley circumference of each left entry end secondary pulley and right entry end secondary pulley and of each left entry end main pulley and right entry end main pulley, and where said left entry end secondary pulley and right entry end secondary pulley is rotatably mounted on left secondary entry end bearing axles and right secondary entry end bearing axles where each of the left secondary entry end bearing axle and right secondary entry end bearing axles have opposing ends positioned along left bearing slot and right bearing slots, where the secondary entry end bearing axles are configured to adjustable along the left bearing slot and right bearing slots;
   a left exit end pulley and right exit end pulley, where each of said left exit end pulley and right exit end pulley has multiple side-by-side left exit end pulley grooves and right exit end pulley grooves around an exit end circumference of each left exit end pulley and right exit end pulley, and where said left exit end pulley and right exit end pulley is rotatably mounted on left exit end bearing axle and right exit end bearing axles where each of the left exit end bearing axle and right exit end bearing axles have opposing ends fixedly positioned; and
   a left endless conveyor cable and right endless conveyer cable, where the left endless cable has a left upper run and a left return run, and where each extends between the left entry end pulley system and the left exit end pulley, and where the left endless cable circumferentially wraps around the left entry end adjustable secondary pulley and through the left entry end adjustable secondary pulley grooves two or more times and said left endless cable circumferentially wraps around the left entry end main pulley and through the left entry end main pulley grooves two or more times, and circumferentially wraps around the left exit end pulley and through the left exit end pulley grooves, and where the right endless cable has a right upper run and a right return run, and where each extends between the right entry end pulley and the right exit end pulley, and where the right endless cable circumferentially wraps around the right entry end adjustable secondary pulley and through the right entry end adjustable secondary pulley grooves two or more times and said right endless cable circumferentially wraps around the right entry end main pulley and through the right entry end main pulley grooves two or more times, and circumferentially wraps around the right exit end pulley and through the left exit end pulley grooves.

2. The colony system as recited in claim 1, comprising:
a left geared tensioning winch having a left ratcheting gear attached to a left spool having a left tensioning cable attached to the left spool and wrapped circumferentially there about, and said left tensioning cable having an opposing end attached to a left bracket on which the left entry end bearing axles are mounted whereby the left ratcheting gear can be ratcheted to increase decrease the tensioning in the tensioning cable to adjust a position of the left entry end secondary pulley to thereby adjust the tension in the left endless conveyor cable.

3. The colony system as recited in claim 2, comprising:
a right geared tensioning winch, having a right ratcheting gear attached to a right spool having a right tensioning cable attached to the right spool and wrapped circumferentially there about, and said right tensioning cable having an opposing end attached to a right bracket on which the right entry end bearing axles are mounted whereby the right ratcheting gear can be ratcheted to increase decrease the tensioning in the right tensioning cable to adjust a position of the right entry end secondary pulley to thereby adjust the tension in the right endless conveyor cable.

4. The colony system as recited in claim 3, comprising:
an endless waste conveyor belt having an upper conveyor belt run extending between the entry end and the exit end of at least one of the multiple vertically tiered channels, where the upper conveyor belt run extends substantially parallel with respect to the left endless conveyor cable left upper run and the right endless conveyor cable right upper run of the left and right endless conveyor cable, and where the upper conveyor belt run extends vertically lower with respect to the left and right upper runs of the left and right endless conveyor cables, to thereby convey waste toward the exit end for disposal.

5. A colony system for growing poultry comprising:
a rack system including vertically and horizontally oriented support members, where said support members are structurally interconnected forming multiple vertically tiered channels through which a poultry basket can be conveyed, and where each channel has an entry end and an exit end;
an entry end pulley system positioned at the entry end of one of multiple vertically tiered channels, where each of said entry end pulley systems has an adjustable secondary pulley and main pulley, where the secondary pulley and the main pulley each have multiple side-by-side entry end pulley grooves around an entry end pulley circumference of the secondary pulley and of the entry end main pulley, and where said entry end secondary pulley is rotatably mounted on secondary entry end bearing axles where the secondary entry end bearing axles have opposing ends positioned along left and right bearing slots, where the secondary entry end bearing axles are configured to adjustable along the left and right bearing slots;
an exit end pulley, where said exit end pulley has multiple side-by-side exit end pulley grooves around an exit end circumference of the exit end pulley, and where said exit end pulley is rotatably mounted on left and right exit end bearing axles where each of the left and right exit end bearing axles have opposing ends fixedly positioned; and
an endless conveyer cable, where the endless conveyor cable has an upper run and a return run, and where each extends between the entry end pulley system and the exit end pulley, and where the endless cable circumferentially wraps around the entry end adjustable secondary pulley and through the entry end adjustable secondary pulley grooves two or more times and said left endless cable circumferentially wraps around the entry end main pulley and through the entry end main pulley grooves two or more times, and circumferentially wraps around the exit end pulley and through the exit end pulley grooves.

6. The colony system as recited in claim 5, comprising:
a geared tensioning winch having a ratcheting gear attached to a spool having a tensioning cable attached to the spool and wrapped circumferentially there about, and said tensioning cable having an opposing end attached to a bracket on which the entry end bearing axle is mounted whereby the ratcheting gear can be ratcheted to increase or decrease the tensioning in the tensioning cable to thereby adjust the tension in the endless conveyor cable.

7. A colony method for growing poultry comprising:
providing a rack system including vertically and horizontally oriented support members, where said support members are structurally interconnected forming multiple vertically tiered channels through which a poultry basket can be conveyed, and where each channel has an entry end and an exit end;
inserting a colony basket into an entry end of one or more vertically tiered channels and placing the colony basket on an endless conveyor cable, where the endless cable has an upper run and a lower run, and where each run extends between an entry end pulley and an exit end pulley, and where the endless cable circumferentially wraps around the entry end pulley two or more times and through multiple side-by-side entry end pulley grooves, and circumferentially wraps around the exit end pulley two or more times and through multiple side-by-side entry the exit end pulley grooves; and
conveying the upper run of the endless conveyor cable and thereby conveying the colony basket placed on said endless conveyor cable.

8. The colony method as recited in claim 7, comprising:
tensioning the endless conveyor cable, utilizing a geared tensioning winch, having a ratcheting gear attached to a right spool having a right tensioning cable attached to the right spool and wrapped circumferentially there about, and said right tensioning cable having an opposing end attached to a right bracket on which the right entry end bearing axles are mounted; and ratcheting the ratcheting gear to increase or decrease the tensioning in the tensioning cable thereby adjusting the tension in the endless conveyor cable.

9. The colony method as recited in claim 8, comprising:
conveying the colony basket from the entry end to the exit end of one or more of the vertically tiered channels.

10. The colony method as recited in claim 9, comprising:
conveying away waste with an endless conveyor belt having an upper conveyor belt run extending between the entry end and the exit end of one or more of the multiple vertically tiered channels.

\* \* \* \* \*